Jan. 25, 1966 C. M. DAVIS ET AL 3,231,725
DATA PROCESSING SYSTEM WITH COMMON BUS MEANS
Filed April 3, 1961 32 Sheets-Sheet 9
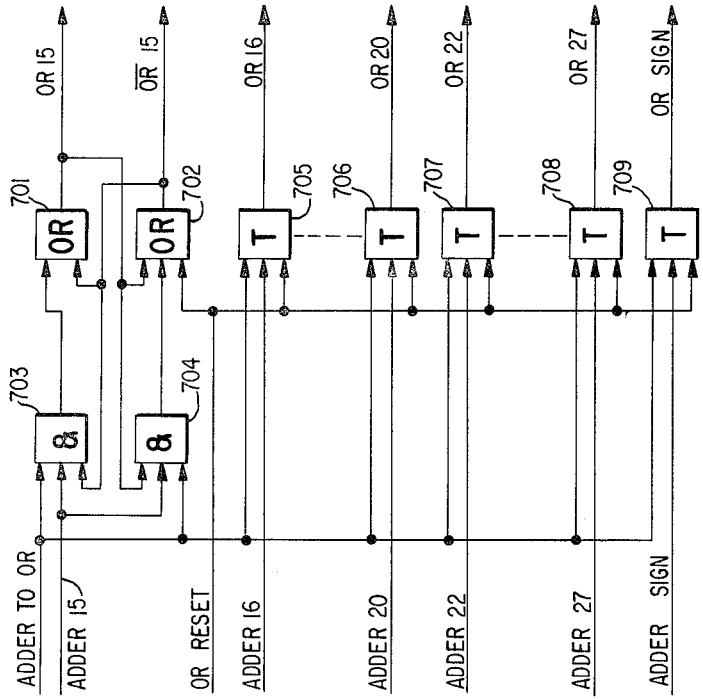
FIG.7 OPERATION REGISTER
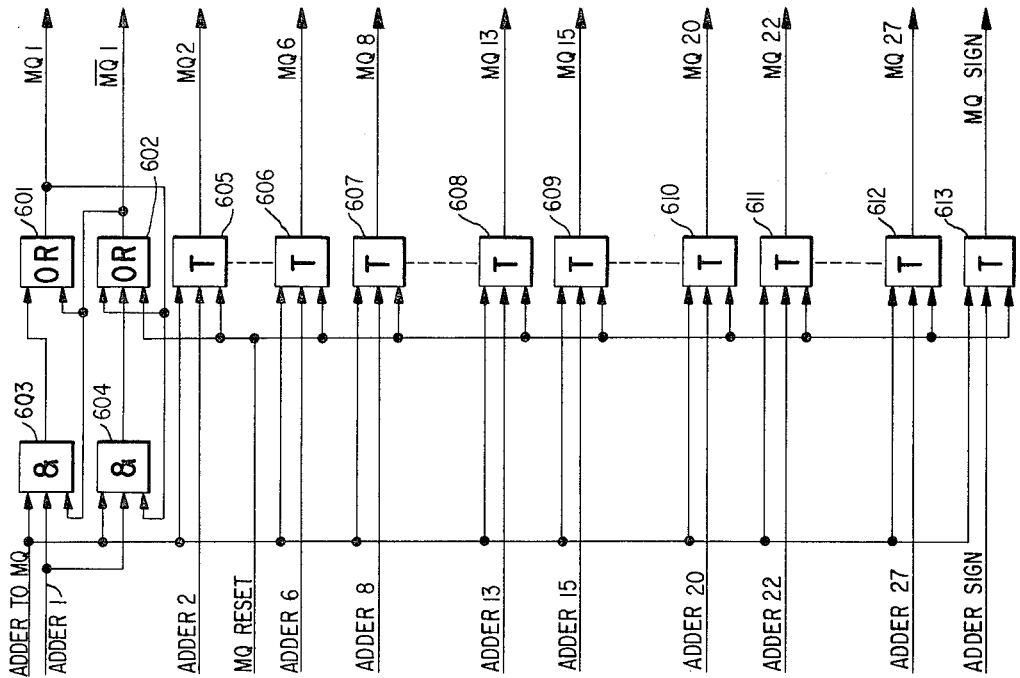
FIG.6. MQ

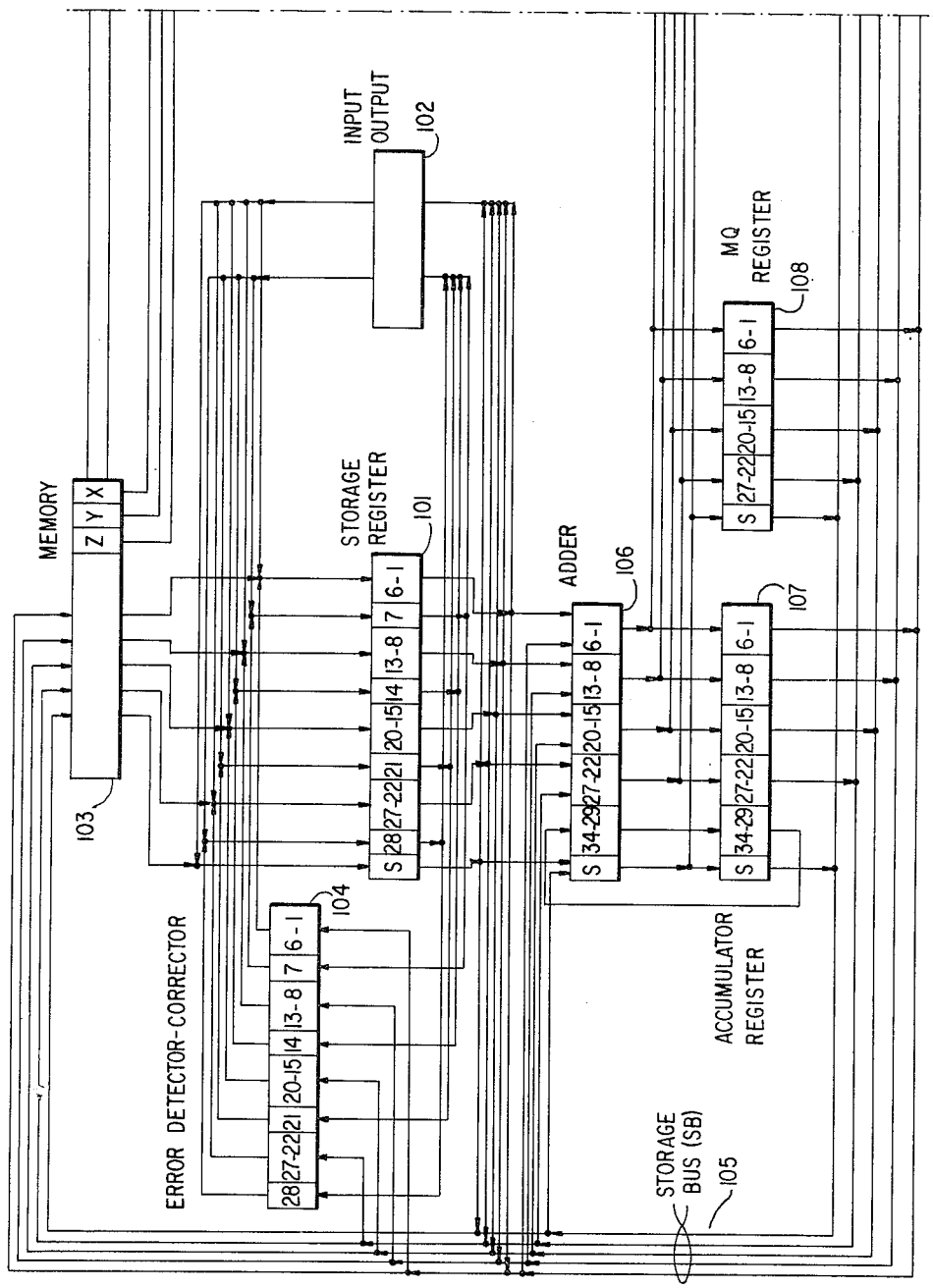

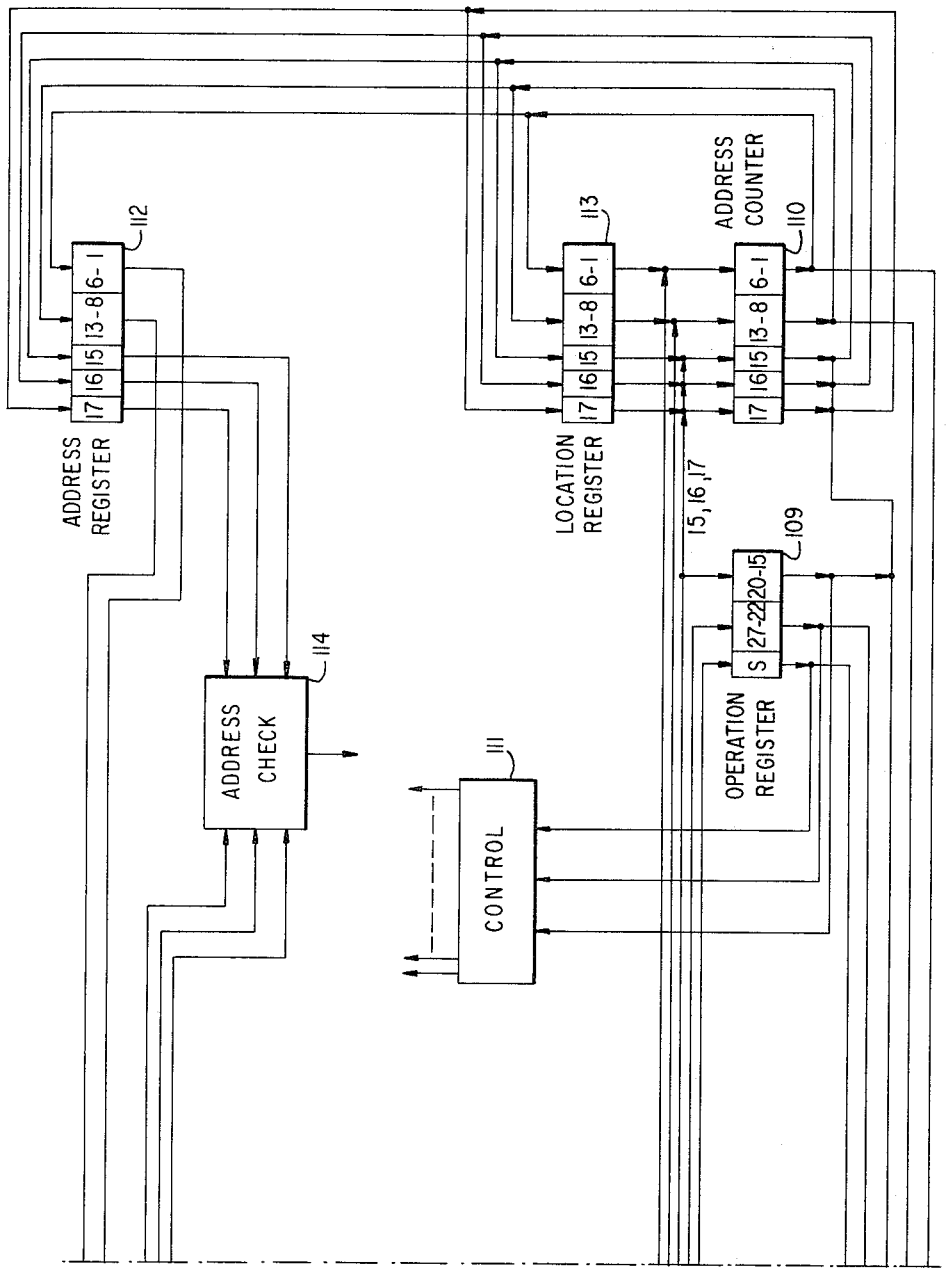

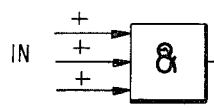
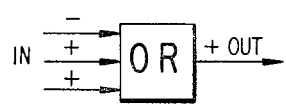
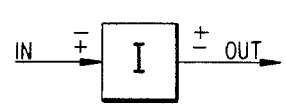
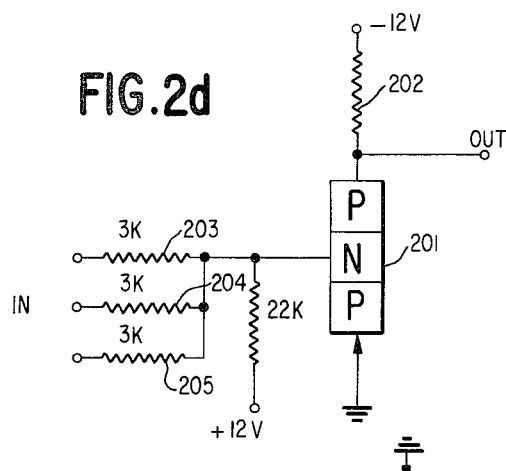
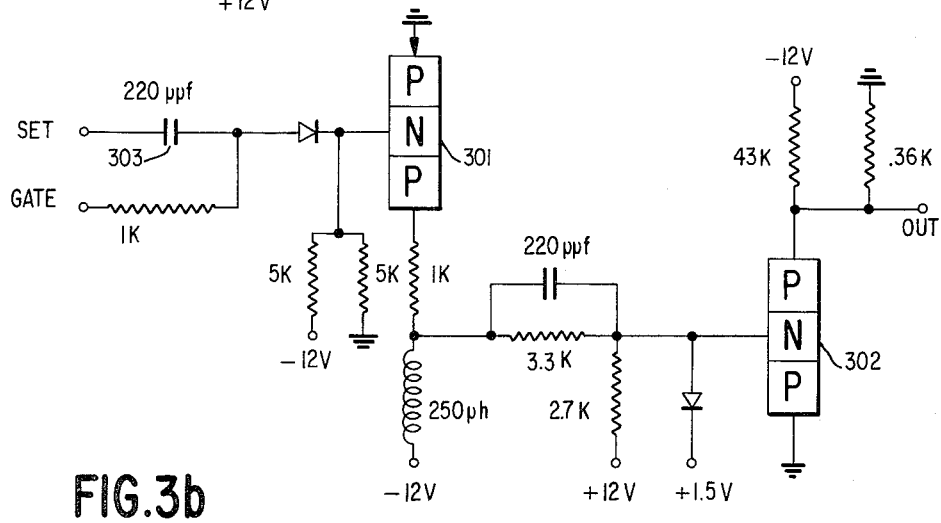

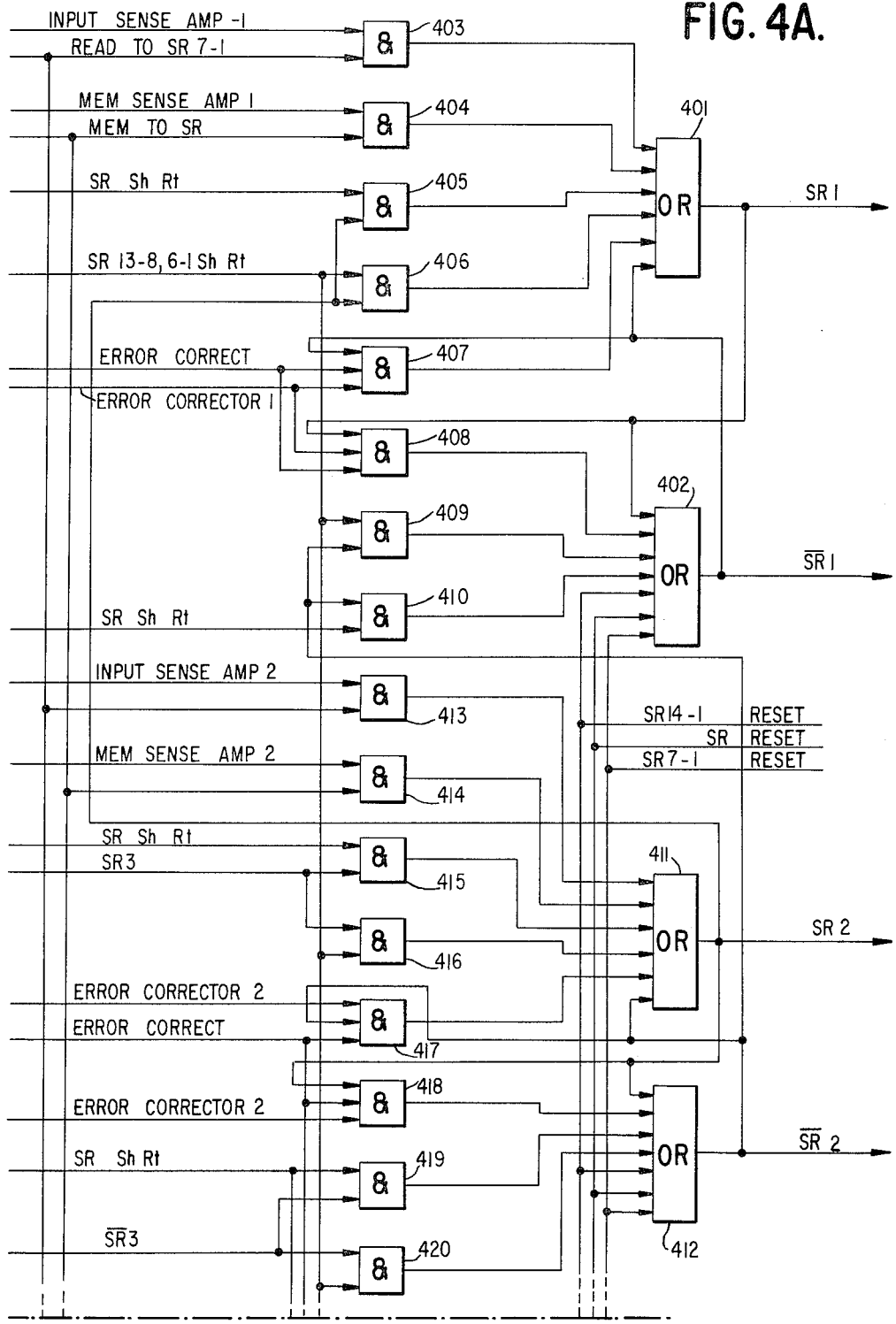

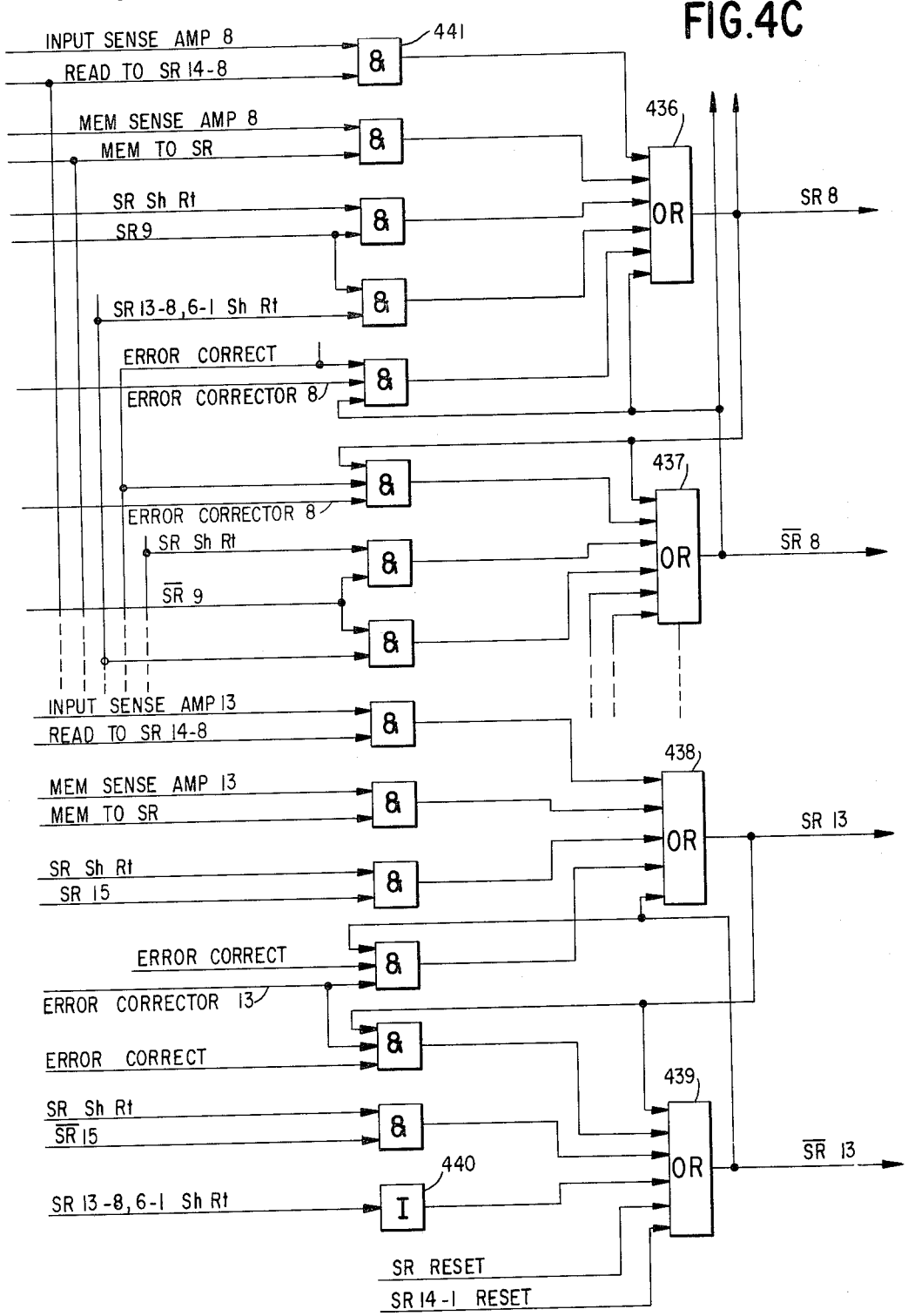

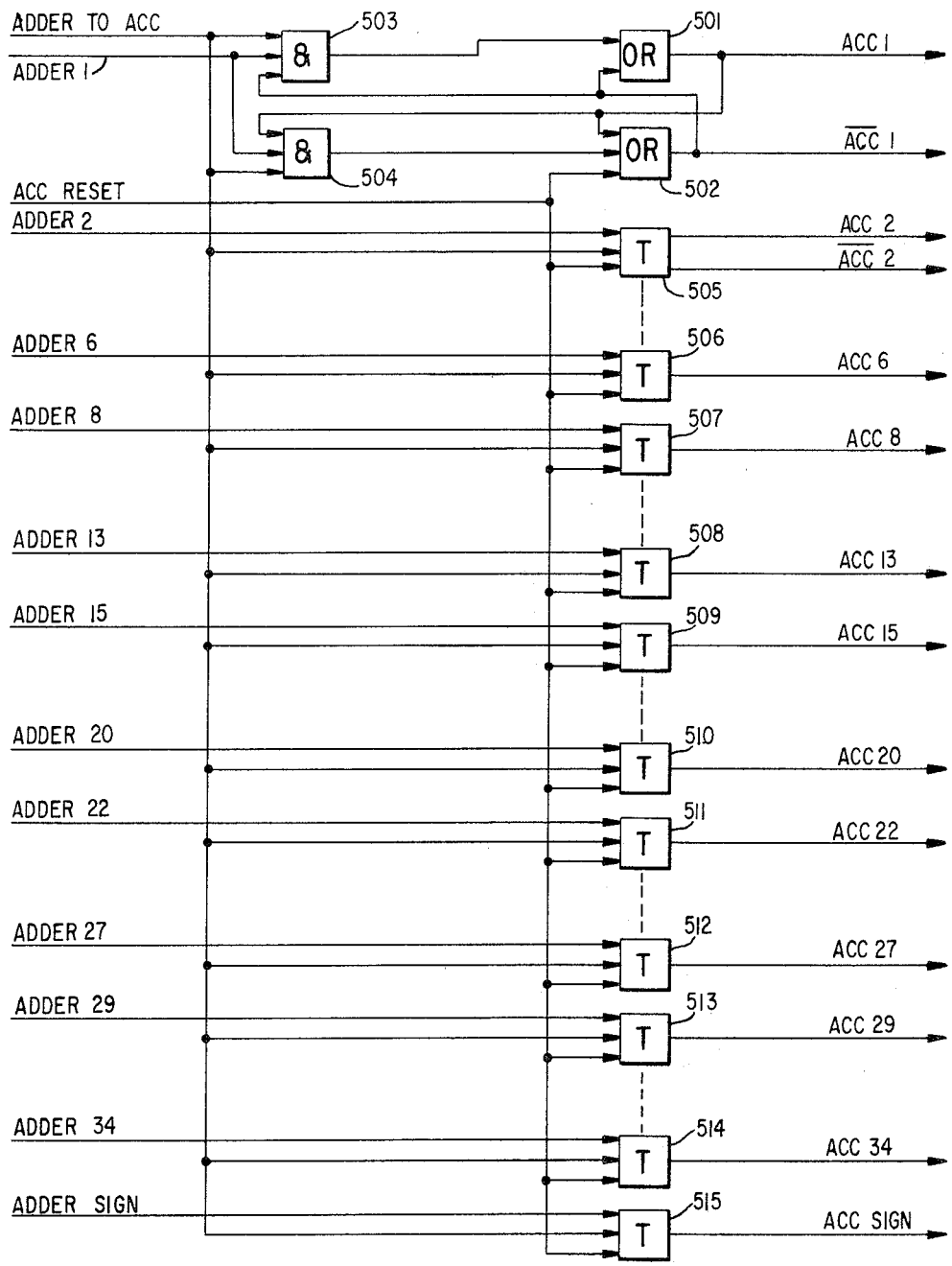
FIG.5. ACCUMULATOR

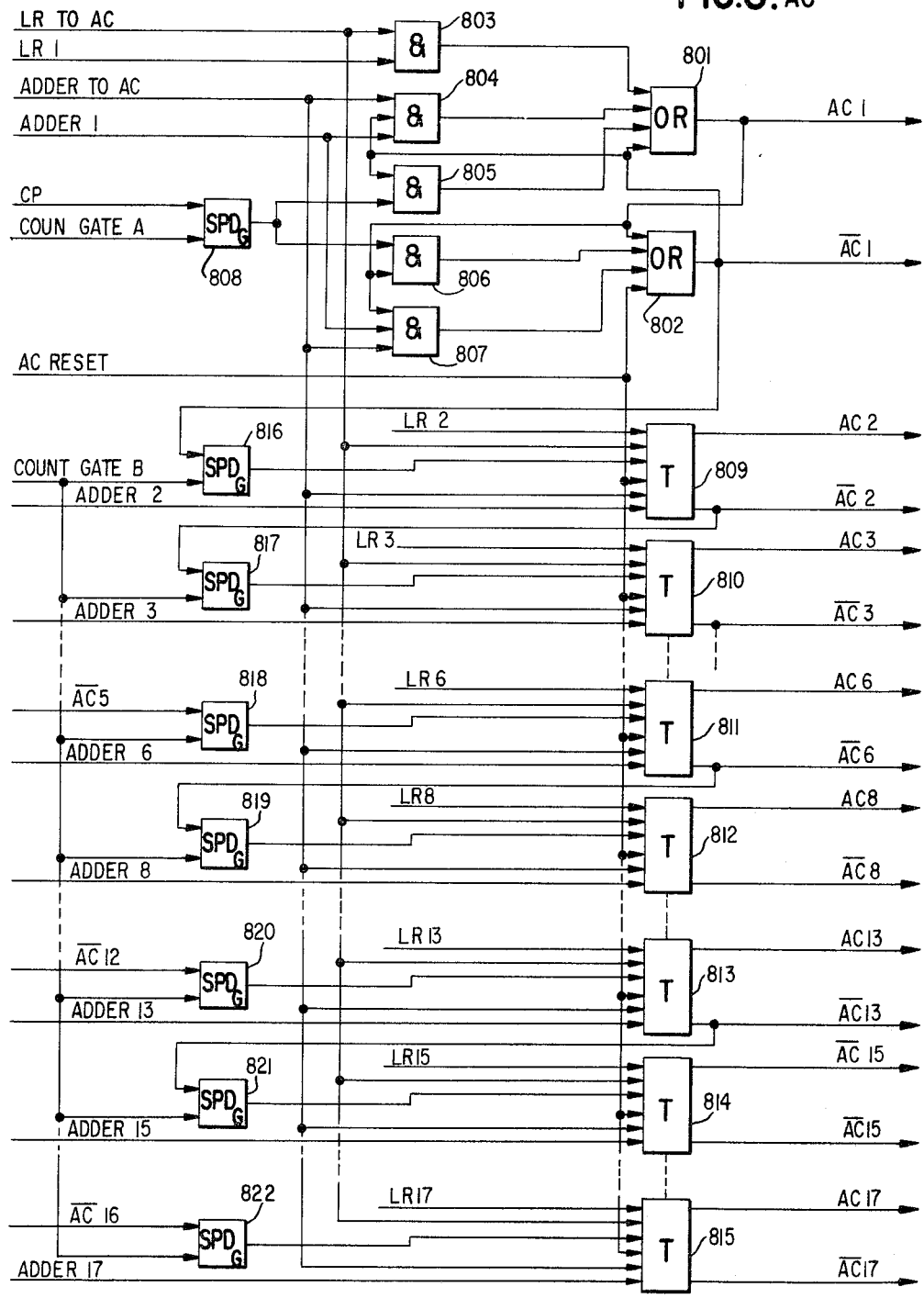
FIG.8.AC

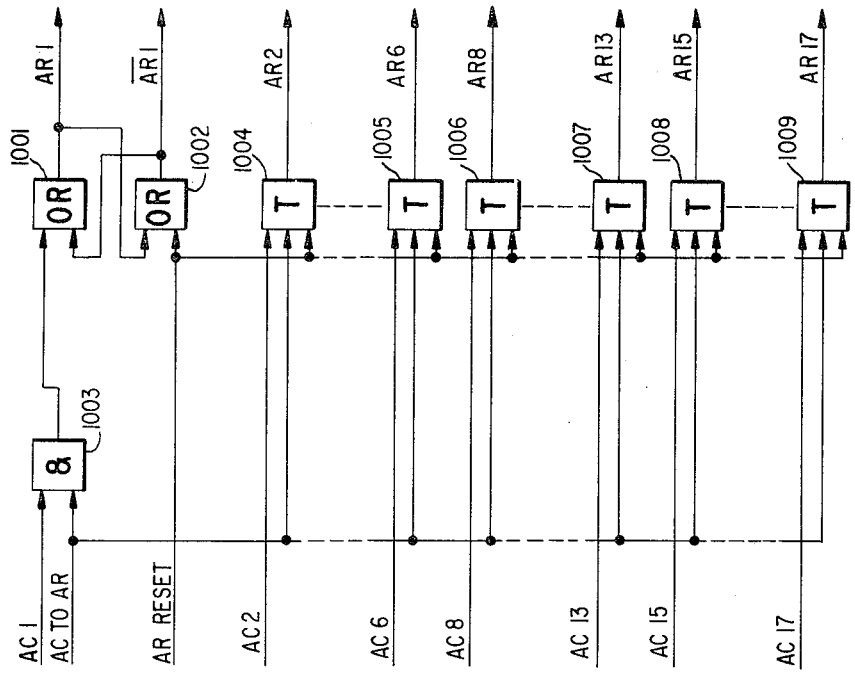
FIG.10. AR
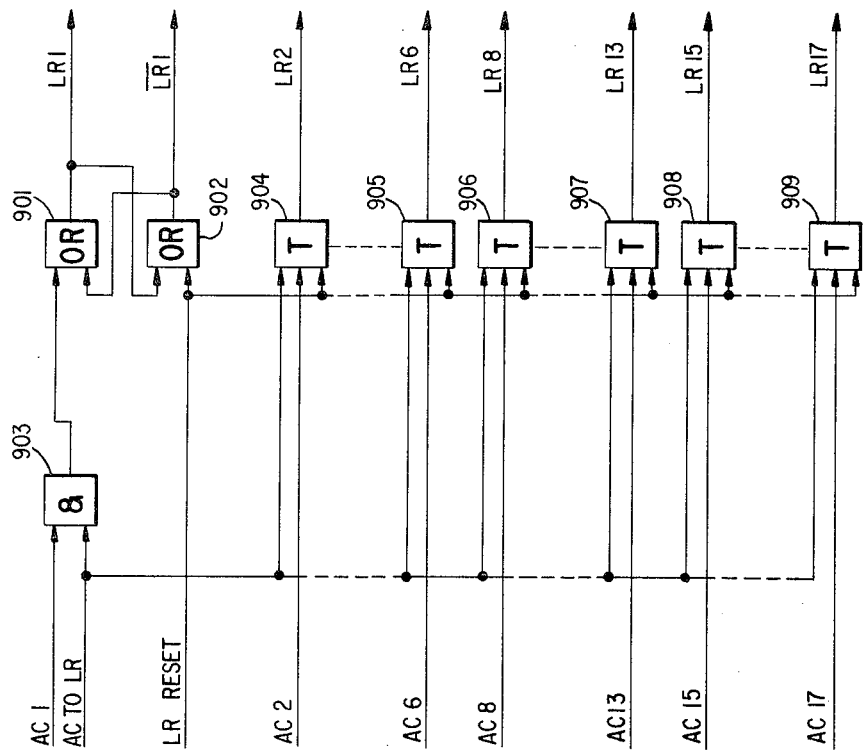
FIG.9. LR

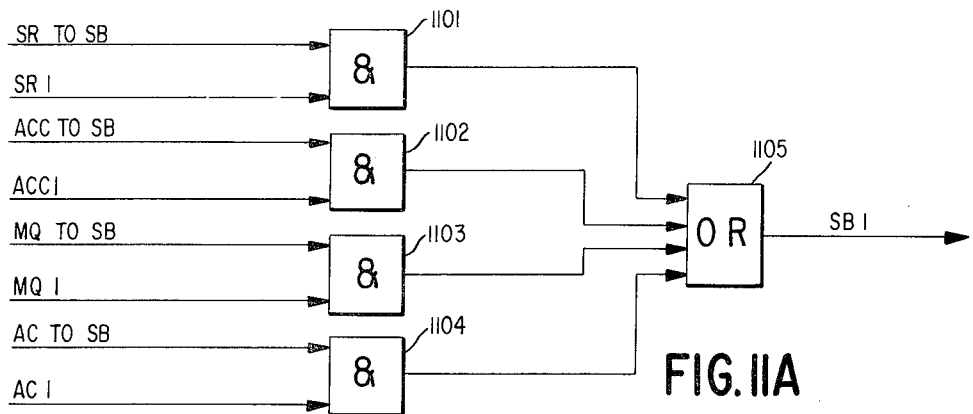
FIG. IIA
GATING TO SB
(ONE BINARY POSITION)
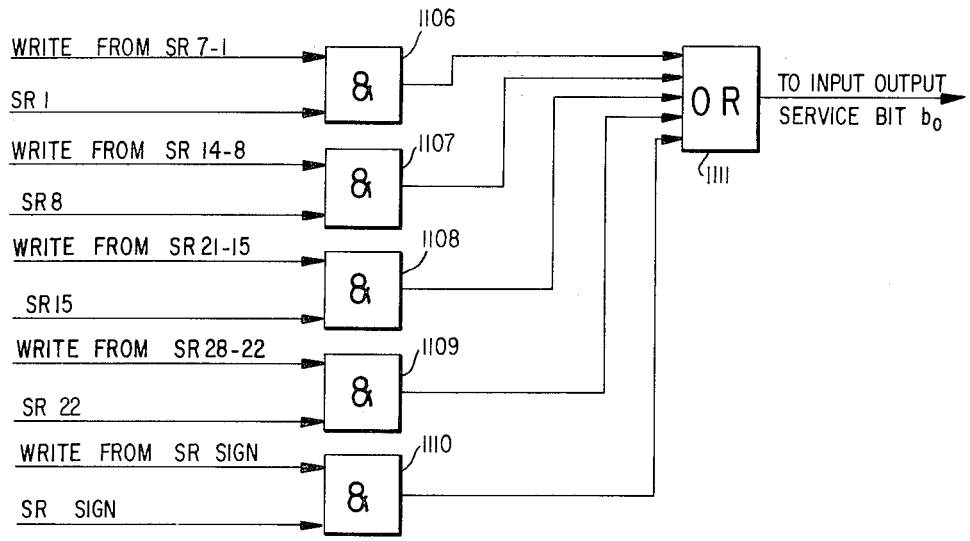
FIG. IIB
GATING FROM SR TO
OUTPUT SERVICE
(I CHARACTER BIT)

Jan. 25, 1966   C. M. DAVIS ET AL   3,231,725
DATA PROCESSING SYSTEM WITH COMMON BUS MEANS
Filed April 3, 1961   32 Sheets-Sheet 14

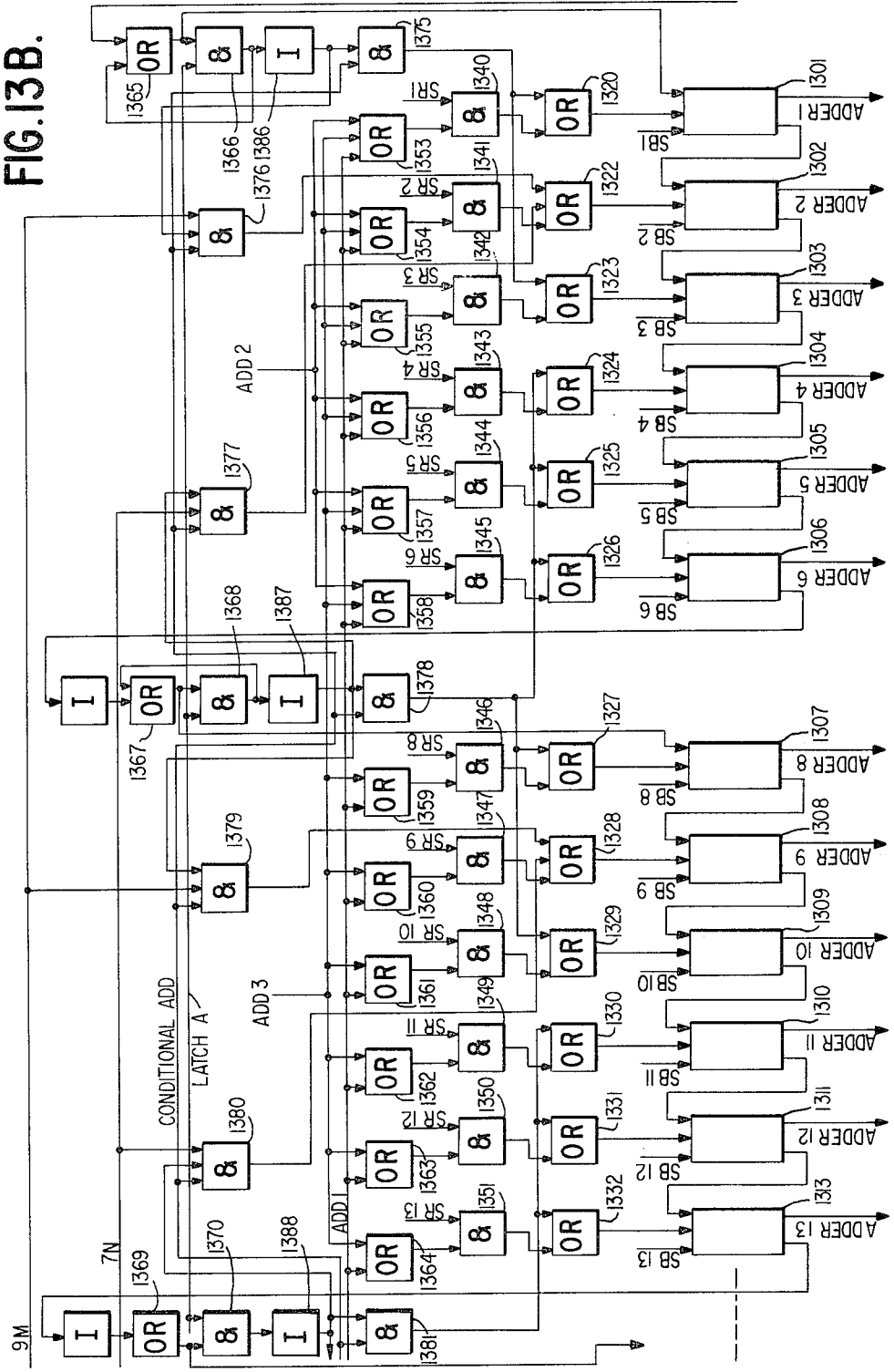

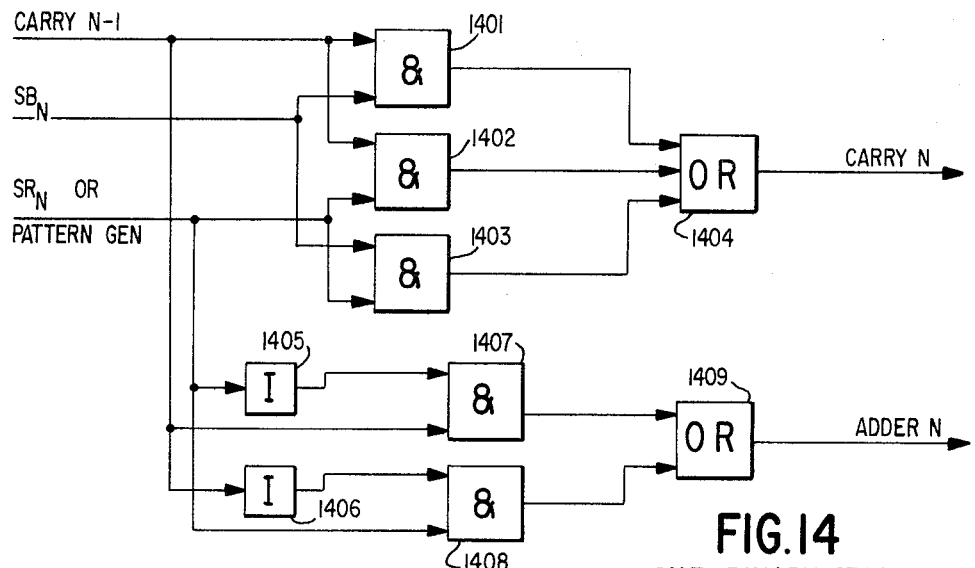
FIG. 14
ONE BINARY STAGE OF ADDER
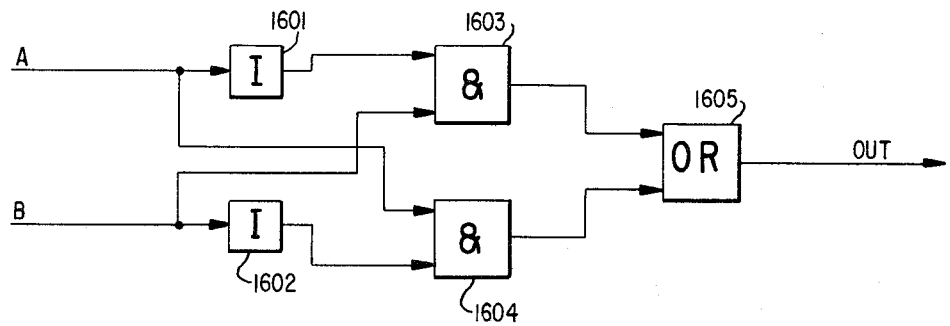
FIG. 16. EXCLUSIVE OR LOGIC

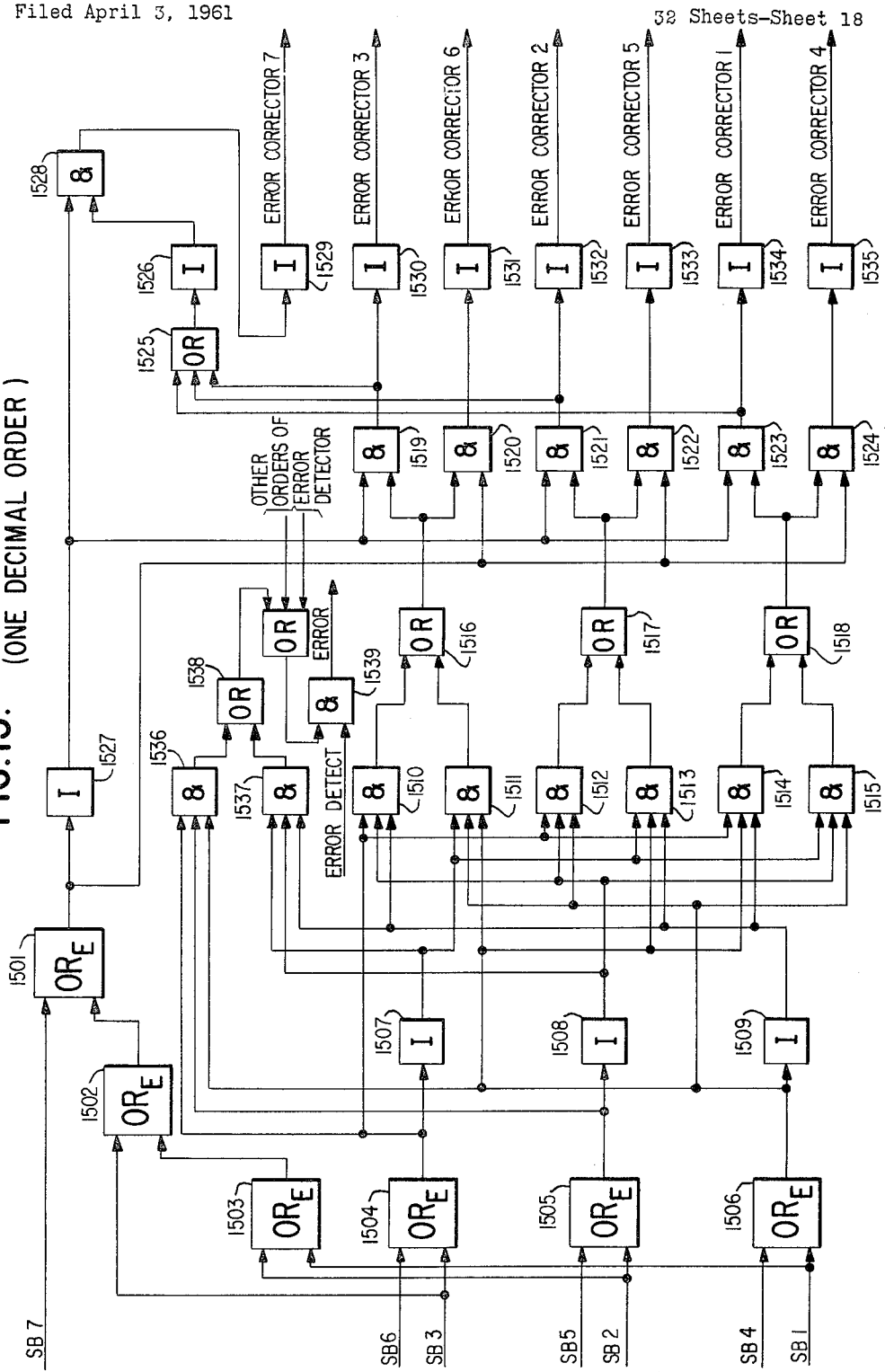

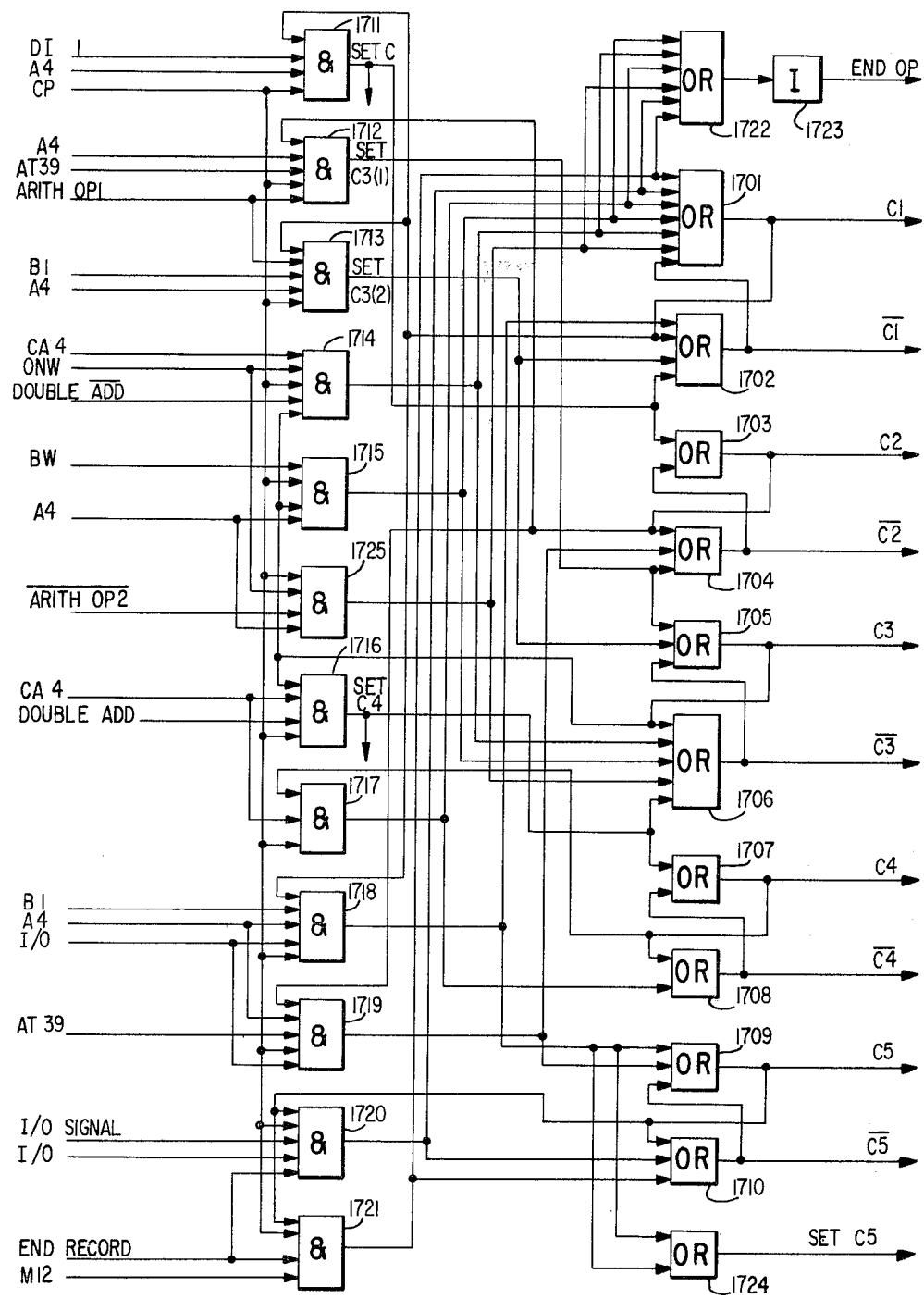
FIG.17. C RING

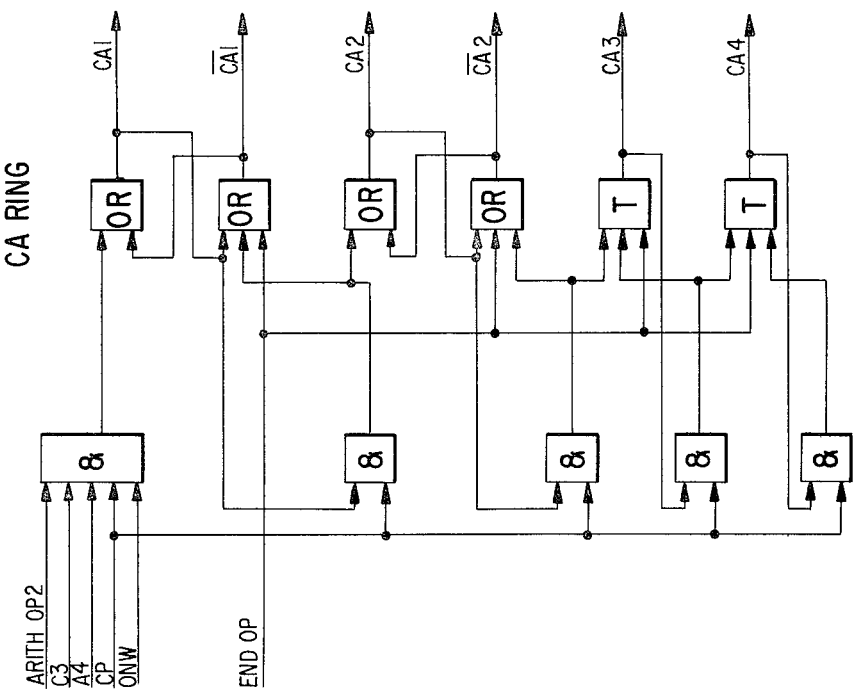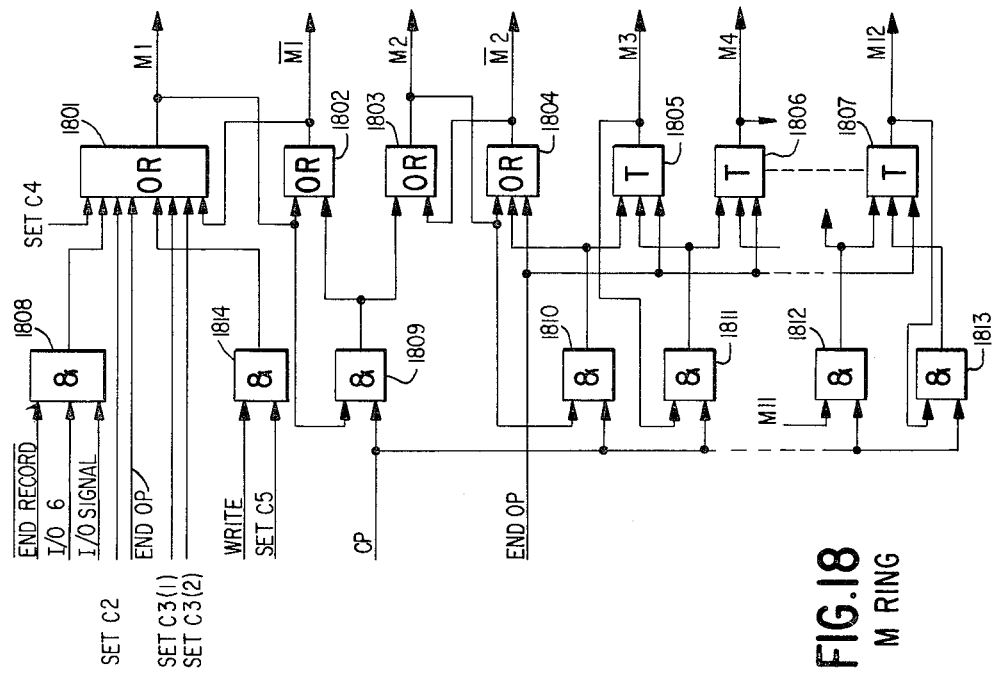

A RING

AT RING

AT RING

I/O RING

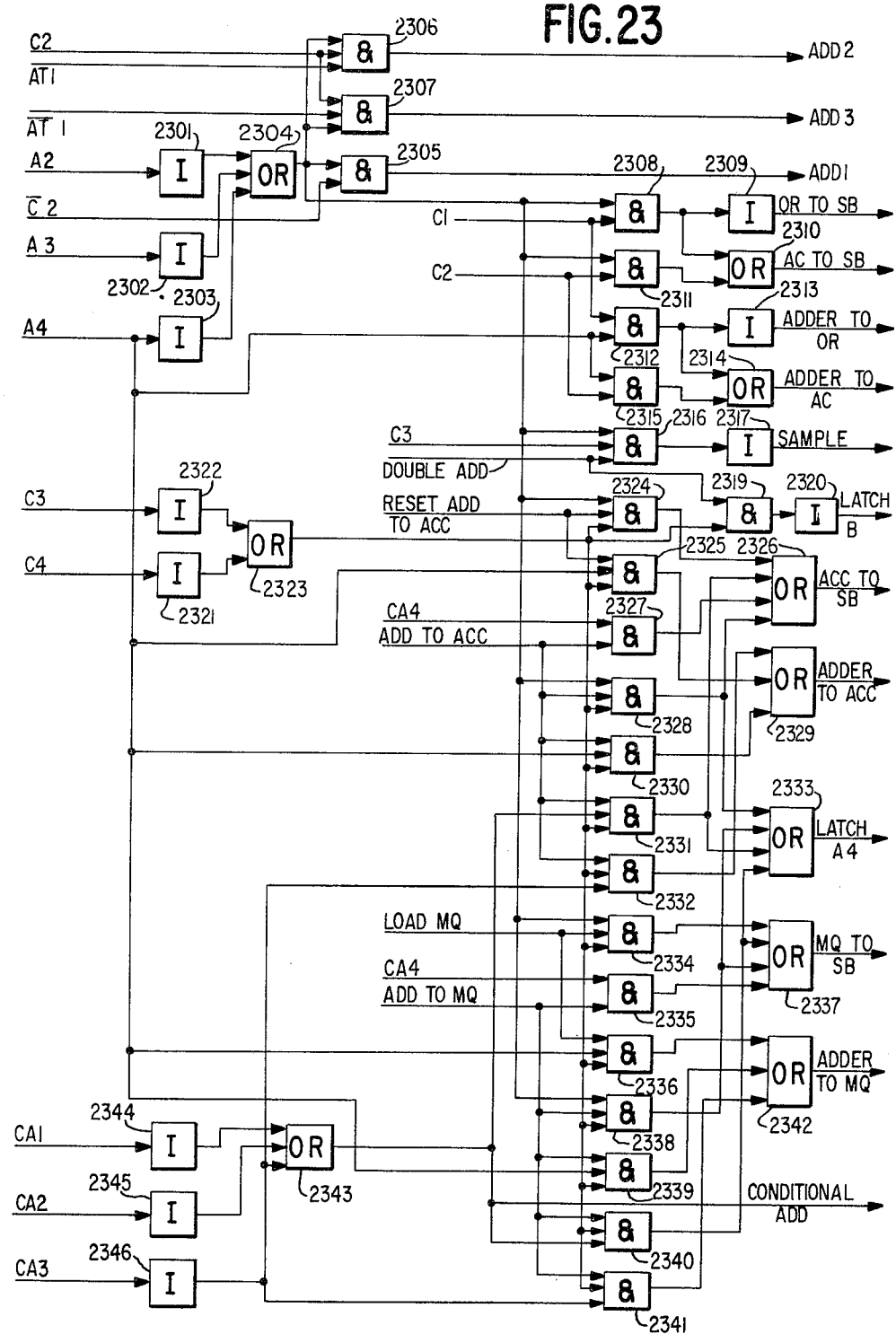

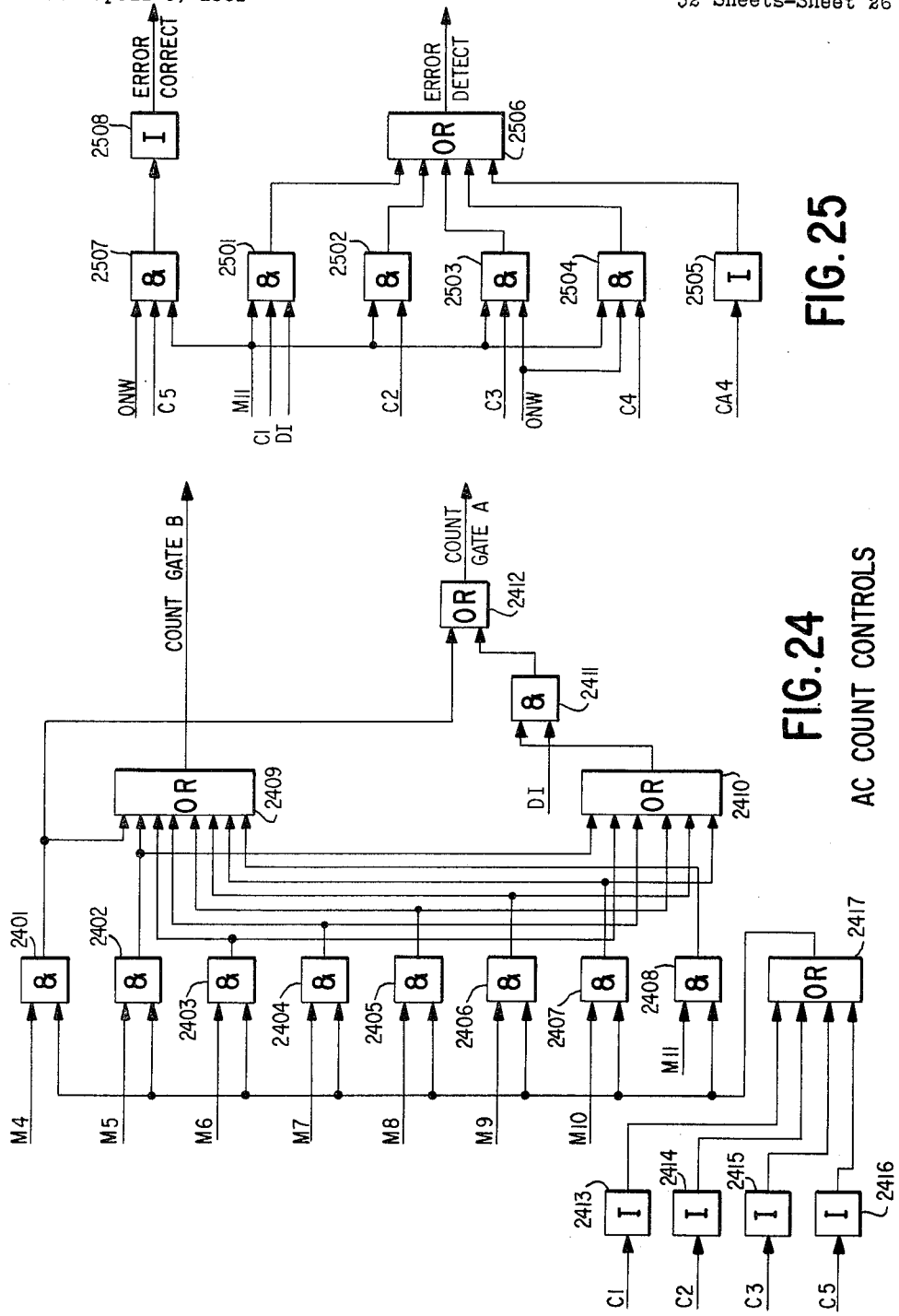

FIG.27. RESET CIRCUITS

SR SHIFT CONTROLS

FIG.30. INSTRUCTION CODES
| INSTRUCTION | S | 27 | 26 | 25 | 24 | 23 | 22 | 20 | 19 | 18 | 17 | 16 | 15 |
|---|---|---|---|---|---|---|---|---|---|---|---|---|---|
| READ BW |  | 0 | 0 | 0 | 1 | 1 | 1 | 0 | 0 | 0 | 0 | 0 | 0 |
| READ 7N |  | 1 | 0 | 0 | 0 | 1 | 1 | 0 | 0 | 0 | 0 | 0 | 0 |
| READ 9M |  | 0 | 1 | 0 | 1 | 0 | 1 | 0 | 0 | 0 | 0 | 0 | 0 |
| WRITE BW |  | 0 | 0 | 0 | 1 | 1 | 1 | 0 | 0 | 0 | 1 | 1 | 1 |
| WRITE 7N |  | 1 | 0 | 0 | 0 | 1 | 1 | 0 | 0 | 0 | 1 | 1 | 1 |
| WRITE 9M |  | 0 | 0 | 0 | 1 | 0 | 1 | 0 | 0 | 0 | 1 | 1 | 1 |
| Reset ADD to ACC BW |  | 0 | 0 | 0 | 1 | 1 | 1 | 0 | 0 | 1 | 1 | 1 | 0 |
| Reset ADD to ACC 7N |  | 1 | 0 | 0 | 0 | 1 | 1 | 0 | 0 | 1 | 1 | 1 | 0 |
| Reset ADD to ACC 9M |  | 0 | 1 | 0 | 1 | 0 | 1 | 0 | 0 | 1 | 1 | 1 | 0 |
| ADD TO ACC BW |  | 0 | 0 | 0 | 1 | 1 | 1 | 0 | 1 | 0 | 1 | 0 | 1 |
| ADD TO ACC 7N |  | 1 | 0 | 0 | 0 | 1 | 1 | 0 | 1 | 0 | 1 | 0 | 1 |
| ADD TO ACC 9M |  | 0 | 1 | 0 | 1 | 0 | 1 | 0 | 1 | 0 | 1 | 0 | 1 |
| LOAD MQ BW |  | 0 | 0 | 0 | 1 | 1 | 1 | 0 | 1 | 1 | 1 | 0 | 0 |
| LOAD MQ 7N |  | 1 | 0 | 0 | 0 | 1 | 1 | 0 | 1 | 1 | 1 | 0 | 0 |
| LOAD MQ 9 |  | 0 | 1 | 0 | 1 | 0 | 1 | 0 | 1 | 1 | 1 | 0 | 0 |
| ADD TO MQ BW |  | 0 | 0 | 0 | 1 | 1 | 1 | 1 | 0 | 0 | 0 | 1 | 1 |
| ADD TO MQ 7N |  | 1 | 0 | 0 | 0 | 1 | 1 | 1 | 0 | 0 | 0 | 1 | 1 |
| ADD TO MQ 9 |  | 0 | 1 | 0 | 1 | 0 | 1 | 1 | 0 | 0 | 0 | 1 | 1 |
| DOUBLE ADD 7N |  | 1 | 0 | 0 | 0 | 1 | 1 | 1 | 0 | 1 | 0 | 1 | 0 |
| DOUBLE ADD 9M |  | 0 | 1 | 0 | 1 | 0 | 1 | 1 | 0 | 1 | 0 | 1 | 0 |
FIG.31A. INSTRUCTION DECODER
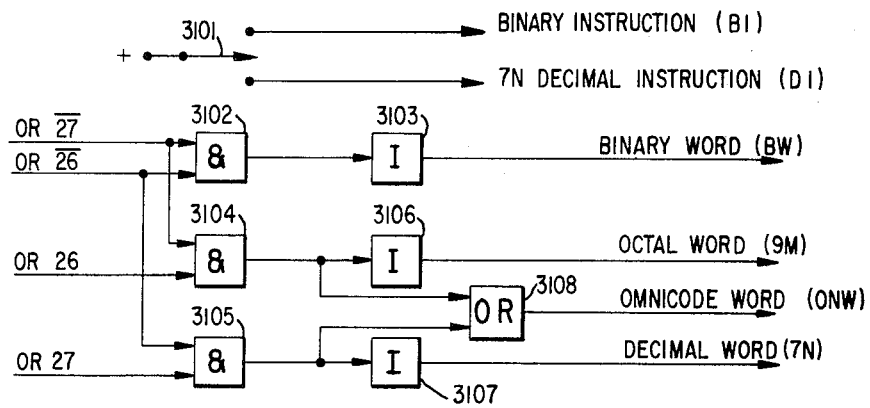

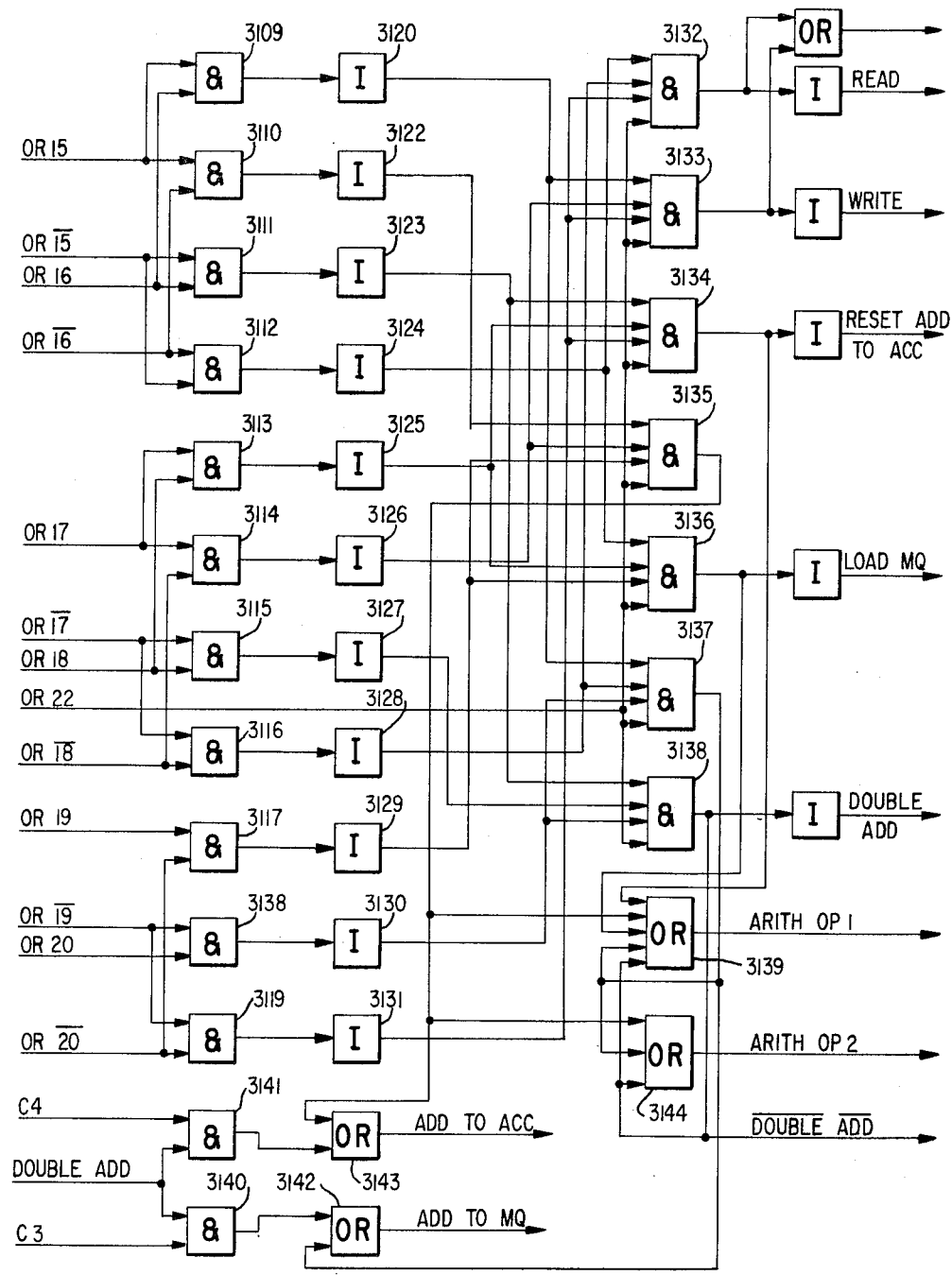
FIG. 31B. INSTRUCTION DECODER

Jan. 25, 1966      C. M. DAVIS ET AL      3,231,725
DATA PROCESSING SYSTEM WITH COMMON BUS MEANS
Filed April 3, 1961                         32 Sheets-Sheet 31

FIG. 32.   FEATURES AVAILABLE WITH OMNICODE
NOTE — VARIOUS DATA MODES AVAILABLE WITH OMNICODE ARE EXPLAINED IN TEXT

| FEATURE | VARIATION OF OMNICODE | | |
|---|---|---|---|
| | 6 Binary symbols per messa. | 7 Binary symbols per messa. | 8 Binary symbols per messa. |
| 1 Single error detection for data transmission | Decimal Alphameric Expanded alphameric Octal, Sexadecimal | Decimal Alphameric Expanded alphameric Octal, Sexadecimal | Decimal Alphameric Expanded alphameric Octal, Sexadecimal |
| 2 Single error correction for data transmission | | Decimal Alphameric Expanded alphameric Octal, Sexadecimal | Decimal Alphameric Expanded alphameric Octal, Sexadecimal |
| 3 Double error detection for data transmission | | | Decimal Alphameric Expanded alphameric Octal, Sexadecimal |
| 4 Single error detection for arithmetic operation | Decimal Octal | Decimal Octal | Decimal Octal |
| 5 Double error detection for arithmetic operation | | | |
| 6 Single error correction for arithmetic operation | | | |
| 7 Self-complementing feature for arithmetic operation -simple true-complement cont- | Decimal Octal Straight binary | Decimal Octal Straight binary | Decimal Octal Straight binary |
| 8 Common sign circuitry | Decimal Octal Straight binary | Decimal Octal Straight binary | Decimal Octal Straight binary |
| 9 Common overflow circuitry | Decimal Octal Straight binary | Decimal Octal Straiht binary | Decimal Octal Straight binary |
| 10 Common zero test circuitry | Decimal Octal Straight binary | Decimal Octal Straight binary | Decimal Octal Straight binary |
| 11 Common error detection or correction circuitry | Decimal Alphameric Expanded alphameric Octal, Sexadecimal | Decimal Alphameric Expanded alphameric Octal, Sexadecimal | Decimal Alphameric Expanded alphameric Octal, Sexadecimal |

| Character | MESSAGE | | | | | | | DISTANCES | | | | | | | | | | | | | | | | |
|---|---|---|---|---|---|---|---|---|---|---|---|---|---|---|---|---|---|---|---|---|---|---|---|---|
| | b5 | b4 | b3 | b2 | b1 | b0 | | 0 | 1 | 2 | 3 | 4 | 5 | 6 | 7 | 8 | 9 | | Z1 | Z2 | Z3 | Z4 | Z5 | Z6 |
| 0 | 0 | 0 | 0 | 0 | 0 | 0 | 0 | X | 3 | 3 | 3 | 3 | 3 | 3 | 3 | 3 | 6 | | 2 | 2 | 4 | 2 | 4 | 4 |
| 1 | 0 | 0 | 0 | 1 | 1 | 1 | 1 | 3 | X | 2 | 2 | 4 | 2 | 4 | 4 | 6 | 3 | | 3 | 3 | 3 | 3 | 3 | 3 |
| 2 | 0 | 0 | 1 | 1 | 1 | 0 | 2 | 3 | 2 | X | 4 | 2 | 4 | 2 | 6 | 4 | 3 | | 3 | 3 | 3 | 3 | 3 | 3 |
| 3 | 0 | 1 | 0 | 1 | 0 | 1 | 3 | 3 | 2 | 4 | X | 2 | 4 | 6 | 2 | 4 | 3 | | 3 | 3 | 3 | 3 | 3 | 3 |
| 4 | 0 | 1 | 1 | 1 | 0 | 0 | 4 | 3 | 4 | 2 | 2 | X | 6 | 4 | 4 | 2 | 3 | | 3 | 3 | 3 | 3 | 3 | 3 |
| 5 | 1 | 0 | 0 | 0 | 1 | 1 | 5 | 3 | 2 | 4 | 4 | 6 | X | 2 | 2 | 4 | 3 | | 3 | 3 | 3 | 3 | 3 | 3 |
| 6 | 1 | 0 | 1 | 0 | 1 | 0 | 6 | 3 | 4 | 2 | 6 | 4 | 2 | X | 4 | 2 | 3 | | 3 | 3 | 3 | 3 | 3 | 3 |
| 7 | 1 | 1 | 0 | 0 | 0 | 1 | 7 | 3 | 4 | 6 | 2 | 4 | 2 | 4 | X | 2 | 3 | | 3 | 3 | 3 | 3 | 3 | 3 |
| 8 | 1 | 1 | 1 | 0 | 0 | 0 | 8 | 3 | 6 | 4 | 4 | 2 | 4 | 2 | 2 | X | 3 | | 3 | 3 | 3 | 3 | 3 | 3 |
| 9 | 1 | 1 | 1 | 1 | 1 | 1 | 9 | 6 | 3 | 3 | 3 | 3 | 3 | 3 | 3 | 3 | X | | 4 | 4 | 2 | 4 | 2 | 2 |
| Z1 | 0 | 0 | 1 | 0 | 0 | 1 | Z1 | 2 | 3 | 3 | 3 | 3 | 3 | 3 | 3 | 3 | 4 | | X | 4 | 2 | 4 | 2 | 6 |
| Z2 | 0 | 1 | 0 | 0 | 1 | 0 | Z2 | 2 | 3 | 3 | 3 | 3 | 3 | 3 | 3 | 3 | 4 | | 4 | X | 2 | 4 | 6 | 2 |
| Z3 | 0 | 1 | 1 | 0 | 1 | 1 | Z3 | 4 | 3 | 3 | 3 | 3 | 3 | 3 | 3 | 3 | 2 | | 2 | 2 | X | 6 | 4 | 4 |
| Z4 | 1 | 0 | 0 | 1 | 0 | 0 | Z4 | 2 | 3 | 3 | 3 | 3 | 3 | 3 | 3 | 3 | 4 | | 4 | 4 | 6 | X | 2 | 2 |
| Z5 | 1 | 0 | 1 | 1 | 0 | 1 | Z5 | 4 | 3 | 3 | 3 | 3 | 3 | 3 | 3 | 3 | 2 | | 2 | 6 | 4 | 2 | X | 4 |
| Z6 | 1 | 1 | 0 | 1 | 1 | 0 | Z6 | 4 | 3 | 3 | 3 | 3 | 3 | 3 | 3 | 3 | 2 | | 6 | 2 | 4 | 2 | 4 | X |

FIG. 33.   OMNICODE DISTANCE CHART
6 BINARY SYMBOL VARIATION

FIG. 34. OMNICODE DISTANCE CHART 7 BINARY SYMBOL VARIATION

| Character | MESSAGE | | | | | | | DISTANCES | | | | | | | | | | | | | | | | | |
|---|---|---|---|---|---|---|---|---|---|---|---|---|---|---|---|---|---|---|---|---|---|---|---|---|---|
| | $b_5$ | $b_4$ | $b_3$ | $b_2$ | $b_1$ | $b_0$ | $c_1$ | | 0 | 1 | 2 | 3 | 4 | 5 | 6 | 7 | 8 | 9 | $Z_1$ | $Z_2$ | $Z_3$ | $Z_4$ | $Z_5$ | $Z_6$ |
| 0 | 0 | 0 | 0 | 0 | 0 | 0 | 1 | 0 | X | 4 | 3 | 3 | 4 | 3 | 4 | 4 | 3 | 7 | 3 | 3 | 4 | 3 | 4 | 4 |
| 1 | 0 | 0 | 0 | 1 | 1 | 1 | 0 | 1 | 4 | X | 3 | 3 | 4 | 3 | 4 | 4 | 7 | 3 | 3 | 3 | 4 | 3 | 4 | 4 |
| 2 | 0 | 0 | 1 | 1 | 1 | 0 | 1 | 2 | 3 | 3 | X | 4 | 3 | 4 | 3 | 7 | 4 | 4 | 4 | 4 | 3 | 4 | 3 | 3 |
| 3 | 0 | 1 | 0 | 1 | 0 | 1 | 1 | 3 | 3 | 3 | 4 | X | 3 | 4 | 7 | 3 | 4 | 4 | 4 | 4 | 3 | 4 | 3 | 3 |
| 4 | 0 | 1 | 1 | 1 | 0 | 0 | 0 | 4 | 4 | 4 | 3 | 3 | X | 7 | 4 | 4 | 3 | 3 | 3 | 3 | 4 | 3 | 4 | 4 |
| 5 | 1 | 0 | 0 | 0 | 1 | 1 | 1 | 5 | 3 | 3 | 4 | 4 | 7 | X | 3 | 3 | 4 | 4 | 4 | 4 | 3 | 4 | 3 | 3 |
| 6 | 1 | 0 | 1 | 0 | 1 | 0 | 0 | 6 | 4 | 4 | 3 | 7 | 4 | 3 | X | 4 | 3 | 3 | 3 | 3 | 4 | 3 | 4 | 4 |
| 7 | 1 | 1 | 0 | 0 | 0 | 1 | 0 | 7 | 4 | 4 | 7 | 3 | 4 | 3 | 4 | X | 3 | 3 | 3 | 3 | 4 | 3 | 4 | 4 |
| 8 | 1 | 1 | 1 | 0 | 0 | 0 | 1 | 8 | 3 | 7 | 4 | 4 | 3 | 4 | 3 | 3 | X | 4 | 4 | 4 | 3 | 4 | 3 | 3 |
| 9 | 1 | 1 | 1 | 1 | 1 | 1 | 0 | 9 | 7 | 3 | 4 | 4 | 3 | 4 | 3 | 3 | 4 | X | 4 | 4 | 3 | 4 | 3 | 3 |
| $Z_1$ | 0 | 0 | 1 | 0 | 0 | 1 | 0 | $Z_1$ | 3 | 3 | 4 | 4 | 3 | 4 | 3 | 3 | 4 | 4 | X | 4 | 3 | 4 | 3 | 7 |
| $Z_2$ | 0 | 1 | 0 | 0 | 1 | 0 | 0 | $Z_2$ | 3 | 3 | 4 | 4 | 3 | 4 | 3 | 3 | 4 | 4 | 4 | X | 3 | 4 | 7 | 3 |
| $Z_3$ | 0 | 1 | 1 | 0 | 1 | 1 | 1 | $Z_3$ | 4 | 4 | 3 | 3 | 4 | 3 | 4 | 4 | 3 | 3 | 3 | 3 | X | 7 | 4 | 4 |
| $Z_4$ | 1 | 0 | 0 | 1 | 0 | 0 | 0 | $Z_4$ | 3 | 3 | 4 | 4 | 3 | 4 | 3 | 3 | 4 | 4 | 4 | 4 | 7 | X | 3 | 3 |
| $Z_5$ | 1 | 0 | 1 | 1 | 0 | 1 | 1 | $Z_5$ | 4 | 4 | 3 | 3 | 4 | 3 | 4 | 4 | 3 | 3 | 3 | 7 | 4 | 3 | X | 4 |
| $Z_6$ | 1 | 1 | 0 | 1 | 1 | 0 | 1 | $Z_6$ | 4 | 4 | 3 | 3 | 4 | 3 | 4 | 4 | 3 | 3 | 7 | 3 | 4 | 3 | 4 | X |

| Character | MESSAGE | | | | | | | | DISTANCES | | | | | | | | | | | | | | | | |
|---|---|---|---|---|---|---|---|---|---|---|---|---|---|---|---|---|---|---|---|---|---|---|---|---|---|
| | $b_5$ | $b_4$ | $b_3$ | $b_2$ | $b_1$ | $b_0$ | $c_1$ | $c_2$ | | 0 | 1 | 2 | 3 | 4 | 5 | 6 | 7 | 8 | 9 | $Z_1$ | $Z_2$ | $Z_3$ | $Z_4$ | $Z_5$ | $Z_6$ |
| 0 | 0 | 0 | 0 | 0 | 0 | 0 | 1 | 1 | 0 | X | 4 | 4 | 4 | 4 | 4 | 4 | 4 | 4 | 8 | 4 | 4 | 4 | 4 | 4 | 4 |
| 1 | 0 | 0 | 0 | 1 | 1 | 1 | 0 | 1 | 1 | 4 | X | 4 | 4 | 4 | 4 | 4 | 4 | 8 | 4 | 4 | 4 | 4 | 4 | 4 | 4 |
| 2 | 0 | 0 | 1 | 1 | 1 | 0 | 1 | 0 | 2 | 4 | 4 | X | 4 | 4 | 4 | 4 | 8 | 4 | 4 | 4 | 4 | 4 | 4 | 4 | 4 |
| 3 | 0 | 1 | 0 | 1 | 0 | 1 | 1 | 0 | 3 | 4 | 4 | 4 | X | 4 | 4 | 8 | 4 | 4 | 4 | 4 | 4 | 4 | 4 | 4 | 4 |
| 4 | 0 | 1 | 1 | 1 | 0 | 0 | 0 | 1 | 4 | 4 | 4 | 4 | 4 | X | 8 | 4 | 4 | 4 | 4 | 4 | 4 | 4 | 4 | 4 | 4 |
| 5 | 1 | 0 | 0 | 0 | 1 | 1 | 1 | 0 | 5 | 4 | 4 | 4 | 4 | 8 | X | 4 | 4 | 4 | 4 | 4 | 4 | 4 | 4 | 4 | 4 |
| 6 | 1 | 0 | 1 | 0 | 1 | 0 | 0 | 1 | 6 | 4 | 4 | 4 | 8 | 4 | 4 | X | 4 | 4 | 4 | 4 | 4 | 4 | 4 | 4 | 4 |
| 7 | 1 | 1 | 0 | 0 | 0 | 1 | 0 | 1 | 7 | 4 | 4 | 8 | 4 | 4 | 4 | 4 | X | 4 | 4 | 4 | 4 | 4 | 4 | 4 | 4 |
| 8 | 1 | 1 | 1 | 0 | 0 | 0 | 1 | 0 | 8 | 4 | 8 | 4 | 4 | 4 | 4 | 4 | 4 | X | 4 | 4 | 4 | 4 | 4 | 4 | 4 |
| 9 | 1 | 1 | 1 | 1 | 1 | 1 | 0 | 0 | 9 | 8 | 4 | 4 | 4 | 4 | 4 | 4 | 4 | 4 | X | 4 | 4 | 4 | 4 | 4 | 4 |
| $Z_1$ | 0 | 0 | 1 | 0 | 0 | 1 | 0 | 0 | $Z_1$ | 4 | 4 | 4 | 4 | 4 | 4 | 4 | 4 | 4 | 4 | X | 4 | 4 | 4 | 4 | 8 |
| $Z_2$ | 0 | 1 | 0 | 0 | 1 | 0 | 0 | 0 | $Z_2$ | 4 | 4 | 4 | 4 | 4 | 4 | 4 | 4 | 4 | 4 | 4 | X | 4 | 4 | 8 | 4 |
| $Z_3$ | 0 | 1 | 1 | 0 | 1 | 1 | 1 | 1 | $Z_3$ | 4 | 4 | 4 | 4 | 4 | 4 | 4 | 4 | 4 | 4 | 4 | 4 | X | 8 | 4 | 4 |
| $Z_4$ | 1 | 0 | 0 | 1 | 0 | 0 | 0 | 0 | $Z_4$ | 4 | 4 | 4 | 4 | 4 | 4 | 4 | 4 | 4 | 4 | 4 | 4 | 8 | X | 4 | 4 |
| $Z_5$ | 1 | 0 | 1 | 1 | 0 | 1 | 1 | 1 | $Z_5$ | 4 | 4 | 4 | 4 | 4 | 4 | 4 | 4 | 4 | 4 | 4 | 8 | 4 | 4 | X | 4 |
| $Z_6$ | 1 | 1 | 0 | 1 | 1 | 0 | 1 | 1 | $Z_6$ | 4 | 4 | 4 | 4 | 4 | 4 | 4 | 4 | 4 | 4 | 8 | 4 | 4 | 4 | 4 | X |

FIG. 35. OMNICODE DISTANCE CHART 8 BINARY SYMBOL VARIATION

3,231,725
DATA PROCESSING SYSTEM WITH COMMON BUS MEANS
Claud M. Davis, Poughkeepsie, N.Y., John A. de Veer, Lexington, Mass., and John E. MacDonald, Jr., Champaign, Ill., assignors to International Business Machines Corporation, New York, N.Y., a corporation of New York
Filed Apr. 3, 1961, Ser. No. 100,188
32 Claims. (Cl. 235—153)

This invention relates to coding apparatus and more especially to coding apparatus which has particular usefulness in electronic computation.

The invention should have particular application in computation devices which are designed to operate in any one of several data modes. Various devices have been proposed in the prior art for performing arithmetic operations and for transmitting data in any one of a plurality of data modes, however, the present invention goes one step beyond to also provide checking and correction features.

The diverse applications of modern day data processing systems have very often necessitated the development of special purpose machines whose maximum efficiency can only be realized in limited areas. For example, in scientific research there is usually a large amount of internal information processing per unit of input data, with relatively little input and output therefrom. Such operations are best performed using data encoded in binary fashion, for reasons well known in the art. However, in commercial applications of computers, there is a tremendous quantity of external data input and output which is naturally available in decimal form, whereas only a small amount of internal processing per unit data is required. High speed is therefore not the prime requirement, but rather, reliability as insured by checking procedures and circuits. Therefore, machines especially built for scientific usage are not necessarily fully compatible with commercial requirements, and vice versa. It consequently seems desirable to design a general purpose system which can process data encoded in any one of a number of ways, using common circuitry throughout. This invention provides novel means for accomplishing these functions.

In any data processing machine, the general operations of data transmission, arithmetic processing, and control are necessary. Previous art has dealt with error detection and error correction for the data transmission portion only of the data processing. Other prior art in data processing, has provided both binary and decimal arithmetic modes in a single machine. These machines have had the disadvantage of being either unchecked, that is, not error detected or corrected, or the disadvantage of using completely distinct or separate arithmetic process units for each data mode.

Other prior art has specified a means of error detecting arithmetic processes in the binary mode, as for example, the parity prediction technique referred to in the book by R. K. Richards, "Arithmetic Operations in Digital Computers." Additional prior art has provided means for error detecting decimal arithmetic processes by modular arithmetic checks. These latter two schemes possess the disadvantage that a single fault in the arithmetic processor very often leads to an error condition, which is not detected by the schemes. Other attempts have been made in the prior art to develop coding schemes which provide complementary characteristics, such as the "Excess Three" code, but codes of this nature, generally, have not possessed error detecting or correcting characteristics.

Therefore, an object of the invention is to provide an improved code for accomplishing detection and correction of errors in data processing and data transmission operations.

Another object of the invention is to provide computing apparatus which detects errors occurring during arithmetic oerations or transmission of data.

A further object of the invention is to provide an improved code and associated apparatus for detection of errors and correction of errors in data processing and data transmission.

A further object of the invention is to provide an improved code and associated apparatus for processing data in any one or several of a plurality of modes.

A further object of the invention is to provide an improved code and associated apparatus which may operate in data modes suitable for scientific or engineering purposes as well as data modes which are suitable for commercial purposes.

An additional object of the invention is to provide an improved code and associated apparatus for processing data in unchecked modes as well as checked modes.

An additional object of the invention is to provide an improved code and associated apparatus wherein data may be processed in a plurality of modes utilizing common equipment.

An additional object is to provide apparatus having equipment common to a plurality of data modes, which has improved facilities for fault diagnosis.

Another object of the invention is to provide a code and associated apparatus wherein the functions of error detection and correction are performed in an efficient manner and wherein the equipment necessary for performing these functions has been minimized.

A further object of the invention is to provide a code and associated apparatus for performing detection and correction of errors during data processing and transmission, and which may operate in a plurality of data modes, and wherein the various modes may, to a certain extent, be intermixed and used in a random manner.

An additional object of the invention is to provide a basic code and associated apparatus for performing error detection and error correction functions, and which may be expanded in order to increase the degree of detection and correction accomplished, but wherein the basic code and apparatus remains unchanged, regardless of the degree or extent of expansion.

A further object of the invention is to provide apparatus in which data may be processed in any one of a plurality of modes and wherein common error detection and error correction circuitry is provided for many of the modes.

An additional object of the invention is to provide an improved code and associated apparatus which may operate in a plurality of data modes, and wherein common sign circuitry is provided for all modes.

An additional object of the invention is to provide an improved code and associated apparatus which may operate in a plurality of modes, and wherein common adder circuitry is provided for all modes.

Another object of the invention is to provide an improved code and associated apparatus which may operate in a plurality of data modes, and wherein common overflow circuitry is provided for all data modes.

An additional object of the invention is to provide an improved code and associated apparatus which has a self complementing characteristic.

In accomplishing the foregoing objects of the invention, an improved code and associated apparatus are provided which utilizes a basic set of data representing messages, and wherein, respective ones of a plurality of data modes are established by operating with particular sub sets of the basic set of messages.

In addition, an improved code and associated apparatus are provided wherein a set of basic data representing messages may be expanded for error detection and error correction purposes, and wherein, the respective basic messages when used in arithmetic operations, yield resultant basic messages.

In addition, an improved code and apparatus are provided wherein data is processed and transmitted in a plurality of data modes, which has common arithmetic circuitry for all modes, common error detection and error correction circuitry for many of the modes, and common transmission media for all modes.

The foregoing and other objects, features and advantages of the invention will be apparent from the following more particular description of preferred embodiments of the invention, as illustrated in the accompanying drawings.

In the drawings:

FIGURES 1A and 1B disclose a generalized block diagram showing the major components in the system and the data flow paths;

FIGURES 2a, 2b, 2c, and 2d disclose various logical circuits used in the remaining figures;

FIGURES 3a and 3 disclose another logical circuit;

FIGURES 4A, 4B, 4C, and 4D show details of the storage register;

FIGURE 5 shows the accumulator;

FIGURE 6 shows the MQ register;

FIGURE 7 shows the operation register;

FIGURE 8 shows the address counter;

FIGURE 9 shows the location register;

FIGURE 10 shows the address register;

FIGURE 11a shows gating to the storage bus;

FIGURE 11b shows gating from the storage register to the output device;

FIGURES 12A and 12B show one embodiment of the adder;

FIGURES 13A and 13B show another embodiment of the adder;

FIGURE 14 shows one binary stage of the adder;

FIGURE 15 shows the error detector-corrector;

FIGURE 16 shows logic for an exclusive OR gate;

FIGURE 17 shows the C ring;

FIGURE 18 shows the M ring;

FIGURE 19 shows the A ring;

FIGURE 20 shows the CA ring;

FIGURES 21A and 21B show the AT ring;

FIGURE 22 shows the I/O ring;

FIGURE 23 shows various control circuitry;

FIGURE 24 shows the address counter count controls;

FIGURE 25 shows error detector-corrector control circuitry;

FIGURE 26 shows gating circuitry;

FIGURE 27 shows reset circuits;

FIGURE 28 shows the storage register shift controls;

FIGURE 29 shows storage register control circuits;

FIGURE 30 shows the instruction codes;

FIGURES 31A and 31B show the instruction decoder;

FIGURE 32 is a chart showing the features available with omnicode;

FIGURE 33 shows the omnicode distance chart—six binary symbol variation;

FIGURE 34 shows the omnicode distance chart—seven binary symbol variation; and

FIGURE 35 shows the omnicode distance chart—eight binary symbol variation.

INTRODUCTION

An encoding and decoding scheme has been devised which exhibits tremendous flexibility for handling binary, decimal, and alphameric data both for data transmission and for arithmetic operations. The range of optional features is tabulated in FIGURE 32. The outstanding advantage of the coding method and system to be described is that any of the data modes can use the same detector (6 binary symbols per message), the same corrector (7 binary symbols per message), and the same binary adder. Another major advantage is simple true-complement control for arithmetic processes. Of course, if it is acceptable to process binary data without any error detection or error correction, this mode will utilize the same binary adder as any of the other modes.

All of the data modes which may be used utilize some or all of a basic set of 16 messages. For the 6 binary symbol variation, these 16 messages have a minimum distance of 2 and hence single error detection is available for data transmission. For the 7 binary symbol variation, the 16 messages have a minimum distance of 3 and hence single error correction is available for data transmission. For the 8 binary symbol variation, the 16 messages have a minimum distance of 4 and hence single error correction plus double error detection are available for data transmission. "Distant" refers to the number of changes in binary bit positions between any two messages. In FIGURE 33, for example, referring to the characters 3 and 7, note that only binary bit positions $b_2$ and $b_5$ are different, i.e., the distance from character 3 to character 7 is 2. The 7 binary symbol and 8 binary symbol variations are intimately related to Hamming codes and hence are optimal codes in terms of probability of correct transmission. However, they differ from the Hamming codes in the following respects: the order of the symbols is so chosen as to permit error detection of the sum output of a 6 digit binary adder whose inputs are coded decimal or coded octal numbers; the order of the symbols is so chosen as to simplify handling of negative numbers; the error detection or correction circuitry can take forms not immediately implied by the Hamming configuration.

The actual code utilized for checked decimal numbers, hereinafter called 7N, is shown in FIGURES 33, 34, 35 for 6, 7, or 8 binary symbols respectively. Also shown in these figures are the distances from any message to any other message. For decimal numbers refer only to the upper portion of the message code column (0 through 9) and the upper left portion of the distance chart (0 through 9). The term 7N is derived from the fact that the code for a decimal digit N is the binary number "7 times N." For example, for the decimal digit 3 we have $7 \times 3 = 21$ and the code for 3 is seen from FIGURE 33 to be $16 + 4 + 1 = 21$.

We have referred to the decimal mode as 7N. In a similar fashion we could refer to the octal code as, say, 9M where M is any octal digit ($M = 0, 1, 2, 3, 4, 5, 6, 7$). For example, $9 \times 5 = 45$ and the message for the octal digit 5 is 101101, which is the binary representation for 45. The octal code uses a subset of 8 of the 16 basic messages referred to previously. This subset of 8 has been given different names in the 7N and the 7N alphameric codes. To clarify, the octal code is given below in Table I along with the previous names:

*Table I*

| Octal Number | Message | | | | | | | | 7N Message name |
|---|---|---|---|---|---|---|---|---|---|
| | $b_5$ | $b_4$ | $b_3$ | $b_2$ | $b_1$ | $b_0$ | $c_1$ | $c_2$ | |
| 0 | 0 | 0 | 0 | 0 | 0 | 0 | 0 | 0 | 0 |
| 1 | 0 | 0 | 1 | 0 | 0 | 1 | 1 | 1 | Z1 |
| 2 | 0 | 0 | 1 | 0 | 1 | 0 | 1 | 1 | Z2 |
| 3 | 0 | 1 | 1 | 0 | 1 | 1 | 1 | 0 | Z3 |
| 4 | 1 | 0 | 0 | 1 | 0 | 0 | 1 | 1 | Z4 |
| 5 | 1 | 0 | 1 | 1 | 0 | 1 | 0 | 0 | Z5 |
| 6 | 1 | 1 | 0 | 1 | 1 | 0 | 0 | 0 | Z6 |
| 7 | 1 | 1 | 1 | 1 | 1 | 1 | 0 | 1 | 9 |

We have adopted the term octal to remind the reader that there are effectively 3 information digits to each message. Of course, the octal mode is equivalent to binary mode wherein we can provide single error detection per three binary digits or per octal digit. The octal mode is about as efficient as two separate adders as far as error detection is concerned. Its great advantage is that we may use the same detectors or correctors as are used in the checked decimal, or pure binary modes.

All checked data modes of the code (decimal and octal) make use of this basic relation: a message is composed of six binary symbols designated as $b_0$, $b_1$, $b_2$, $b_3$, $b_4$, and $b_5$ with the following restraint:

$$b_0 \dotplus b_3 = b_1 \dotplus b_4 = b_2 \dotplus b_5$$

(The symbol $\dotplus$ means sum modulo two.) For single error detection the functions $$b_0 \dotplus b_3, \; b_1 \dotplus b_4, \; b_2 \dotplus b_5$$

are formed and the outputs compared. Lack of unanimous agreement of these outputs occurs for all single errors and for twelve of the fifteen possible double errors. Included in the twelve detectable double errors are all five of the double errors in adjacent binary symbols. Of the twenty possible triple errors, twelve are detected.

Single error correction can be realized by the addition of a seventh binary symbol ($c_1$). The symbol $c_1$ is specified by the equation:

$$c_1 = b_0 \dotplus b_1 \dotplus b_2 \dotplus 1$$

Since three sum modulo two functions are utilized $$(\text{i.e., } b_0 \dotplus b_3; \; b_1 \dotplus b_4; \; b_2 \dotplus b_5)$$

there are eight possible patterns for the outputs of these functions. Two represent correct data for the $b-$ symbols (000 or 111), and the other six each indicate a single error in a particular $b-$ symbol.

It is also interesting to note that for the 7N code the decimal numbers 1 through 8 have the weight three. (The weight of a binary sequence is defined as a count of the number of "ones" in the sequence.) These eight numbers are the only weight three numbers that satisfy the other condition for 7N code:

$$b_0 \dotplus b_3 = b_1 \dotplus b_4 = b_2 \dotplus b_5$$

The numeric zero (7N) has a weight zero and the numeric nine (7N) has weight six. A modulo three weight counter could be useful in single error detection of 7N coded decimal by counting weight modulo three of a message and testing for zero. This actually tests for all errors which change the weight of the message in increments other than zero, three, or six.

The same conditions which indicate a binary overflow also indicate decimal overflow or octal overflow if the signs of the addend and augend are represented by binary symbols, the plus sign as a "zero" and negative sign a "one." Add the signs through a binary adder which accepts the carry out of the high order stage as sign stage carry in. With true add for addition and complement add for subtraction, disagreement between carry in and carry out of the sign position indicates an overflow. Since a binary carry out implies and is implied by a decimal carry out, the circuitry necessary to sense binary-overflow can be used to detect decimal overflow with no changes. A similar remark applies to the octal mode.

DESCRIPTION OF FIGURES

Referring now to FIGURE 1, a simplified 3-mode computer is depicted, which incorporates the basic features of the present invention. The system is comprised of various modular units and has provision for data storage and arithmetic operation besides containing certain error detection and correction circuitry. Fixed length instruction words of 24 information bits plus a sign bit are utilized, with both data transmission and arithmetic operations being performed in parallel. Both instructions and data may be represented by a pure binary code, or they may be represented by the 7N omnicode previously described. In the former case, the 24 information bits comprising a word have binary order significance. In the latter case the 24 information bits are divided into groups of 6 bits with each group having a decimal order significance. The 6 bits comprising a group may form any one of ten combinations such as previously described in connection with the 7N omnicode analysis. In addition to the two modes of operation so far described, data may also be represented in the 9M omnicode which is, in numerical content, equivalent to the octal coding system as previously described. In this case the 24 information bits comprising a data word are also divided into groups of six, with each group representing one of the eight octal digits. In any of three modes, the 25th information bit represents the sign of either the instruction or the data and has no coding significance except that the absence of a bit indicates plus while the presence of a bit indicates minus. In the present embodiment, all instruction words which are stored within the machine must be in the same mode, while data words may be represented by any of the three codes.

Figure 4B:
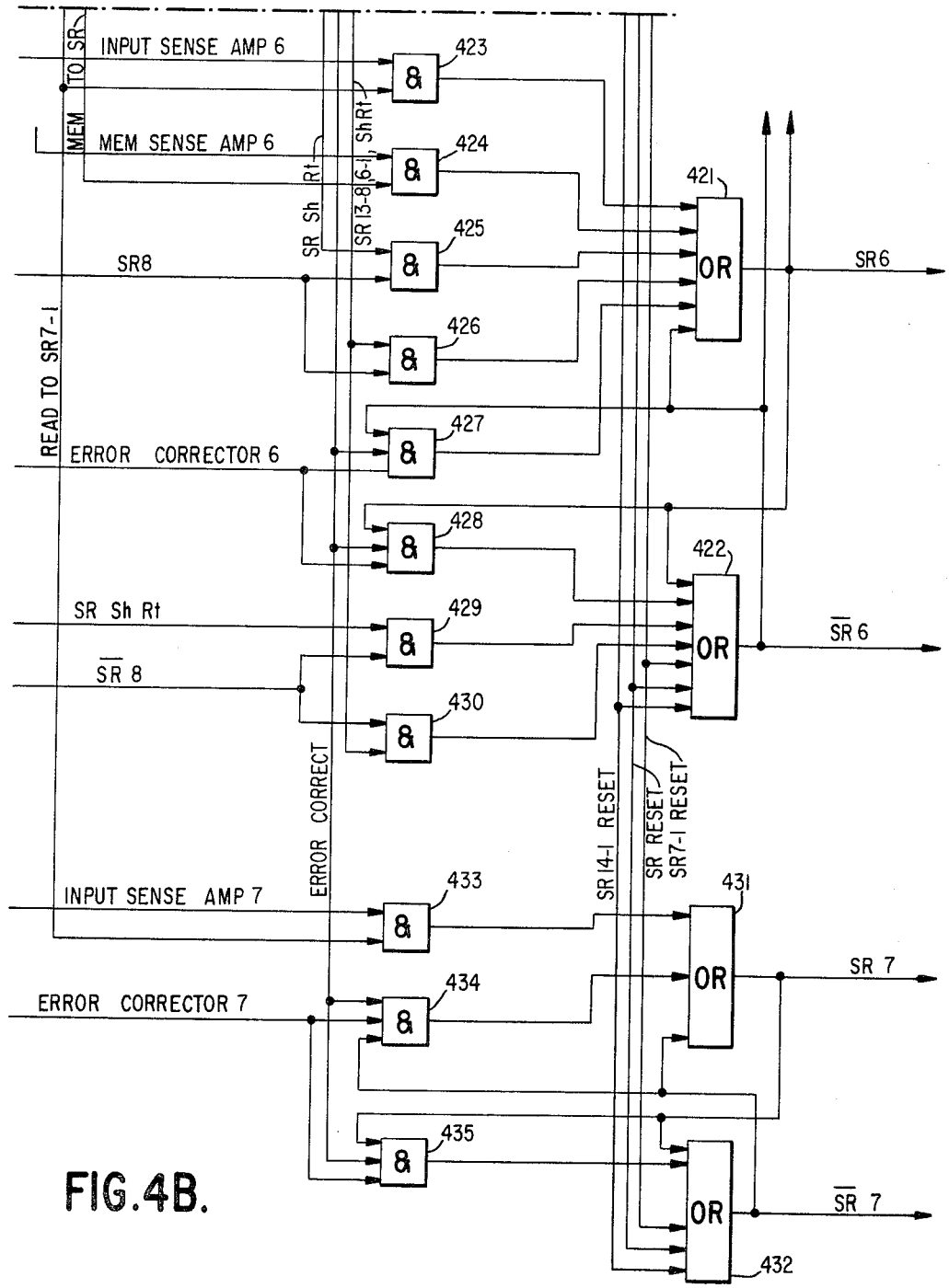

Both instruction and data words may be transferred between a MEMORY 103 and an INPUT-OUTPUT DEVICE 102 via a STORAGE REGISTER 101 which acts as a buffer register and aids in correcting any such information which might be mutilated due to this particular transmission path. Although transmission generally within the machine is parallel by information bit, such that all 25 bits of a fixed length word are transferred simultaneously, transmission between the INPUT-OUTPUT DEVICE 102 and STORAGE REGISTER 101 is serial by character. A character contains 6 information bits and one checking bit which are transmitted simultaneously. The procedure is such that STORAGE REGISTER 101 may be initially filled by the sequential reading of four characters plus sign by the INPUT-OUTPUT DEVICE 102, after which the 24 information bits plus sign are transferred in parallel to the proper location in MEMORY 103. Since each character obtained from the INPUT-OUTPUT DEVICE 102 contains 6 information bits plus a checking bit, STORAGE REGISTER 101 must provide four extra bit storage units in order to contain the checking bits associated with four of the characters. These four extra locations are designated 7, 14, 21 and 28 in FIGURE 1. Prior to the transmission of the information bits to memory, an ERROR DETECTOR-CORRECTOR 104 samples all 28 positions of the storage register, excluding the sign, in order to insure that all single errors in each of the four characters held in the storage register may be corrected if the word is coded in either one of the two 7N or 9M omnicodes. However, if the coding of the word is in straight binary, operation of ERROR DETECTOR-CORRECTOR 104 will not occur. The 24 information bits plus sign are then transferred from STORAGE REGISTER 101 in parallel fashion to MEMORY 103. MEMORY 103 may be a three dimensional core memory having 25 X x Y planes with one such plane for each information bit of a word. This technique is well known in the art and will not be further elaborated. Conversely, if it is desired to transmit information from memory to the INPUT-OUTPUT DEVICE 102, a 25 information bit word is initially transferred to STORAGE REGISTER 101 where it resides in locations 1–6, 8–13, 15–20, 22–27 and S. The ERROR-DETECTOR-CORRECTOR 104 is then utilized to test the four characters for error, and if no error exists, then to generate four check bits for this word and place them in locations 7, 14, 21, and 28 each of which is associated with 6 information bits. Seven bit characters may now be withdrawn from STORAGE REGISTER 101 in sequence and transmitted to the INPUT-OUTPUT DEVICE 102 where they may be inscribed on magnetic tape or some other such permanent storage medium.

In the performance of arithmetic operations within the present simplified computing system, use is made of an ADDER 106, an ACCUMULATOR REGISTER 107, and MQ REGISTER 108, an OPERATION REGISTER 109, an ADDRESS COUNTER 110, a LOCATION REGISTER 113, and an ADDRESS REGISTER 112. LOCATION REGISTER 113 contains a 12 information bit address in stages 1-6 and 8-13 which gives the location in memory of the next instruction to be performed. The LOCATION REGISTER 113 also may hold 3 extra information bits in locations 15, 16 and 17 for use as a check which will subsequently be described. The transfer of the 12 information bits from LOCATION REGISTER 113 down to ADDRESS COUNTER 110 is performed whereupon this address is transferred in parallel to corresponding positions in the ADDRESS REGISTER 112. From thence, the 12 information bit address is used to select one instruction word location in MEMORY 103 in the well known fashion. ADDRESS COUNTER 110 is also stepped so as to change this address into the address of the next following instruction, and the modified address from the address counter is placed back into LOCATION REGISTER 113. An instruction is now withdrawn from MEMORY 103 and transmitted to STORAGE REGISTER 101 where it occupies positions 1-6, 8-13, 15-20 and 22-7, and the sign position. From there, the instruction is transferred to the OPERATION REGISTER 109 and ADDRESS COUNTER 110 via the ADDER 106. If the instruction is coded in the binary system, then the left-hand 13 information bits represent the operation code and are placed in locations 15-20, 22-27, and S of OPERATION REGISTER 109. The 12 right-hand information bits represent the address of the data word upon which an operation is to be performed, and consequently occupy positions 1-6, 8-13 of ADDRESS COUNTER 110. The data address is then transferred to the ADDRESS REGISTER 112 from ADDRESS COUNTER 110 where it is used to withdraw the data word from memory. However, if the instruction is represented in the 7N omnicode, certain operations must be performed prior to the transfer from the address counter to the address register of the data address. Since 12 information bits in the 7N code may only represent two decimal orders, it is seen that only 100 memory locations may be represented by 12 information bits as opposed to a total of 4,096 memory locations being represented by 12 binary bits. In order to retain the same memory capacity when instructions are coded in the 7N omnicode, it is therefore necessary to withdraw two—25 bit instruction words in sequence from MEMORY 103. The first such instruction word contains only the operation code as represented by the 13 left-hand information bits, which in the 7N omnicode may represent 200 different operations. This instruction word is placed into the operation register and the address counter as previously described. Thereafter, the second instruction word is withdrawn from memory which indicates the address of the data word. Since the second instruction word also contains 24 information bits plus sign bit, it may be broken into four decimal digits represented by 6 bits each in 7N omnicode and thus is able to utilize the full capacity of memory as was previously done by 12 binary bits. This second instruction word is also transferred initially to STORAGE REGISTER 101. Since ADDRESS COUNTER 110 has but 12 information bit storage units, it is therefore necessary to translate the 24 bits in STORAGE REGISTER 101 into a 12 bit binary number which may subsequently be placed into the ADDRESS COUNTER 110 and from there into ADDRESS REGISTER 112. This operation will be subsequently described in detail.

When the data word is withdrawn from MEMORY 103 it is also initially transferred to STORAGE REGISTER 101 for use in arithmetic operations if this be required by the operation portion of the instruction word residing in OPERATION REGISTER 109. The simplified system of FIGURE 1 may perform the following arithmetic operations:

(1) Reset-add to accumulator
(2) Add to accumulator
(3) Load MQ
(4) Add to MQ
(5) Double add The operation reset-add to accumulator requires that the ACCUMULATOR REGISTER 107 be emptied of any previous contents and the data word held in STORAGE REGISTER 101 placed therein. A similar operation is required with the instruction load MQ except that the MQ REGISTER 108 is emptied and the data word placed therein. To accomplish these functions, the appropriate one of these two registers is cleared and then added to the contents of STORAGE REGISTER 101 by means of ADDER 106, with the sum thereupon being placed back into the proper register. The instructions add to accumulator and add to MQ are similar except that the appropriate register is not reset before the addition is performed. In the event that the data word in STORAGE REGISTER 101 and the contents of the appropriate register 107 or 108 is coded in binary fashion, then the sum appearing from ADDER 106 is a valid code combination and no further steps need be taken. However, if the data to be added together is represented by either the 7N or the 9M code, then an extra step is required in order that the sum be represented by a valid code combination.

As noted previously, the present embodiment of the invention utilizes a magnetic core memory wherein read-out therefrom is destructive of the information stored at the particular location as is customary with such storage medium. It is therefore necessary to regenerate information thus read from memory in most cases whenever it is desired that the information be retained by memory while it is being manipulated through the arithmetic unit. As described heretofore, all information read from memory is first transmitted to the STORAGE REGISTER 101 before being utilized in either an arithmetic operation or in a write operation to INPUT-OUTPUT DEVICE 102. At the latter part of the memory cycle, therefore, the information thus read from MEMORY 103 is transmitted from STORAGE REGISTER 101 back into MEMORY 103 via inhibit windings such as are customarily found in core memories known to the prior art. Information is transmitted from STORAGE REGISTER 101 to the storage bus during this operation where it is also monitored by the ERROR DETECTOR-CORRECTOR circuit 104. However, inasmuch as no correction bits are stored within MEMORY 103 associated with information contained therein, unit 104 can not accomplish single error correction but must be satisfied with only detecting single errors and alerting the system that such are present. Furthermore, at the conclusion of an addition operation when the sum resides in either the MQ register or the accumulator register, the sum is also transmitted to the storage bus and monitored by the ERROR DETECTOR-CORRECTOR 104 in order to determine if all sum digits are represented by valid combinations in either the 7N or the 9M code. Such monitoring by the ERROR DETECTOR-CORRECTOR 104 does not occur whenever the data being processed is represented by a pure binary code.

In the operation double add, it is assumed that the data being processed is represented by one of the two omnicode configurations. In such a case, a 24 information bit data word when broken into four groups of 6 information bits each may only represent a 4 digit number. Since a pure binary number comprising 24 information bits represents an 8 digit decimal number, it is seen that two data words are required for an omnicode mode in order to attain the same capacity as may be represented by a single data word expressed in pure binary notation. Therefore, the arithmetic operation of double add is provided to allow two successive data words from memory to be sequentially added to the MQ register and to the accumulator register in that order so as to attain an 8 digit sum result. This DOUBLE ADD operation may also be provided for the pure binary mode. ACCUMULATOR REGISTER 107 is also provided with an additional decimal or octal portion consisting of information bit storage units 29–34 so as to provide for an overflow indication in the event that the addition of two 8 digit numbers results in a 9 digit sum.

FIGURES 2 and 3 of the drawings disclose the circuit details of several logical blocks shown in the remainder of the figures. FIGURE 2a shows the symbol for a logical AND circuit having three inputs and one output. In this particular embodiment, the presence of information bits at the input terminals is signified by a positive level, represented by the plus sign, while the output in response to the presence of positive signals at all inputs is considered to be at a lower or negative potential represented by the minus sign. FIGURE 2b shows the symbol for a logical OR circuit wherein the presence of a negative or minus signal at any one of the inputs results in a plus signal being generated at the output. FIGURE 2c shows the symbol for an inverting circuit wherein the output of potential is phase shifted 180° from the potential appearing as the input. The same electrical circuit may be utilized for all three of the logical blocks shown in FIGURES 2a, 2b, 2c. This circuit is disclosed in FIGURE 2d, and consists of a PNP transistor having a ground emitter with its collector connected to a resistor 202 to a negative potential. One or more input terminals are coupled to the transistor base by means of resistors 203–205. The input signal levels are approximately 0 volt down to 7–12 volts below ground. In the event that any one of the input terminals is held to the negative potential, the base potential of transistor 201 will be substantially below that of its emitter so that conduction through the transistor is fairly heavy and thus raises the potential of its collector because of the collector resistor 202. However, if all potentials applied to the input terminals rise to the 0 volt level, then conduction through 201 decreases and thus lowers the collector potential. It may therefore be seen that the function of the transistor circuit is that of either an AND gate, an OR gate, or an INVERTER gate in accordance with the definitions given in connection with FIGURES 2a, 2b and 2c. The INVERTER gate of FIGURE 2c is actually the circuit of FIGURE 2d having but one input terminal.

FIGURE 3 shows a gated sample pulse generator which is used in the address counter portion of the present embodiment. If a positive potential is applied to the gate input of the unit shown in FIGURE 3a, a subsequent POSITIVE GOING SIGNAL applied to the set input results in a POSITIVE GOING OUTPUT SIGNAL. The detailed construction of this gated sample pulse generator is shown in FIGURE 3b and consists of transistors 301 and 302 coupled so that each phase inverts an input signal applied to its respective base. In operation, a D.C. signal applied to the gate input raises the bias level of the base of transistor 301 so that a subsequent POSITIVE GOING SIGNAL at the set input may substantially reduce conduction therethrough so as to result in a decreased voltage across the inductor. This is applied to the base of transistor 302 thus promoting increased conduction therethrough and thus increasing its collector voltage to generate a POSITIVE OUTPUT SIGNAL. Only if positive D.C. voltage is applied to the gate input will the SET SIGNAL be effective in generating an OUTPUT SIGNAL from the circuit.

The detailed circuit diagrams of FIGURES 2 and 3 are merely representative of structure which may be utilized in the present embodiment of the invention, but which should not be construed as a limitation of the inventive concepts before and after to be described in the specification and claims.

Figure 4D:
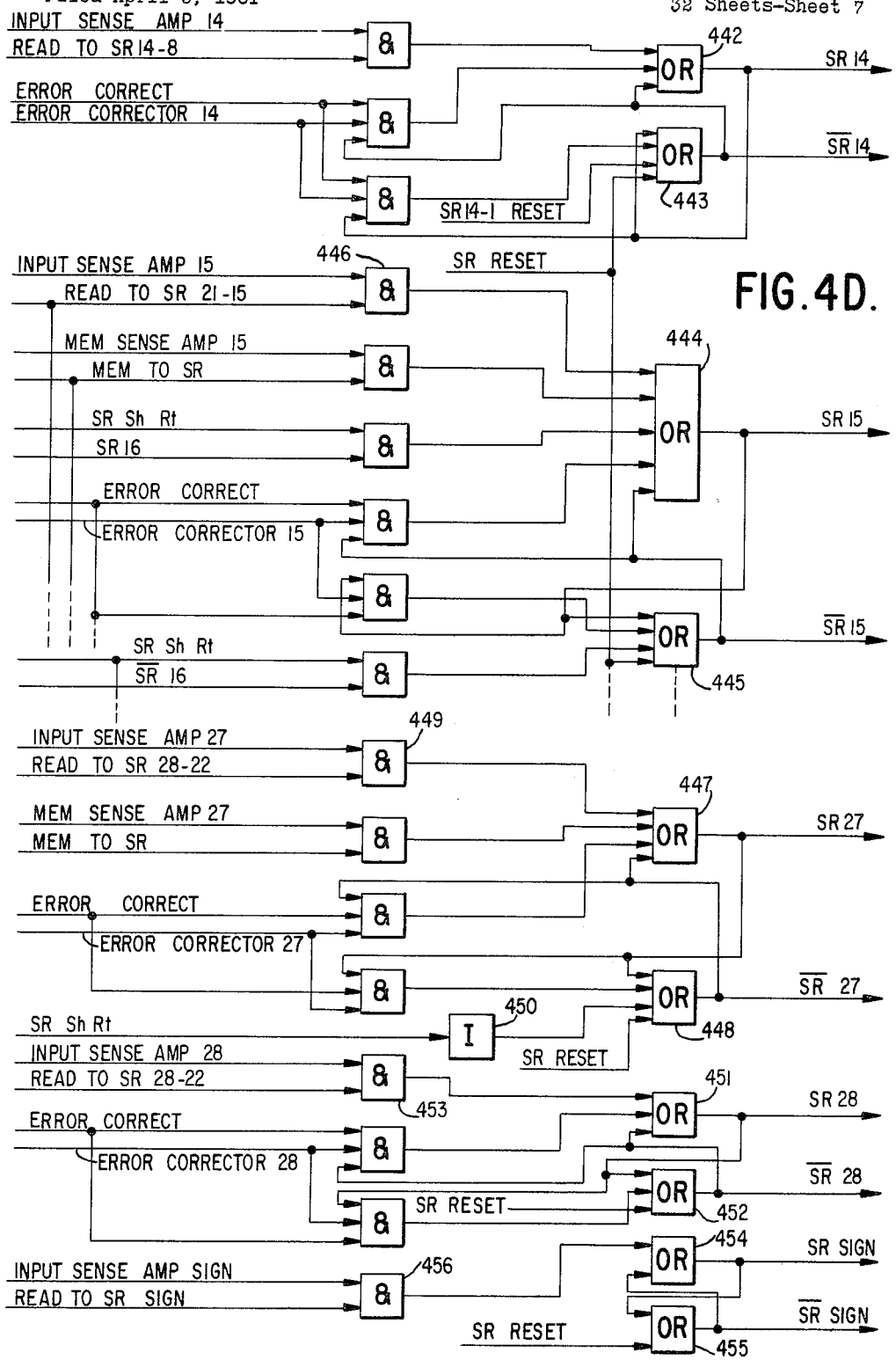

FIGURE 4 discloses the construction of the storage register through which all instruction and data word information to and from memory must be transferred. As previously noted, the storage register in the present embodiment comprises 28 information bit storage units plus a sign bit storage unit for a total of 29 stages. These stages are numbered consecutively 1 through 28, and S for sign. Although the instruction and data words actually manipulated within the computing system consist of but 24 information bits plus sign, the inclusion of stages 7, 14, 21 and 27 within the storage register provides for storage of the correction bits associated wtih each 6 bit character as it is derived from the INPUT-OUTPUT DEVICE 102. Where a data word is represented in the binary mode, stages 1 through 6, 8 through 13, 15 through 20, and 22 through 27 will contain the binary information bits with stage 1 representing the lowest binary order. Where data is represented in the decimal 7N mode, stages 1 through 6 contain 6 bits whose combination represents the lowest order decimal digit, while the groups of stages 8 through 13, 15 through 20, and 22 through 27 hold combinations of bits representing, respectively, the three highest decimal digits. The 7N code combination for each of the ten decimal digits are made up as previously described on page 8 and shown in FIGURE 33. When data is represented in the octal mode, the storage register stages 1–6, 8–13, 15–20, and 22–27 also hold four octal digits with each digit composed of 6 bits arranged as indicated in Table 2.

In FIGURE 4, each information bit stage consists of two OR gates cross-coupled in the manner indicated by OR gates 401 and 402. The operation of such a bit storage unit is as follows: a negative signal applied to any one of the inputs to OR gate 401 will generate a positive signal at the output therefrom as previously described in connection with FIGURE 2b. Assuming that no negative signals are applied to any of the inputs to OR gate 402, a negative output signal is generated therefrom which will thereafter maintain the output of OR gate 401 at a positive level. This positive level from OR gate 401 maintains the output of OR gate 402 at a negative level as long as no negative signals are received from any of the AND gates associated with the inputs to OR gate 402. In the event that a negative signal is temporarily applied to any one of the inputs to OR gate 402 apart from the input coupled to the output of OR gate 401, the output of OR gate 402 rises and so causes the output of OR gate 401 to become more negative. The negative output from OR gate 401 is applied to an input of OR gate 402 and thus maintains the latter output at a positive level. Thus, when one pattern of conduction is set up for the two OR gates 401 and 402, with one of the gates having a high output and consequently the other a low output, this pattern may only be changed to the opposite stable state upon the application of a negative signal to the OR gate which has previously had a negative output.

As noted and described in connection with FIGURE 1, information may be read into the storage register from either MEMORY 103 or the INPUT-OUTPUT DEVICE 102. In FIGURE 4, this may be accomplished in stage 1, for example, by means of AND gates 404 and 403, respectively. AND 404 is connected to the MEMORY SENSE AMPLIFIER 1 which is associated with the first of the 24 information planes in the memory. In addition, AND 404 is gated by the signal MEMORY TO SR generated by circuitry shown elsewhere. In the event that the output from MEMORY SENSE AMPLIFIER 1 is positive, a positive MEMORY TO SR signal will cause the output of AND 404 to become negative in accordance with the definition previously given of an AND circuit in this embodiment, so that the negative potential applied to one of the inputs of OR gate 401 will generate a positive signal therefrom and so switch stage 1 of the storage register to a bi-stable state indicative of the presence of a 1 information bit. Previous to the sampling of the memory sense amplifier, the storage register 1 position had been reset by an SR reset signal so that the output of OR 402 was positive. Therefor, if a 1 bit is introduced by AND 404, OR gate 401 becomes positive thus making the output of OR 402 negative which in turn maintains the output of 401 in its new potential even after the output of AND 404 becomes positive at the termination of the MEMORY TO SR signal. In like fashion, AND 403 sets SR 1 to its proper position in response to the signal from the INPUT SENSE AMPLIFIER 1 of the INPUT-OUTPUT DEVICE 102 and a gating signal READ TO SR 7-1 generated elsewhere. Provision is also made to switch the state of SR 1 in the event that the information bit contained therein is in error as detected by the ERROR DETECTOR-CORRECTOR CIRCUIT 104. AND gates 407 and 408 are each responsive to an error-correct signal together with a signal from the ERROR-CORRECTOR STAGE 1 which is described elsewhere. Also, AND 407 has an input from OR 402, while AND 408 has an input from OR 401. In operation, a signal appears from ERROR-CORRECTOR 1 STAGE if the bit held in SR 1 should be changed from a 1 to a 0 designation, or vice versa. In the event that the SR 1 stage contains a 1 bit, the output from OR 401 will be high so that AND 408 will generate a negative output therefrom upon the simultaneous occurrence of an error-correct signal together with a signal from ERROR-CORRECTOR STAGE 1. The negative output from AND 408 is sufficient to raise the output of OR 402 which in turn lowers the output of OR 401. Therefore, the indication held in SR 1 stage is complemented. The same action occurs if the output from OR 402 is high at the time that a correction signal is generated from the ERROR-CORRECTOR STAGE 1. When the error-correct signal appears, AND 407 generates a negative signal and thus raises the output of OR 401 so as to lower the output of OR 402.

The storage register in the present embodiment is further provided with circuitry for shifting right some or all of the information contained therein. For example, upon the occurrence of the signal SR 13-8, 6-1, SHIFT RIGHT, all information bits contained in stages 1-6 and 8-13 are shifted right, while information contained in the remaining stages 15-20 and 22-27 remain stationary. However, upon the occurrence of the signal STORAGE REGISTER SHIFT RIGHT which is applied to every information bit stage of the storage register, all information bits in stages 1-6, 8-13, 15-20, and 22-27 are shifted right. In STORAGE REGISTER 1, this operation is described as follows: AND 406 is provided with inputs from OR 411 in STORAGE REGISTER STAGE 2 as well as the gating signal SR 13-8, 6-1 SHIFT RIGHT. AND 409 is provided with the output from OR 412 as well as the above-identified gating signal. Upon the occurrence of this gating signal, one or the other of AND gates 406 or 409 will have a negative output depending upon which of the OR gates 411 or 412 has a positive output. In the event that SR 2 is up, thus representing a 1 information bit, AND 406 will generate a negative output thus allowing OR 401 to generate a positive output if it had not been doing same previously. Conversely, the presence of a positive output at OR 412 in SR 2 allows OR gate 402 to generate a positive output via AND 409. As may be noted in connection with storage register stage 2, its AND gates 416 and 420 are likewise sampling the status of SR 3 so that SR 2 may be changed if necessary to correspond with the state of SR 3. However, due to the inherent delays through the logical AND and OR circuits comprising each of the storage register stages, the new output from SR 2 will not be reflected until after the old indication of SR 2 has been transferred to SR 1. This occurs because the gating signal SR 13-8, 6-1, SHIFT RIGHT disappears immediately after it samples the output from the next left storage register stage.

Only certain of the storage register information stages are shown in detail although all stages 1 through 28 and a sign state are assumed to be present. Stages 1 through 6 of the storage register are very similar except that each of these stages is associated with a different stage of the input-output device, the memory, and the error-corrector such as may be evidenced by examing stages 2 and 6 which are shown in detail. Stage 7 of the storage register also has an input from the input-output device as may be evidenced by the presence of an input from the INPUT SENSE AMPLIFIER 7 at AND 433. However, since STORAGE REGISTER STAGE 7 contains the checking bit, no input from the memory is supplied thereto since sense checking bits are merely used for input-output operations in order to provide error-correction at this time. Therefore, while STAGE SR 7 does have ERROR-CORRECTION AND gates 435 and 434, its construction is simpler than the information storage stages of the storage register. Furthermore, in all shifting operations, the information contained in the correction bit stages 7, 14, 21, and 28 is not utilized and therefore there is no provision for shifting this information out of the stages. Consequently, it may be seen that AND gates 425 and 430 sample the output from STORAGE REGISTER STAGE 8 instead of STORAGE REGISTER STAGE 7. It may also be noted in connection with stages 1 through 7 of the storage register that the signal READ TO SR 7-1 is applied in common to these seven stages. This signal is generated for a read-in operation so as to place a character from the INPUT-OUTPUT DEVICE 102 into these particular seven stages. As will be noted in connection with stage 8 of the storage register, INPUT SENSE AMPLIFIER 8 is gated by a signal READ TO SR 14-8 which is generated at a different time than the signal READ TO SR 7-1. Stages 9-14 are similarly gated by the READ TO SR 14-8 signal so as to place a character previously appearing from the input-output device into this particular group of information storage stages. Thus, during a read-in operation, the storage register is loaded character by character with each character being entered in parallel.

It will be noted in connection with SR 13 that the gating signal SR 13-8, 6-1 SHIFT RIGHT is not applied to an AND circuit associated with the inputs to the OR gates 438 or 439. Instead, this gating signal is applied to OR gate 439 of inverter circuit 440 so that upon its occurrence, it always insures that SR STAGE 13 is reset so that OR gate 439 has a positive output therefrom. This provides the automatic insertion of 0 information bits into the left-hand stage of the group consisting of stages 1-6 and 8-13 during the shift right operation of the information contained only in this particular group. Thus, these stages 1-6 and 8-13 will gradually fill up with 0 information bits as the right shift continues. However, it should be noted that the remaining storage register stages 15-20 and 22-27 have only the gating signal SR SHIFT RIGHT applied thereto. The presence of this gating signal, which is also applied to stages 1-6 and 8-13, allows the shifting right of all information bits contained in the 24 information bit stages of the storage register. Therefore, the leftmost information bit stage 27 has the gating signal SR SHIFT RIGHT signal applied through OR gate 448 by inverter 450 so that 0's may be automatically inserted into this particular stage which will travel right during successive shift cycles. The shift right features of the storage register are utilizied in the translation of a 7N construction address to a binary representation later to be described.

The complete construction of the storage register is now believed to be obvious in view of the above description. As will be later seen, information to various units of the computer is shifted from the storage register completely in parallel. An exception to this action occurs when information is being transferred from the storage register to the INPUT-OUTPUT UNIT 102, whereupon only one 7 bit character at a time is transferred from the storage register, but in parallel fashion. These gates are shown in FIGURE 11b, subsequently to be described.

FIGURE 5 discloses the construction of the ACCUMULATOR REGISTER 107. The accumulator register contains 30 information bit storage units plus a sign storage unit for holding a five decimal or octal digit sum in the event that the data operated upon is represented in either one of these two modes. Furthermore, the accumulator register may also hold a sum represented in pure binary in which case stage 29 serves as the overflow stage. Each information bit storage unit in the accumulator is comprised of two OR gates cross-coupled as also shown in the storage register. The operation of these OR gates, for example, OR gates 501 and 502, is the same as previously described. Each accumulator stage is supplied by an input from a correspondingly numbered stage in the ADDER 106. In the operation of add to accumulator, the contents of the accumulator are directed to the adder together with the contents of the storage register, the sum thereof being held in the accumulator register. The particular adder used in the present embodiment, however, does not generate the sum itself, but merely a signal from each of its stages indicating whether or not the corresponding stage of the accumulator must be changed in order to correctly represent the new sum. Therefore, two AND gates are provided with each of the accumulator stages in order to provide a complementing action. For example, AND gates 503 and 504 are associated with accumulator stage 1, with these AND gates being responsive to a gating signal ADDER TO ACCUMULATOR and a signal from ADDER STAGE 1 itself indicating that the information bit held in accumulator stage 1 must be complemented so that it will correctly indicate the new sum bit. Thus, if an information bit of 1 is previously held by accumulator stage 1, evidenced by a positive output from OR gate 501, the occurrence of the gating signal ADDER TO ACCUMULATOR and a positive signal from ADDER 1 at AND gate 54 will generate a negative signal to OR gate 502 so as to raise its output and thus drop the output of OR gate 501. In like fashion, each of the other accumulator stages 2–6, 8–13, 15–20, 22–27, 29–34 and the sign stage will be complemented by different circuitry if such is required to place the new sum into the accumulator register. A more detailed description of the adding operation will be given later.

FIGURE 6 discloses the details of the MQ register 50 which in itself contains but 24 stages plus the sign stage as opposed to the 30 stages plus the sign stage comprising the accumulator register. However, the construction details of each MQ stage are similar to those stages in the accumulator register. For example, in the operation of Add to MQ, each stage of the adder generates a signal only if the correspondingly number MQ state need be complemented so as to reflect the sum of the addition. Therefore, as shown in detail in MQ state 1, AND gates 603 and 604 are responsive to the gating signal Add to MQ and an output from ADDER STAGE 1 in order to complement the information held in MQ STAGE 1. In like fashion, all other MQ stage also contain corresponding pairs of AND gates responsive to their respective adder stages.

The OPERATION REGISTER 109 is disclosed in FIGURE 7 and consists of 13 stages including sign for holding the operation portion of an instruction word. Each information storage stage consists of two OR gates cross-coupled as previously described. Furthermore, since the only manner of entry into the operation register from the storage register is via the adder, a set of complementing gates, for example AND gates 703 and 704, is provided for each operation register stage so as to complement the bit held by each stage if so indicated by the associated adder signal. The technique used in the present embodiment is to first reset the operation register so that 0 information bits are held by all stages, then add the operation register to the operation portion of the instruction word held in the storage register so as to effectively place this operation portion into the operation register via the adder.

FIGURE 8 shows the details of the ADDRESS COUNTER 110 into which is placed the address of either an instruction or of a data word. Besides acting as a register, the address counter is also adapted to increase the value of an address held therein by an increment of either 1 or 7 depending upon the mode in which the instruction word is expressed. Inputs to the address counter may be derived from either the LOCATION REGISTER 113 or from the ADDER STAGES 1–6, 8–13, and 15–17. In entering an address contained in the location register, the address counter is first reset and then each stage of the location register is gated to the correspondingly numbered stage of the address counter by means of a gating signal LR to AC applied, for example, at AND gate 803. When entering information from the adder, the address counter is also initially reset and then its contents added to the address portion of an instruction word in the storage register by means of the adder. In such a case, each adder stage generates a signal if the correspondingly numbered stage of the address counter must be changed so as to reflect the true sum. Therefore, a pair of AND gates such as 804 and 805 are provided for each of the address counter stages so as to provide this complementing feature.

In addition to the transmission gates provided for each of the address counter stages, a set of counting gates together with a gated sample pulse generator must also be provided for each of the address counter stages. For example, AND gates 805 and 806 are associated with address counter stage 1. AND 805 has an input from OR 802 and its output is connected to an input to OR 801. AND 806 has one input connected from OR 801 and its output is connected to OR 802. Both of these gates have an input derived from generator 808 so that upon the occurrence of a positive pulse from generator 808, one of the AND gates 805 or 806 will emit a negative signal depending upon which of the OR gates 801 or 802 has a positive signal therefrom. Therefore, AND gates 805 and 806 together with generator 808 act to complement the setting of AC STAGE 1 in a manner similar to the action of AND gates 804 and 807 with respect to the ADDER STAGE 1. Since ADDRESS COUNTER STAGE 1 contains the lowest order information bit, complementing of this stage effectively adds 1 to the contents of the address counter. A carry circuit is provided so that if a carry be generated due to this addition of 1 to ADDRESS COUNTER STAGE 1, it may affect the proper number of higher order address counter stages similar to any typical counter. In the present embodiment, this is provided by including a sample pulse generator for each of the address counter stages with the set input of each generator being responsive to a positive going excursion from the NOT OR circuit of the preceding stage. A positive signal from such an OR stage indicates that the stage has been switched from a 1 indication to a 0 indication which in binary notation requires the generation of a carry pulse. The complete operation of the address counter will be given subsequently.

FIGURE 9 shows the details of the LOCATION REGISTER 113 which contains the address of the next instruction word to be utilized within the stored program. Its construction is similar to many of the registers previously described. Each stage of the location register consists of two OR circuits cross-coupled as shown by OR gates 901 and 902. Only one input is derived and that from the address counter after the address counter has been stepped so as to generate the next instruction address. The location register is first reset so as to clear it and then a gating signal AC to LR is generated which samples each of the address counter stages in order to pass this information to the correspondingly numbered location register stage.

FIGURE 10 discloses the address register into which is placed the address of the current instruction or the address of the current data word for use in addressing a particular memory location. This register, also composed of bi-stable information storage stages, has a construction previously described and may receive information from the address counter. The actual addressing mechanism for a core memory is not shown in this disclosure inasmuch as it is the well known $x$ coordinate and $y$ coordinate system used in the prior art.

FIGURE 11A discloses logic circuits for gating the output of the various registers to the common storage bus. For example, AND gate 1101 monitors storage register stage 1 so that its content is gated via OR gate 1105 to the storage bus 1 lead upon occurrence of the signal SR to SB. In like fashion, the number 1 stages of the accumulator, MQ, and address counter are selectively gated to the SB 1 lead upon occurrence of the respective gating signals during different times of the computing operation. All other numbered stages of each register are gated to the correspondingly number SB lead via AND gates and OR gates similar in construction to those shown in FIGURE 11A.

FIGURE 11B discloses gating circuitry for transferring information from the storage register to the input-output device in performance of the write instruction. As before described, there is no instantaneous parallel transfer of all information bits in the storage register to the input-output device. Instead, groups of 7 information bits, including a generated checking bit, called characters, are transferred in succession to the input-output device which in turn may record each such 7 bit character upon a medium, one after the other. Thus, the input lines to the input-output device need number only seven to which are applied the corresponding bits from each of the groups in the storage register. AND gate 1109, for example, monitors the SR stage 22 whose information is passed via OR gate 1111 to the input-output device on lead $b_0$. At the same time, the same gating signal write from SR 28-22 would also pass information from stages 23-28 to output leads $b_0-b_6$. Subsequently, another group of information bits from the storage register is passed to the same set of leads $b_0-b_6$ by means of the signal WRITE FROM SR 21-15. AND gate 1108 shows the monitoring of storage register stage 15 at this time. In like fashion, AND gates 1107 and 1106 pass, at different times, information from SR 8 and SR 1 to the same $b_0$ lead associated with the input-output device.

Figure 12A:
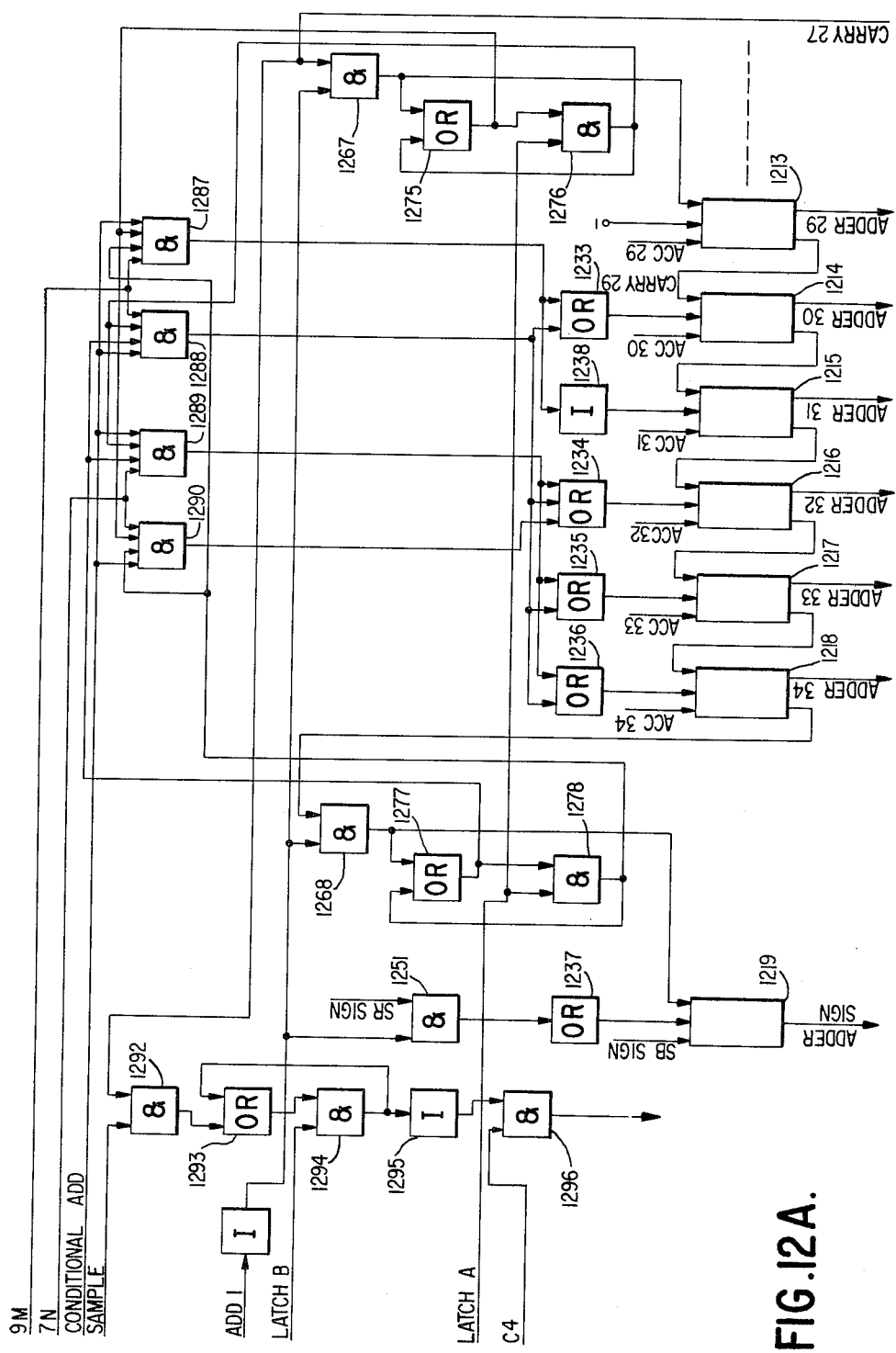
Figure 12B:
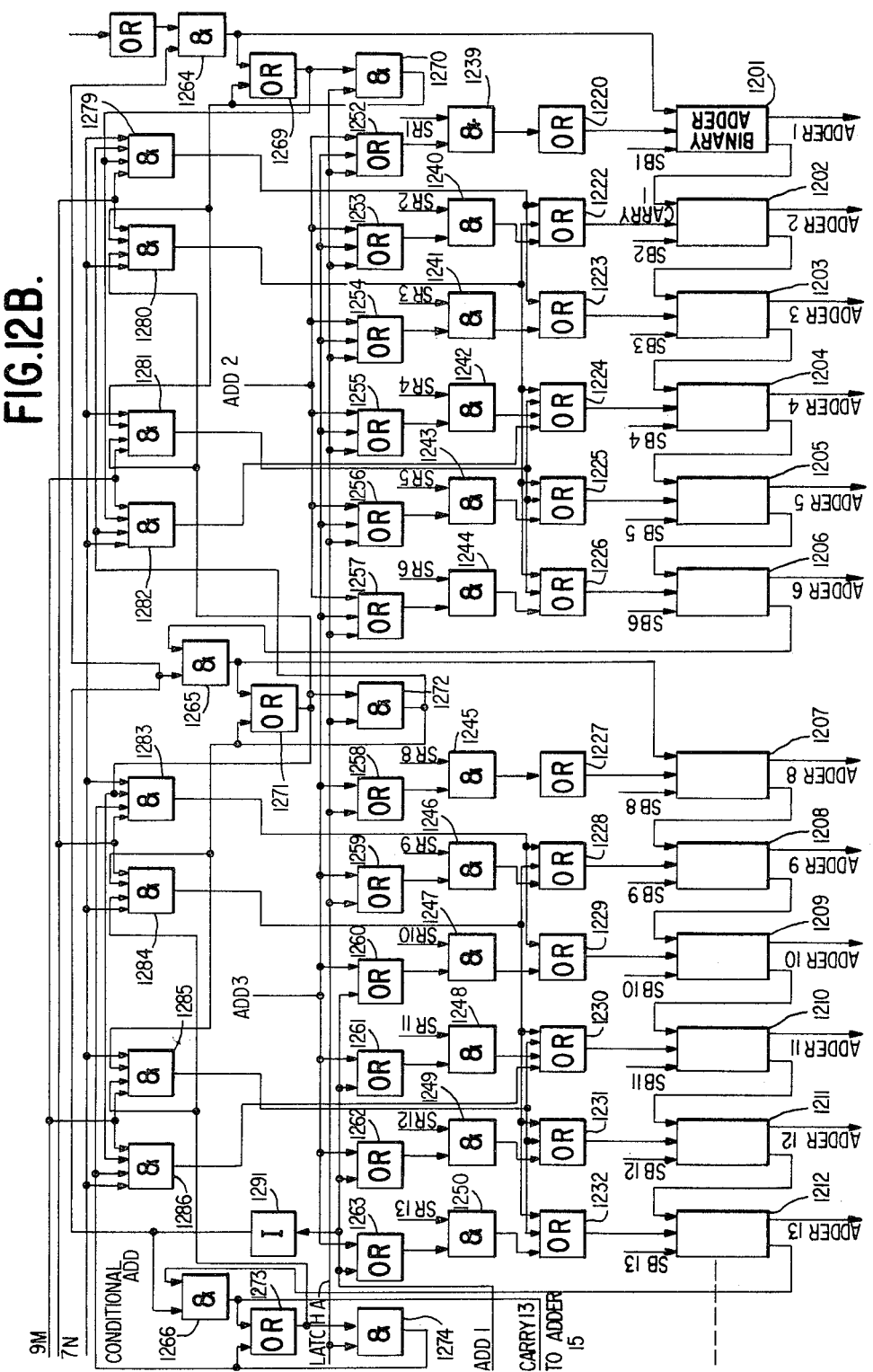
Figure 13A:
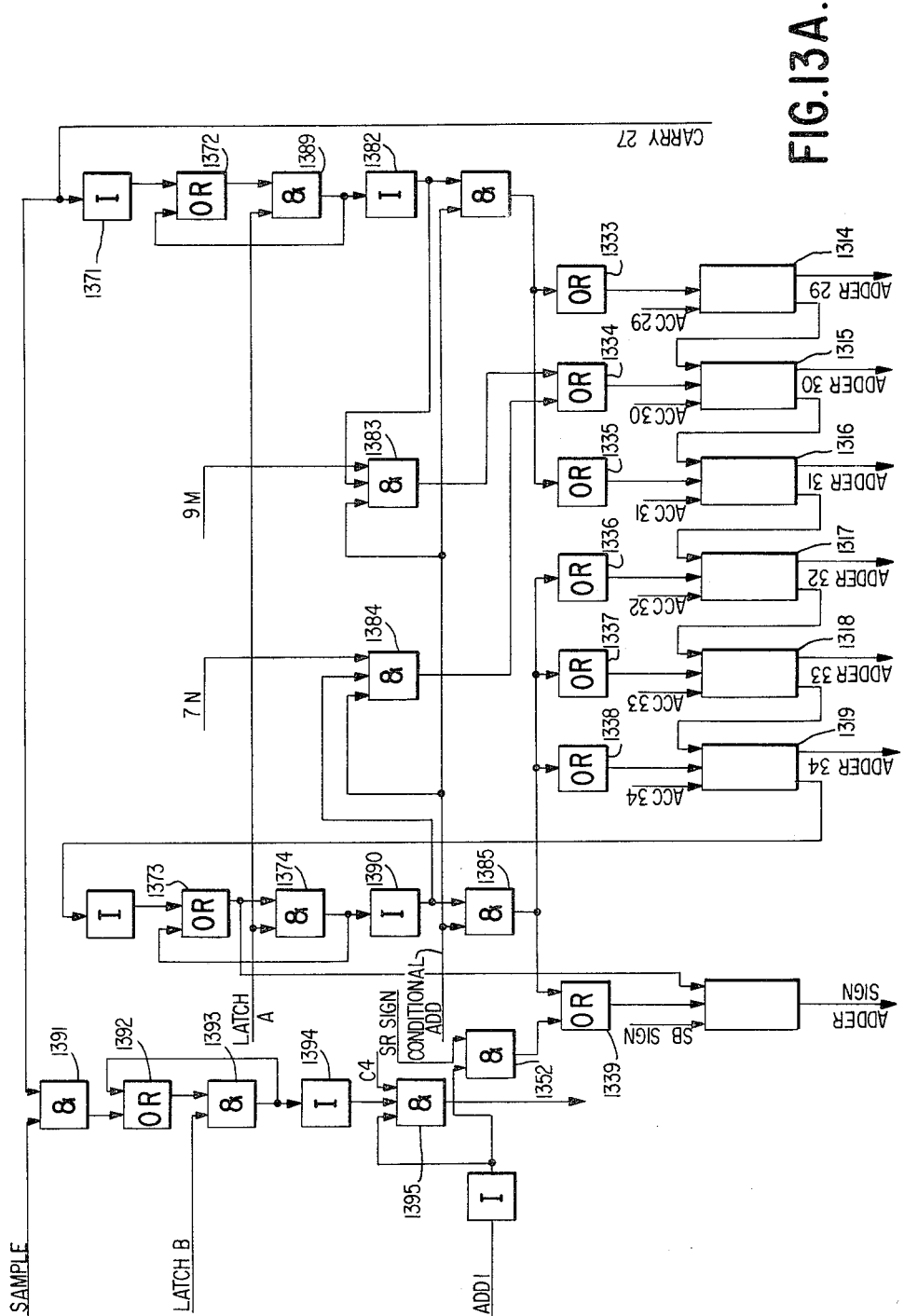

FIGURES 12 and 13 show two embodiments of an adder that may be used in the present computing system for purposes of adding data represented in any of the three modes, i.e., binary, 7N decimal, or 9M octal. FIGURE 12 will first be described in detail. The adder contains a total of 31 stages, the first 24 of which are adapted to process the 24 information bits of each of the operands, while the next 6 stages are utilized to generate any overflow sum digits which may occur. Furthermore, there is a sign stage of the adder. As shown in FIGURE 12, the adder stages may be divided into groups of six with only three of these groups actually being shown in the figure and number from 1201 through 1218. Adder stages 15-20 and 22-27, while not shown in detail in FIGURE 11, are presumed to be present and their construction follows along the lines of the stages actually shown and subsequently to be described. Each adder stage comprises a full binary adder the details of which are shown in FIGURE 14. Referring now to FIGURE 14, one stage of the adder has been shown as comprising a combination of AND, OR and INVERTING gates having three inputs thereto and a sum and carry output therefrom. One of the inputs is initially provided with an input from a stage of a storage register while another input is derived from the storage bus on which appears a number derived from one of the registers 107, 108, 109, or 110 in FIGURE 1. The third input to the binary stage of the adder is derived from the carry output of the next lower order stage of the adder designated by the carry N-1 signal. As with all full binary adders, a carry output is generated upon the presence of two or more of the input signals since one or more of the AND gates 1401, 1402, 1403 will generate an output when such a condition exists. This carry output is then fed to the next higher order adder stage where it participates in formulating the sum and carry output of that particular stage. The adder N output from the adder stage of FIGURE 14 is directed to the inputs of registers 107, 108, 109, and 110 to indicate whether or not its respective register stage must be complemented so as to effect the true sum. This decision is performed by gates 1405-1409, and the operation is substantially as follows. Since the storage bus SB contains the corresponding bit of the register into which the sum is to be placed, it need only be changed if one but not both of the bits appear on the other two input lines from the preceding carry and from the storage register. For example, if a binary 1 appears on the SRN input but no input appears from the carry, then AND 1408 will generate a minus output which will raise the output of OR gate 1409 to initiate a complementing action of the register stage to which the adder output is fed. Conversely, if a carry input is present but no input appears on SRN, then AND gate 1407 will cause a positive signal to appear from OR gate 1409 and so complement the corresponding register stage in order to generate the corresponding sum digit. If neither a carry nor a signal from SR appears at the inputs then no adder signal is generated. Conversely, if both a carry and an SR input appear, then again no adder signal need be generated since the final sum digit is the same digit as that corresponding digit of the operand which is being transmitted via the SB.

Referring back to FIGURE 12, it is seen that each of the adder stages 1 through 6, 8 through 13, etc., is connected so as to receive one input signal from the corresponding SB line together with a carry from the preceding stage. Furthermore, the third input to each adder stage may be provided from either the corresponding SR stage or from a pattern generator. For example, it will be noted that the corresponding SR stage is applied to one input of the AND circuits 1239-1250 of the first twelve lower order stages of the adder. Similar AND gates are provided for the adder stages 15-20 and 22-27 which, although not shown, are presumed to be present. It will further be noted that the other input to each of the above-identified AND gates is provided by a series of OR gates 1252-1263 which in turn are conditioned by either one of the gating signals ADD 1, ADD 2, or ADD 3. Thus, in the presence of the ADD 1 signal, AND gates 1239-1250 are conditioned to pass the corresponding signal from the storage register stages to the third input of each adder stage so that the contents of the storage register may be added to the number then appearing on the SB and an adder signal generated thereby. The number appearing on the SB may be derived from any one of the registers 107-110 according to the instruction being performed or according to whether a new instruction is to be placed in the operation register and address counter. It will also be noted that the presence of an ADD 3 signal will also allow the storage register stages 1-6 and 8-13 to be gated to the adder stages. However, the ADD 3 signal is not applied to the corresponding OR gates which are associated with ADDER STAGES 15-20 and 22-27. In these latter two groups of adder stages, which are not shown, only the ADD 1 signal is applied to the corresponding OR gates so that upon the presence of an ADD 3 signal, only one half of the storage register digits are actually gated to the corresponding stages of the adder. In like fashion, in the presence of an ADD 2 signal, only STORAGE REGISTER STAGES 1-6 are gated to the correspondingly numbered adder STAGES 1-6 at this particular time. Thus, the adder is equipped with means for gating 6, 12, or 24 of the storage register stages in parallel to the adder for addition to a number appearing on the SB. This selective gating is provided so as to allow the performance of an address translation subsequently to be described.

When adding together data operand words represented in pure binary, each word contains 24 information bits and the sum appearing in the appropriate register will automatically be a valid combination of binary bits because of the inherent operation of the binary adder stages connected together as shown in FIGURE 12. However, when adding data represented in either of the two 7N or 9M omnicodes, the sum immediately appearing in the appropriate register may not be a valid code combination in the particular omnicode of the data operand words. Since the sum of an arithmetic operation in the present embodiment is monitored by the ERROR DETECTOR-CORRECTOR CIRCUIT 104 whenever the data operands are represented by an omnicode, it is necessary to insure that the end result of the addition operation is represented in valid code combinations for either the 7N or the 9M omnicode. To realize this result, it is necessary to provide for a conditional add cycle during which a pattern of 1's and 0's may be added to each 6 bit sum group. Thus, after the initial addition operation has been performed on the numbers appearing from the storage register and from the SB, the sum digits thus placed in the appropriate register are transmitted to the adder via the SB and at the same time a specified number is added thereto. In the adder embodiment of FIGURE 12, this pattern generated during the conditional add cycle is provided by a set of AND gates associated with each of the 6 bit groups of adder stages so that each digit of the sum has added to it a particular pattern determined by certain criteria generated in the initial add cycle. During the initial add cycle, the carry in and the carry out from each of the 6 bit groups in the adder is noted and the following conditional add patterns of Tables II and III may be generated during the conditional add cycle.

*Table II.—7N Code*

| C in | C out | Conditional Add Pattern |
|---|---|---|
| 0 | 0 | 000000 |
| 0 | 1 | 111010 |
| 1 | 1 | 000000 |
| 1 | 0 | 000110 |

*Table III.—9M Code*

| C in | C out | Conditional Add Pattern |
|---|---|---|
| 0 | 0 | 000000 |
| 0 | 1 | 111000 |
| 1 | 1 | 000000 |
| 1 | 0 | 001000 |

During the conditional add cycle, it is necessary in the adder embodiment of FIGURE 12 to block the carries between the digit blocks. Thus, during the initial add cycle, the ADD 1 signal is on, thus allowing carries between each of the digit blocks to be transmitted to the next higher digit block via AND gates 1264, 1265, 1266, etc., up to and including AND gates 1267 and 1268 which are associated with the overflow and sign units of the adder, respectively. Furthermore, the combination of OR gates 1269 and 1270, for example, samples the input carry to the first digit block and stores it in a continuous feedback loop for use in the conditional add cycle when determining the particular pattern to be added to the first digit block of the adder comprised of ADDER STAGES 1-6. In like fashion, OR gate 1271 and AND gate 1272 sample the carry output from the first digit block (ADDER STAGE 6) and retain this indication for use during the conditional add cycle for helping to determine the conditional add patterns to be added to both the first and second digit blocks. During the conditional add cycle, AND gates 1279-1282 are receptive to outputs from the two latches at both ends of the first digit block in accordance with the criteria in Tables II or III so as to generate the proper conditional add pattern which is to be added to the lowest order decimal or octal digit of the initial sum. For example, if the original data operands are represented by the 7N decimal code, and if the original summing of the two lowest order decimal digits results in a carry in of 0 to ADDER STAGE 1 and a carry out of 1 from ADDER STAGE 6, then AND gates 1279 and 1280 will supply 1 information bits or OR gates 1226, 1225, 1224, and 1222 which are to be added to the original sum digit, thus generating a modified sum digit which is represented in a valid 7N code pattern. This valid code pattern may now be monitored by the error corrector-detector which will detect any single errors which would create an invalid code pattern. Conversely, if the data operands are represented by the 9M octal omnicode, then AND gates 1281 and 1282 will generate the conditional add pattern in accordance with the value of the input carry and output carry from the first block of ADDER STAGES 1-6. In like fashion, AND gates 1283 and 1284 generate the proper conditional add pattern for the next decimal block of the adder comprised of ADDER STAGES 8-13, while AND gates 1285 and 1286 supply the conditional add pattern if the data is coded in 9M octal. Obviously, the output carry from the first digit block, which is derived from ADDER STAGE 6, is the input carry for the succeeding digit block in which it is applied to ADDER STAGE 8. Therefore, the storing of this carry in OR gate 1271 and 1272 results in its use by the conditional add pattern generators associated with both the first and second digit blocks in the manner indicated. Since the adder of FIGURE 12 requires that input and output carries to the digit blocks be blocked during the conditional add pattern, it is noted that the absence of the ADD 1 signal during the conditional add time prevents AND gates 1264, 1265, 1266, etc., from passing any carries between the blocks.

A practical example of the operation of the adder of FIGURE 12 for both the 7N decimal and 9M octal codes is given below, using but two digits in each of the operands.

```
                7N CODE
              S 0      1        1        0
     SR       0  000000  101010  110001   +67
     SB       0  000000  100011  011100   +54

SB            0  000001  001110  001101
     Cond. Pattern 0  000110  000000  111010

0  000111  001110  000111   +121
                9M CODE
              S 0      1        1        0
     SR       0  000000  110110  111111   +67
     SB       0  000000  101101  100100   +54

SB            0  000001  100100  100011
     Cond. Pattern 0  001000  000000  111000

0  001001  100100  011011   +143
```

In the performance of an add to accumulator or an add to MQ instruction, it is necessary that the input carry to ADDER STAGE 1 be a 0 since it is lowest order stage in the lowest order digit block. However, during the double add instruction, it is necessary to first determine whether an overflow carry resulted from the initial addition of the first data word to the MQ so that this carry may be accounted for when the second addition of the SR to the accumulator takes place. Thus, a circuit comprised of AND gate 1292, OR gate 1293, AND gate 1294, INVERTER 1295, and AND gate 1296 is provided in order to first detect whether an overflow carry occurs from the highest order digit block of the MQ register as indicated by the carry out from ADDER STAGE 27, and then transmit this carry via AND 1296 and AND 1264 to the carry input of ADDER STAGE 1 during the add to accumulator portion of the double add instruction. This operation will be explained in greater detail.

The adder shown in FIGURE 13 differs from that in FIGURE 12 primarily in the method of generating the patterns during a conditional add cycle in the event that the data operands are represented by the 7N decimal or the 9M octal omnicode. In this adder, no carry blocking is necessary during the conditional add cycle, and the conditional add pattern requires no logic for its generation. This is accomplished by using the principle that the carry-in to a digit block during the conditional add is made identical with the carry-in to that same digit block of the initial regular add. The following Table IV illustrates the conditional add patterns required for both the 7N decimal and the 9M octal codes in the adder of FIGURE 13, and the relationship of these patterns to the carry-in and carry-out of a digit block.

*Table IV*

| 7N | | |
|---|---|---|
| C in | C out | Conditional Add Pattern |
| 0 | 0 | 000000 |
| 0 | 1 | 111010 |
| 1 | 1 | 111111 |
| 1 | 0 | 000101 |

| 9M | | |
|---|---|---|
| C in | C out | Conditional Add Pattern |
| 0 | 0 | 000000 |
| 0 | 1 | 111000 |
| 1 | 1 | 111111 |
| 1 | 0 | 000111 |

It will be noted in FIGURE 13 that there is no blocking of carries between digit blocks in the conditional add cycle, inasmuch as the carry-out from each block is transmitted directly to the carry-in of the first stage of the next digit block via OR gates 1365, 1367, 1369, etc. However, it is still necessary to detect and store the carry-in and carry-out of each digit block during a regular add cycle such as was done in the adder of FIGURE 12. This is accomplished in FIGURE 13 by a regenerative loop consisting of OR 1365 and AND 1366, for example, associated with the input of the first decimal block of the adder. In like fashion, OR 1367 and AND 1368 form a store for the carry-out of this same decimal block, as detected from the output of ADDER STAGE 6, which in turn is also the carry-in of the next higher decimal block comprised of ADDER STAGES 8 to 13. During the conditional add cycle, the indication of a carry-in and carry-out for each decimal block is gated to the appropriates ones of the OR gates 1320–1326, for example, in order to form the pattern which is added to the initial sum now appearing on the SB. As will be noted from the preceding Table IV, the conditional add patterns for both the 7N and the 9M codes are almost identical except for the formation of the bit applied to OR gate 1322 in the first decimal block, for example. In such a case, the use of the 7N mode conditions AND 1377 to pass the carry indication from AND 1368 to OR 1322, while the use of the 9M mode causes AND 1376 to pass a carry indication from AND 1366 to OR 1322. In no case, however, is the conditional add pattern generated by logical AND gates such as are shown in FIGURE 12, wherein each AND gate must sample both the carry-in and carry-out of a block in order to determine the conditional and add pattern. Furthermore, FIGURE 13 does not require the blocking of carries between blocks during the conditional add cycle.

Referring now to FIGURE 15, there are disclosed the details of the ERROR DETECTOR CORRECTOR 104. This unit monitors data appearing on the SB during certain times of the instruction operation only if the data appearing thereon is represented by one of the two 7N or 9M omnicodes. If the data on the bus at this time is represented by pure binary, then the error detector-corrector may not be used to affect system operation since it would detect many invalid combinations and thus erroneously signal errors. FIGURE 15 discloses merely one decimal order of the error detector-corrector, and it is assumed that the circuitry of FIGURE 15 is duplicated for each of the 6 bit digit orders contained in the fixed length 24 digit word. Furthermore, when there is a checking bit associated with each of the decimal or octal orders, then the error detector-corrector may also take this into account in order to correct single errors appearing in each decimal or octal character.

The logical design of the error detector-corrector is based on the following premise of relationship between the checking bit and the six associated bits of a decimal or octal character.

$$Z_1 = b_0 + b_1 + b_2 + 1$$

where $+$ denotes sum modulo two.

In the circuit of FIGURE 15, the circuits 1501–1506 represent an EXCLUSIVE OR circuit which has the following defined function. If either but not both of the inputs are present, then the OR circuit has an output. However, if none or both of the inputs are present, then the OR circuit has no output. The details of such an EXCLUSIVE OR circuit are shown in FIGURE 16 to which reference will now be made. In FIGURE 16, it is noted that in the presence of an A signal and the absence of a B signal, AND 1604 will be energized and thus generate a negative signal which in turn causes OR 1605 to generate a positive signal. Conversely, in the presence of the B signal and the absence of the A signal, AND 1603 will have an output which in turn causes OR 1605 to generate a positive output. If both A and B are present or absent, then neither AND gate 1603 or 1604 will be energized.

Returning now to FIGURE 15, it will be noted that the error correction of a 7 bit character is accomplished in the following manner. One example of a single letter will be given. Assume the message 0111000 has been sent and received as 0011000. As can be seen, a valid code combination in the 7N representation has been changed into a invalid combination. In FIGURE 15, six AND circuits 1510–1515 test for error patterns and the AND circuit 1512 responds to 101. This output conditions one input of AND circuits 1521 and 1522 via OR 1517. The function $SB1 + SB2 + SB3 + SB7 = 1$ and thus conditions the other input of AND circuit 1522. This gives indication that SB5 should be corrected.

By extension of this type of reasoning all error patterns containing a single error can be analyzed and corrected. This circuit will correct messages in both the 7N and 9M mode of operation since it requires only that the summation function modulo two be equal for correct operation and that the binary digit $$C_1 = b_0 + b_2 + b_2 + 1$$

The output from AND gates 1519–1524 are supplied via INVERTERS 1530–1535 to correspondingly numbered stages of a storage register in order to correct the 6 bit character contained therein. In like fashion, the outputs of the other decimal order portion of the error detector-corrector are applied simultaneously to the corresponding stages of the storage register to correct the characters contained therein.

One more feature of the error detector-corrector of FIGURE 15 is its ability to detect invalid code combinations even in the absence of the 7th check bit. This is accomplished by means of AND gate 1536 and 1537 and OR gate 1538. These two AND gates are driven by the EXCLUSIVE OR gates 1502–1506 which sample but a 6 bit character. However, if the outputs of these EXCLUSIVE OR circuits do not match, it is evident that an invalid combination is being presented to them in which case neither of the AND gates 1536 or 1537 will be energized so as to raise the output of OR gate 1538. Upon generation of a gating pulse entitled ERROR DETECT, the absence of an output at OR gate 1538 will result in the presence of an error signal at AND 1539 which in tun indicates to the operator that an error has been detected. However, if a valid combination in either the 7N or the 9M code is presented to gates 1504–1506, then one or the other AND gates 1536 or 1537 will be energized in order to prevent the error signal. The use of the error detection portion of the error detector-corrector is made during all data transfers within the computing system when there is no checking bit present.

FIGURES 17 through 22 disclose many of the timing rings used to control the various steps of the operations previously described. FIGURE 17 shows the construction of a program or C ring having five stages C1–C5. At the conclusion of performing an instruction word, the C1 stage of the C ring is always set on so as to initiate an instruction cycle which will withdraw a new instruction from memory and place it within the operation register and address counter. If this instruction is represented by a binary mode, then at the conclusion of this cycle, the C ring will step to either the C3 stage or the C5 stage depending on whether an arithmetic operation is called for by the new instruction or whether a read-in or read-out to the input-output device is prescribed, respectively. However, if the new instruction is represented by the 7N mode, then the C2 stage is switched on at the conclusion of the C1 stage in order to withdraw the second instruction word from memory which actually contains the address of the data word and which must be translated into a 12 information bit binary address for insertion into the address counter. At the conclusion of such a C2 step, the C ring then steps to the C3 or C5 step depending upon the particular instruction to be performed as above enumerated. If an arithmetic operation add to accumulator, add to MQ, or double add is required, and the data operands are represented by one of the two 7N or 9M omnicode modes, then both a regular add and a conditional add cycle occur during the C3 step. If a double add instruction is present, then an add to MQ operation is effected during a C3 time and at the conclusion thereof the C ring steps to the C4 stage so as to perform an add to accumulator utilizing a second data word wihtdrawn from memory. Since such a data word also is represented by an omnicode mode, both a regular add and a conditional add cycle occur within the C4 time. At the conclusion of the C3 or the C4 times, the instruction has been completed and the C ring is reset back to C1 stage so as to initiate an instruction cycle in order to withdraw the next instruction from memory. However, if the instruction calls for an information transfer from or to memory from or to the input-output device, then neither the C3 stage nor the C4 stage are turned on at the completion of the C1 or C2 times. Instead, C5 is turned on during which time the transfer is accomplished. At conclusion of the C5 time, the C ring is reset so as to initiate a new instruction cycle.

In order to initiate and terminate the various stages of the C ring at the proper times, a series of AND gates 1711–1721 are provided which respond to various conditions more fully to be described. The setting on of one of the C stages by an output from one of the AND gates also automatically turns off the previously set C stage.

FIGURE 18 discloses the details of the memory ring which is comprised of twelve stages, only four of which are actually shown. Operation of the memory ring is initiated whenever a transfer into or out of memory is desired. Furthermore, the memory ring controls the proper stepping of the address counter. Only one stage of the memory ring may be on at any one time, as is the case also with the C ring previously described.

Figure 19:
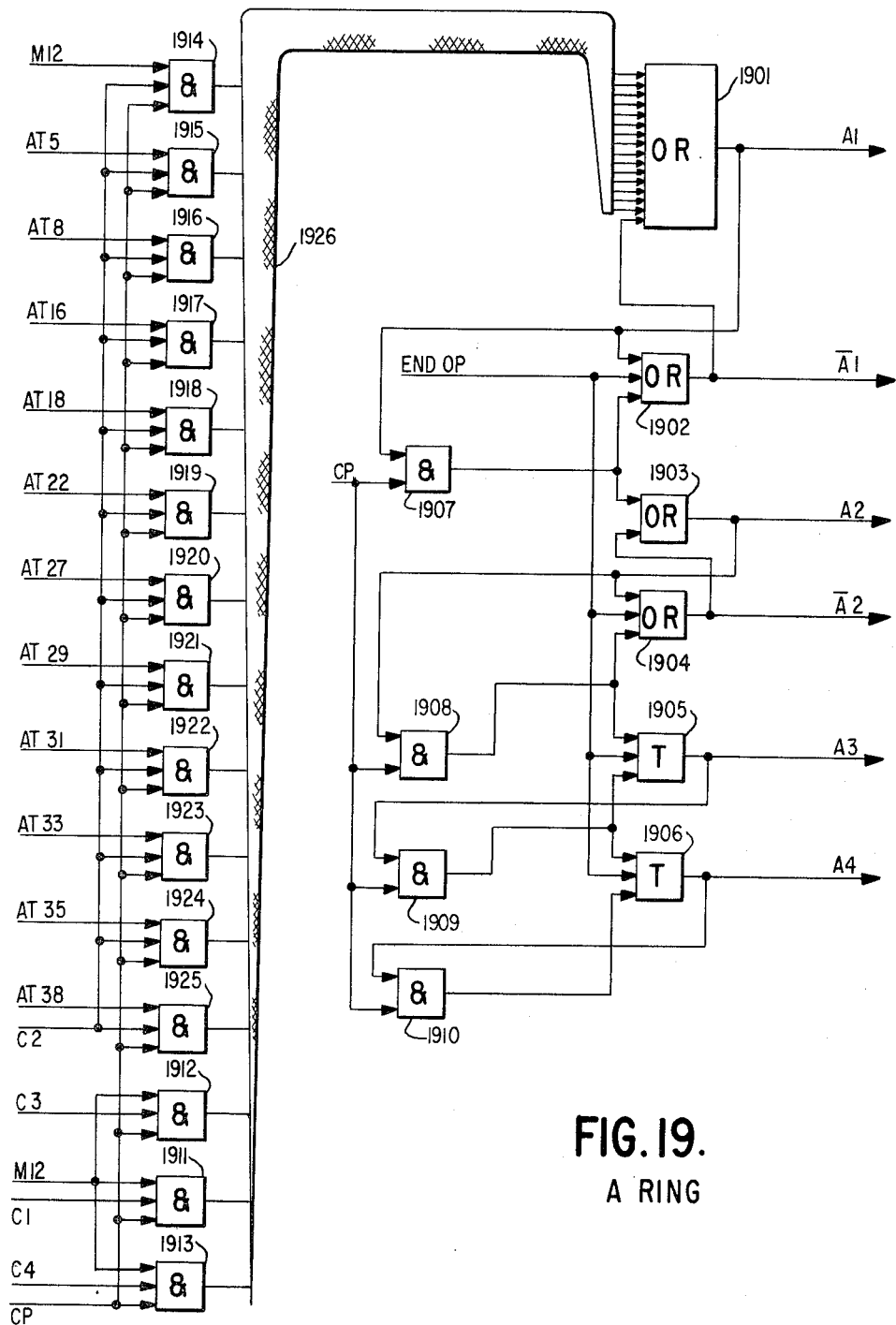

FIGURE 19 shows details of the add ring which consists of four stages successively operated one after the other whenever an add operation is to be performed. The A2 through A4 pulses allow data operands to be transmitted from their respective storage positions to the adder and the sum change signals from the adder back to the sum registers.

FIGURE 20 illustrates the conditional add ring which is used whenever a conditional add cycle is required in order to obtain a valid code combination for sum digits in the event that the data operands are expressed in either of the two omnicodes. In such a case, the add ring of FIGURE 19 is used to first perform the additional add operation, then operation of the conditional add ring is initiated to cause the addition of the conditional add patterns to the initial sum as previously explained. As in the case of the memory ring and the add ring, the operation of the conditional add ring when once initiated is continuous until the final stage CA4 is turned on and off.

Figure 21A:
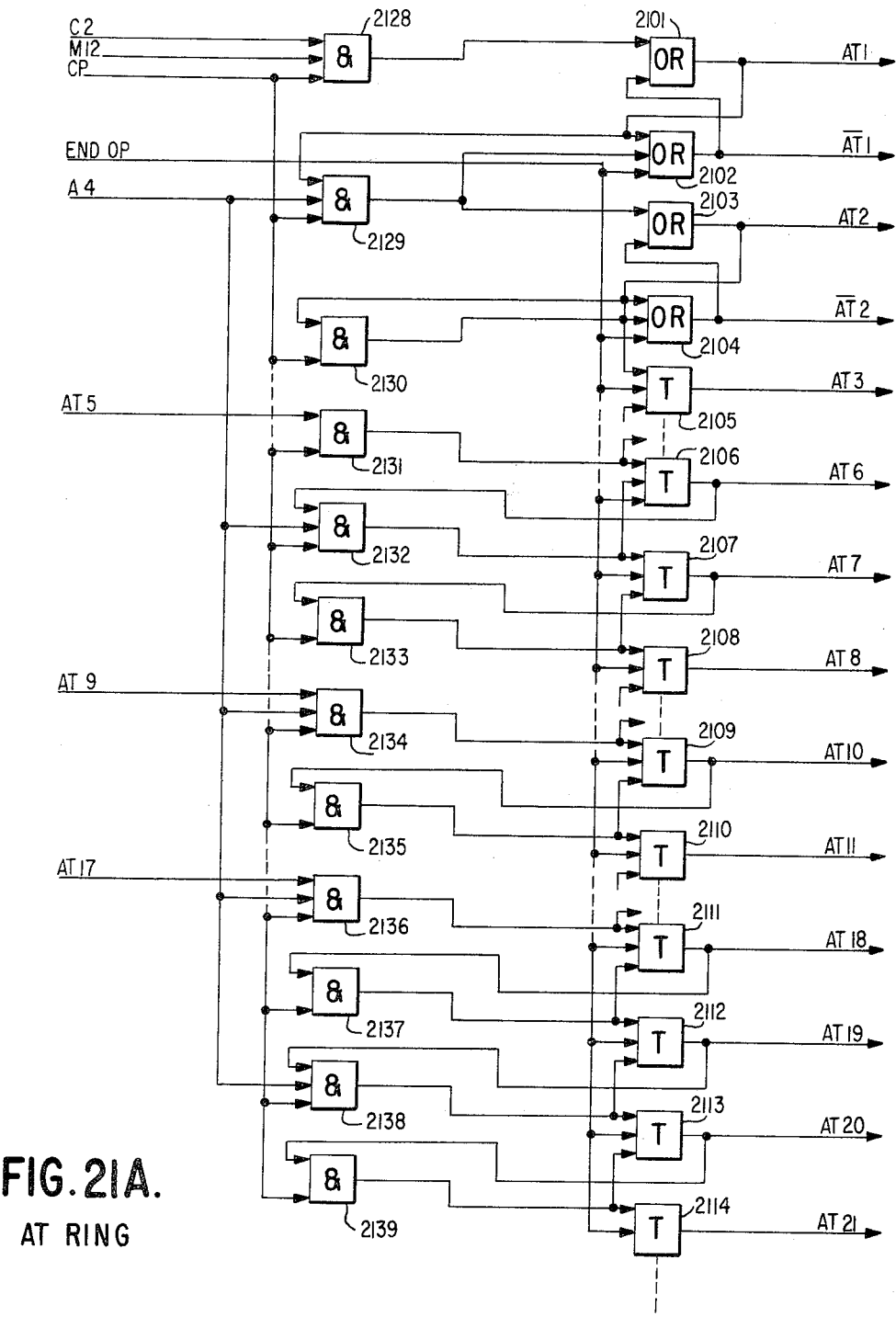
Figure 21B:
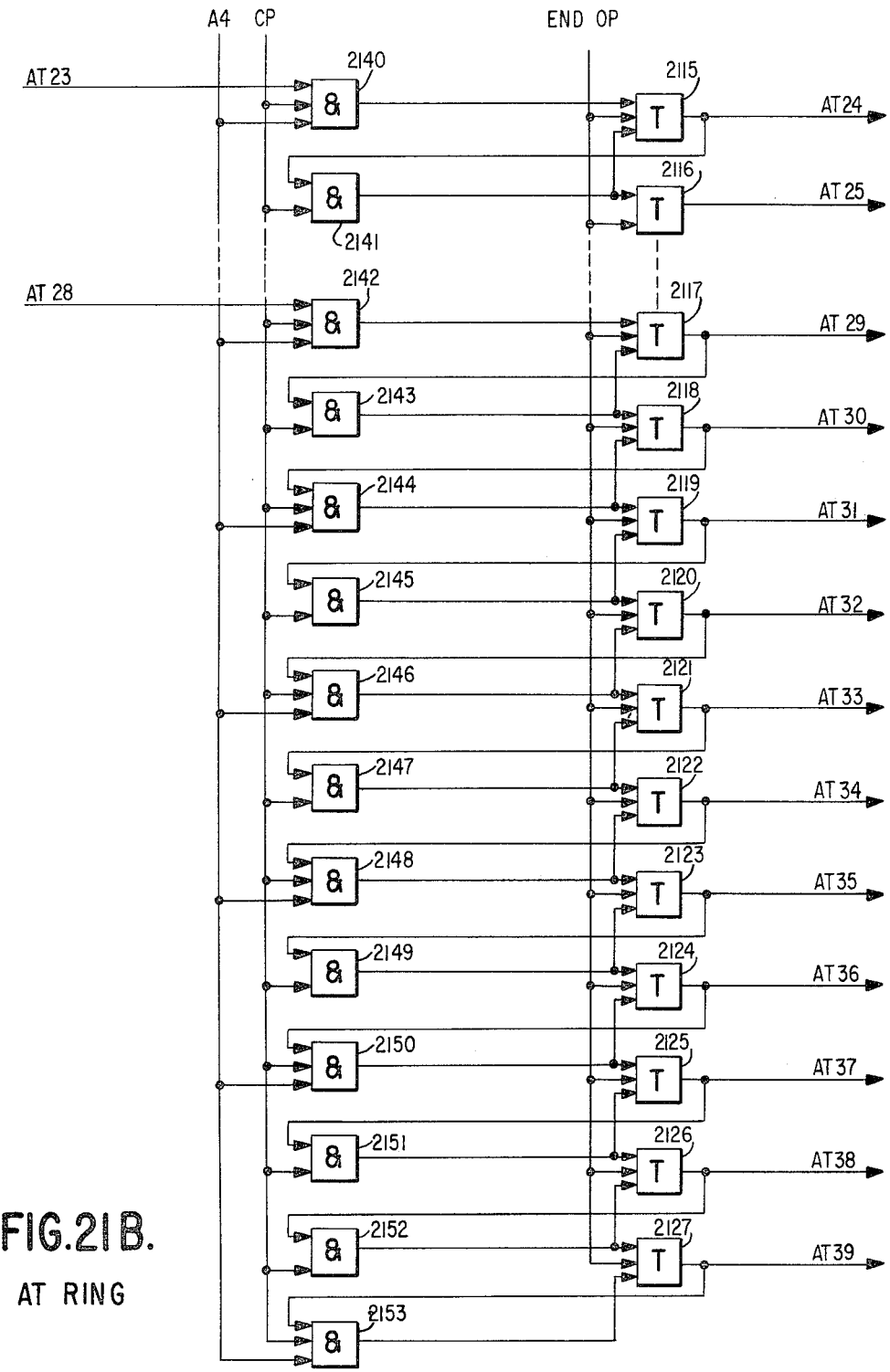

FIGURE 21 illustrates the address translate ring consisting of 39 stages which is utilized during the C2 program time to translate a 4 decimal digit address expressed in the 7N code to a 12 bit binary address for use in the address counter, and subsequently the address register, for locating a particular storage location in memory. The address translate ring controls the number of right shifts to be performed within each step of the address translation, and in conjunction with the add ring also governs the actual addition times which must be performed during such address translation.

Figure 22:
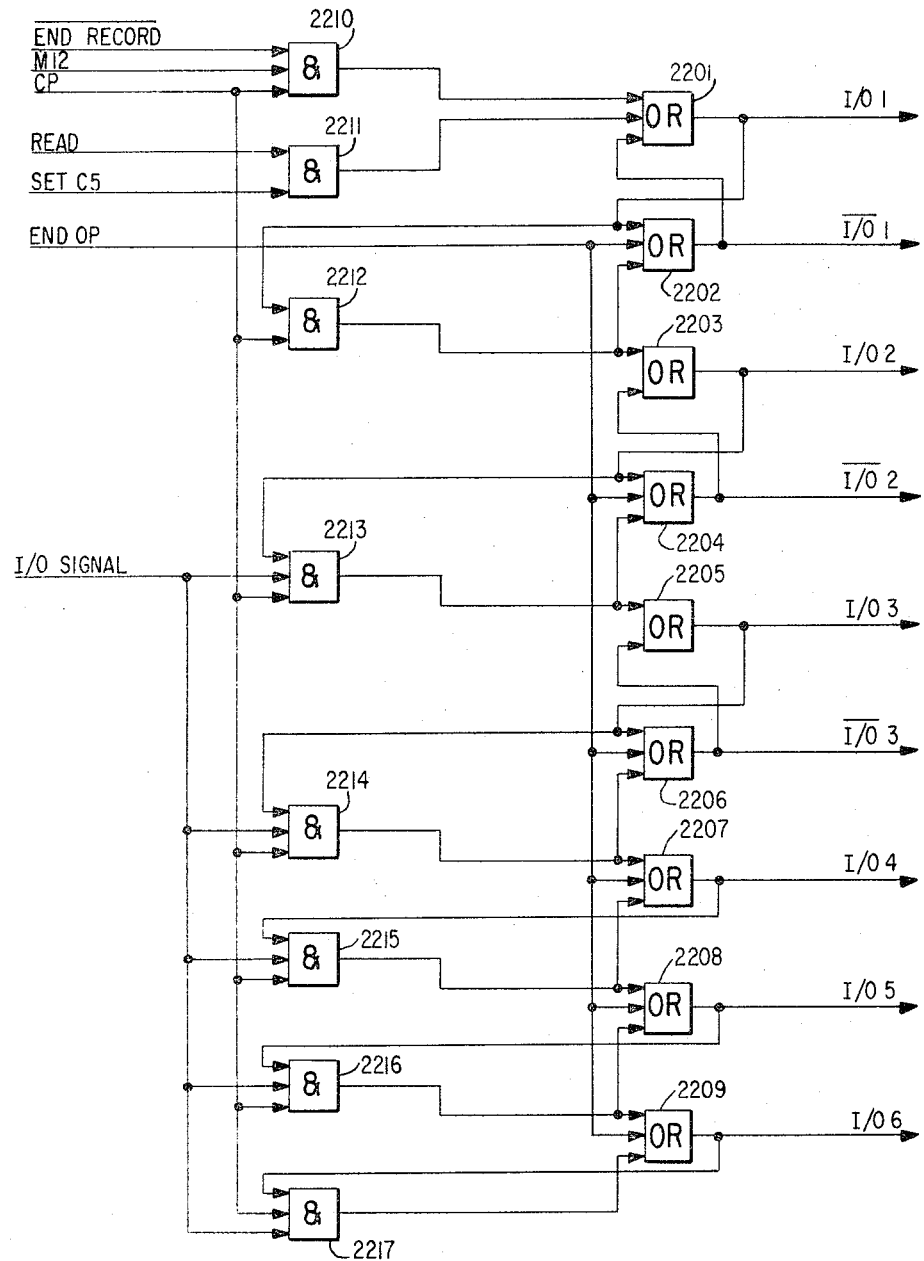
Figure 26:
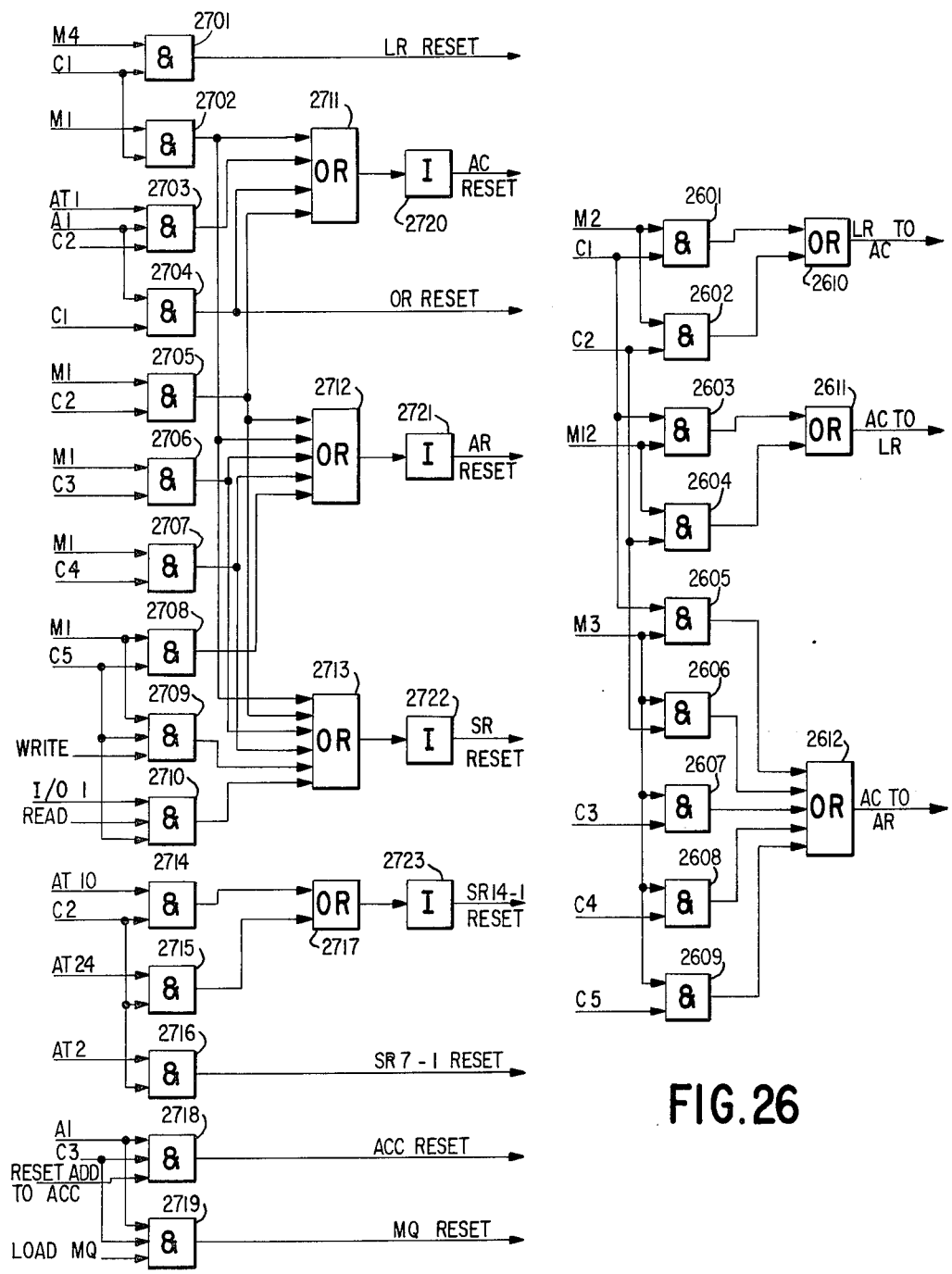
Figure 28:
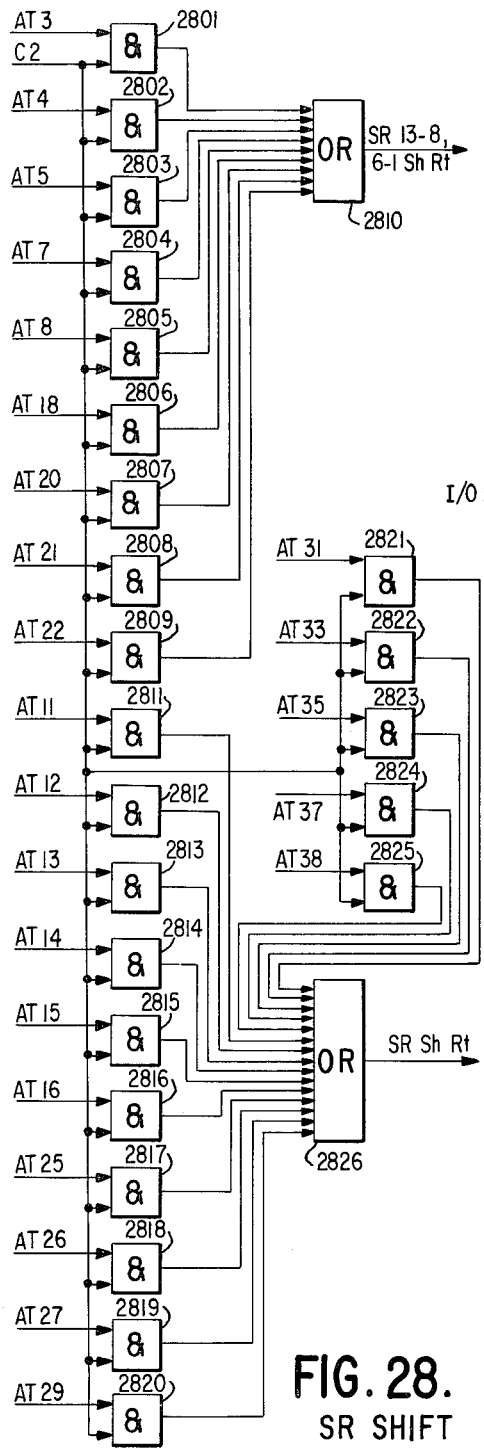
Figure 29:
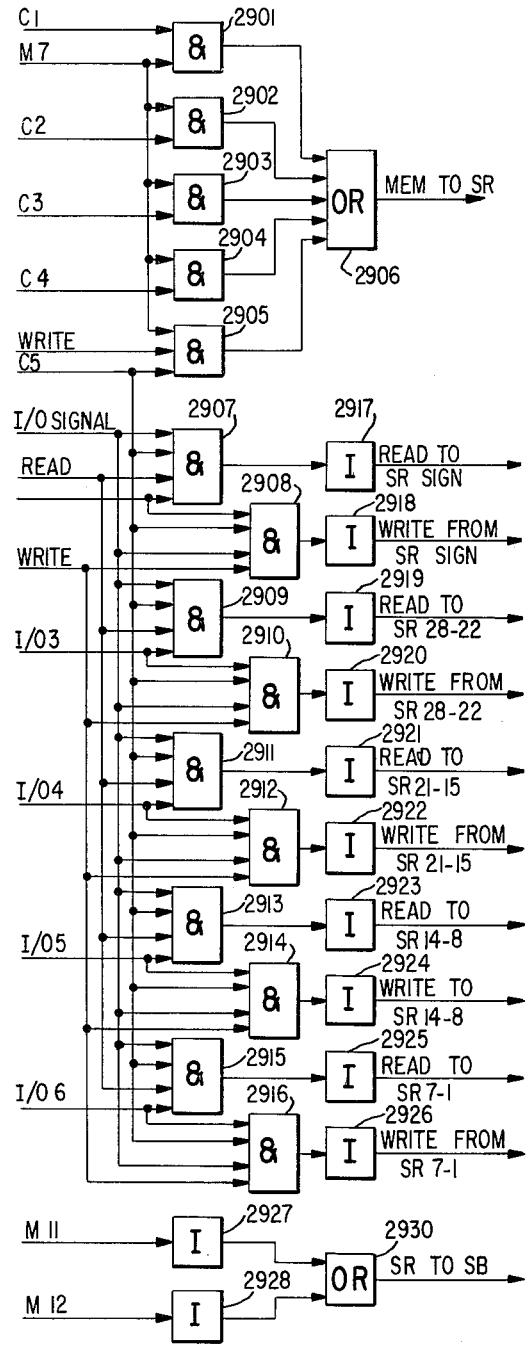

FIGURE 22 shows details of the input-output ring which is utilized during the C5 program time for governing the operations of read and write from and to the input-output device. The stepping from stage to stage of the input-output ring is governed for the most part by the speed at which the input-output device is able to handle its information which in most cases requires considerably more time than does normal computer internal operation.

FIGURES 23 through 29 generally show control circuitry for generating the gating signals utilized in the preceding figures. These gating signals are generated normally by the switching of the various signals from the rings against each other and against the particular operation to be performed. The detailed operation of circuits of these figures will become apparent during the following description of the over-all system.

FIGURE 30 is a chart showing the various instruction codes which may be performed in the simplified computer system used to illustrate the present invention. The chart of FIGURE 30 only shows the 12 information bits operation portion of an instruction word which is placed into stages 15–20 and 22–27 of the operation register. The effect of the sign in operations has been neglected for purposes of the present embodiment, although it must be realized that to perform subtraction operations the value of the sign must be known. The instructions performed by the present embodiment are defined in the left-hand instruction column with each instruction having its representation in the 7N omnicode illustrated to its right. Thus it may be seen that in 7N omnicode, the operations consist of two decimal digits, each digit represented by a 6 bit omnicode character. Therefore, each digit of the operation portion of the instruction must be expressed in a valid code combination so that each such digit may be monitored by the error detector-corrector and errors determined. It should further be noted that in the present embodiment, the instruction word is considered to be in either one of two modes. That is, it may be considered to be in a pure binary mode or in the 7N decimal omnicode. In either mode, however, the operation of the instruction is decoded by the same set of decode circuits which must recognize the same configuration of information bits in order to energize the proper control signals to perform the particular operation. This is not true, however, for the address portion of the instruction word, inasmuch as a pure binary representation of the address is contained in 12 information bits which will comprise the other half of a single instruction word. However, as before described, if the instruction words are considered to be represented by the 7N omnicode, then 24 information bits must be utilized merely to express the same memory capacity as is expressed by 12 binary bits of information.

Referring now to the chart of FIGURE 30, it will be noted that seven basic operations are there listed and which are the following:

(1) Read
(2) Write
(3) Reset add to accumulator
(4) Add to accumulator
(5) Load MQ
(6) Add to MQ
(7) Double add With respect to the above, all of the above seven operations may be assumed to operate upon data words expressed in either of the three modes, binary, 7N decimal, 9M octal. The indication as to which mode the data word is represented in is determined by examining bit positions 26 and 27 of the operation register. If the data word to be manipulated by the instruction is represented in pure binary, then positions 26 and 27 will contain two 0 bits as is noted in the first horizontal line of the chart in FIGURE 30 in connection with the instruction read binary word (BW). On the other hand, if the data word to be manipulated is expressed in 7N omnicode, then stage 27 contains a 1 information bit while stage 26 contains a 0 bit. This may be noted in connection with the second horizontal line representing the read 7N instruction. Further, if the data word to be read from the input-output device is expressed in the 9M octal configuration, then stage 27 contains a 0 information bit while stage 26 contains a 1 information bit as shown in FIGURE 30. In examining the remaining instructions, it will be noted that in all such instructions the binary word representation is determined from the two 0 information bits held in stages 26 and 27 of the operation register. The same rule follows with respect to the 7N and 9M data representations since they are always indicated by a 1 and a 0 and a 0 and a 1, respectively.

The actual operation of read, without considering the data mode, is determined by examining the lowest order decimal digit of the operation portion which is contained in operation register stages 15–20. Also, in order to extend the number of basic instructions, stage 22 of the operation register may also be examined. For example, the basic instruction of read is represented by all 0 information bits held in operation register stages 15–20, coupled with a 1 bit held in stage 22 of the operation register. The basic operation of write is represented by a decimal digit of 1 (000111) together with a 1 information bit in stage 22. Other operations are defined again by the representation held in operation register stages 15–20 and 22. For the purposes of the instructions to be described in the present invention, stages 23, 24, and 25 may be neglected as far as their effect upon the nature of the operation is concerned. However, it is apparent that the information bit indicia in these three stages must be such as to make the character held in stages 22–27 a valid code combination in the 7N omnicode representation. Where it is not necessary to consider the mode in which the data is presented, for example, with exchange accumulator and MQ, these stages 23, 24, and 25 might be considered. However, in all cases, both digits in the operation register must be in a valid code combination especially when the complete instruction word is considered to be coded in 7N omnicode. The maximum number of the instructions for any mode is 60, together with 20 special instructions.

To point out the distinction between a binary representation of the instruction and a 7N omnicode representation, the following situation might be given. For example, if the 12 information bits in the operation register stages 15–20 and 22–27 are considered to be grouped in accordance with the 7N omnicode, then the decimal equivalent of this entire number is 10, since the decimal digit in stages 22–27 represents a decimal 1 while the digit in stages 15–20 represents a digit 0 in 7N omnicode. Conversely, if the information bit configuration in these 12 stages is considered to be in pure binary, then the decimal equivalent of this binary notation is 448 since stages 22, 23, and 24 of the operation register correspond to binary orders 64, 128, and 256 which when added together result in the above decimal equivalent of 448. Thus, the programmer when determining the program steps will consider that the instruction read binary word is represented in a 7N omnicode whose decimal equivalent is 10, while it is represented in a pure binary code whose decimal equivalent is 448. However, the bit configuration in both situations is the same inasmuch as the same decoding logic operates upon these 12 stages of the operation register no matter in which code the instruction is considered to be represented. This prevents the need for duplication of the decoding circuitry which would be the case if the decimal equivalent of pure binary notation would be the same as the decimal equivalent of the 7N omnicode representation.

FIGURE 31 discloses details of the instruction decoders which sample the stages 15–20 and 22–27 of the operation register in order to determine the nature of the instruction. As previously noted, all instructions stored at any one time in the computer memory must be coded in either one mode or the other, with this mode being determined by the position of a manual switch 3101 set to one of two locations by the operator or programmer. For example, if the switch is set upwards, then the machine knows that all instruction words which it will interpret are coded in pure binary, whereas the setting of the switch to the lower terminal indicates that all instruction words are coded in 7N. However, data words to be processed by the machine in accordance with the instruction words may be in any one of three modes which is actually indicated by positions 26 and 27 of the instruction word itself. As in most prior art computers, each instruction word has associated with it a particular data word which is known at the time to the programmer so that he may set positions 26 and 27 of the instruction word to correspond with the mode in which its associated data word is coded.

AND gates 3102, 3104, and 3105 monitor stages 26 and 27 of the operation register to generate one of three signals, binary word, octal word (9M) or decimal word (7N). In addition, an OR gate 3108 is provided to sample the outputs of AND gates 3104 and 3105 so as to generate a signal omnicode word (ONW) which is present when the data is coded in either of the two omnicodes.

This signal is provided since in some operations, such as error correcting and detecting, the error corrector-detector will operate equally well on either the 7N or the 9M codes without necessity for differentiating between these two modes. AND gates 3109 through 3119 monitor operation register stages 15–20 and 22 in order to determine the basic instruction to be performed, such as read, write, add to accumulator, etc. These operation stages are monitored in pairs by groups of AND gates whose outputs are later combined with another series of AND gates 3132–3138 to generate the final signal such as shown in FIGURE 31. As before mentioned, these basic instruction signals are utilized in conjunction with the signals emanating from the operating ring in order to generate the various gating signals at the proper times throughout the machine.

A detailed description of the operation of the invention as embodied in the simplified computing system of FIGURE 1 will now be described:

INSTRUCTION CYCLE (C1)

For purposes of this description, it may be initially assumed that an instruction is contained in the operation register whose performance has just been terminated so that it is now desired to withdraw a new instruction from the memory in accordance with the address held in the location register. Due to the termination of the old instruction, the C ring is set so that the signal C1 is on during which time the new instruction will be withdrawn from memory. This cycle therefore may be termed the instruction cycle as opposed to subsequent cycles during which the instruction is actually performed. Upon the setting of stage C1 via OR gate 1701 by any one of a number of terminating signals, the same set signal also generates an END OP signal via OR gate 1722 which in turn initiates operation of the memory ring by setting M1 via OR gate 1801. The setting on of C1 and M1 occurs at the beginning of a CP time so that M1 will remain on for one microsecond until the next subsequent CP pulse gates with M1 at AND gate 1809 to set on M2 and turn off M1. When once initiated, the operation of the memory ring will continue with each stage therein being set on at one microsecond intervals and thence remaining on for approximately one microsecond before being turned off.

In FIGURE 27, M1 switches with C1 to generate the AC reset signal as well as the AR reset and SR reset signals via OR gate 2711, 2712, and 2713, respectively. Subsequently, M2 switches with C1 at 2601 to generate the LR to AC signal which transfers the address in LR down to the address counter. M3 then switches with C1 to generate AC to AR which in turn transfers this instruction address from the address counter to the address register where it is used to locate a particular word position in memory wherein resides the next instruction to be performed. M4 then switches with C1 at AND 2701 to generate LR reset which in turn resets LR so that a new instruction address may be placed therein at the end of the memory cycle. In the meantime, this address from the location register which now resides in both the address counter and the address register must be modified in the address counter so as to represent the address of the next instruction to be performed when that time occurs to institute another instruction cycle. In the situation where all instructions are coded in the pure binary mode, this is accomplished by adding 1 to the number held in the address counter. This implies that all instructions, when coded in the binary mode, are stored in adjacent memory locations and will be withdrawn in sequence by virtue of this single addition to the instruction address during each instruction cycle. On the other hand, if all instructions are coded in the 7N omnicode, the address held in the address counter this time has the digit 7 added thereto. This therefore means that when addresses are represented by the 7N mode, they are contained in memory locations which are seven numbered locations apart from each other instead of being numerically adjacent to each other in the case of the binary mode. The reason for this will become apparent when considering the concept of address translation which may occur during the C2 time in the event that the addresses are coded in the 7N mode. For the present, however, the method of incrementing the address in the address counter by either 1 or by 7 will be described in detail. In the event that the address in the address counter need only be incremented by 1, the following operation occurs. M4 switches with C1 (via OR gate 2417) at AND 2401 to generate the count gate A from OR gate 2412 which is present for a period of 1 microsecond. The count gate A signal is applied to the gate input of the SPDG 808 associated with the first stage of the address counter. The leading edge of count gate A is generated too late to catch the leading edge of the clock pulse applied to the set input of generator 808, since it is this very same clock pulse which initiated the turning on of M4. The next clock pulse will turn off M4 but not before its leading edge has time to detect the presence of count gate A due to the inherent delays through the logical circuitry. Therefore, at the end of M4 time, GENERATOR 808 will emit a pulse to AND gate 805 and 806 so as to complement the indication in address counter stage 1. If a 1 bit in this stage is thereby changed to a 0 bit, the output of OR gate 802 goes positive so as to apply a positive set pulse to GENERATOR 816. This set pulse to GENERATOR 816 arrives there during the M5 time, but a positive potential is required at the gate input to GENERATOR 816 before it may emit a pulse to ADDRESS COUNTER STAGE 2. This is provided by the count gate B from OR gate 2409 which has a positive potential beginning with M4 time and lasting until the end of M11 time. Therefore, sufficient time is provided to allow any carry resulting from the addition of 1 to the ADDRESS COUNTER 1 STAGE to ripple through the complete address counter and so affect all of the information contained therein. The maximum ripple time actually takes less than one clock pulse. However, if the instructions are all coded in binary form, it is not necessary to increment the address counter more than once. It will be noted that count gate A normally goes off at the conclusion of the M4 time. If a binary instruction is present, then no output can be generated from AND gate 2411 since it may be gated only by the presence of decimal instructions. It is therefore seen that upon the termination of count gate A, any subsequent CP pulses may not be gated through GENERATOR 808 and so will not continue to add 1 to the first address counter stage. On the other hand, if decimal instructions are being performed, OR gate 2410 will provide an output beginning with M5 time and continuing until the end of M10 time, due to input connections with AND gates 2402–2407, inclusive. Therefore, count gate A remains up until the end of M10 time whereby a total of seven clock pulses may be gated through the GENERATOR 808 in order to add 7 to the address held in the address counter. Although count gate A goes down at the end of the M10 time, count gate B remains up for 1 microsecond longer due to the gating through of M11 time via AND gate 2408. This allows sufficient time for any carry resulting from this last M7 add time to ripple through the complete counter so as to avoid an error in this result.

While incrementing of the address counter is being performed between M4 time and M11 time, the address previously sent to the address register at M3 time has been effective to address memory section so that the memory sense amplifiers may read out the information contained therein at M7 time. Therefore, M7 switches with C1 at AND 2901 to generate the memory to SR signal which transfers in parallel 24 information bits plus a sign bit to the appropriate stages of the storage register. In order to provide a chance for the error detector to monitor the information thus drawn from memory in the event that such information is represented by one of the two omnicodes, the storage register contents are sent to the storage bus at M11 time or OR gate 2930 during which time the error detector-corrector examines the 24 information bits. At this same time, M11 switches with C1 and the signal DI for a decimal instruction, to generate the error detect signal which in turn samples AND gate 1539 in order to ascertain if an error has occurred in each of the 6 bit groups through which each decimal order of the error detector-corrector is associated. However, it will be seen from FIGURE 25 that in the event that binary instructions are being performed, AND gate 2501 will not generate a signal so that the determination of the error detector would not affect the operation of the system.

The signal SR to SB remains up through the M12 time via 2930 so as to allow it to be read back into the computer memory at the same position from whence it was withdrawn at M7 time. This is to counteract the effect of destructive read-out which is prevalent among many of the core memories as is well known in the prior art. Also at M12 time, AND gate 2603 generates a signal to OR 2611 to allow the newly modified address in the address counter to be transmitted to the location register for use during the next instruction cycle. At this time, the address placed in the location register is the old address incremented by either 1 or 7 depending upon the mode in which the instructions are coded. At the conclusion of M12, AND gate 1813 gates with M12 and the clock pulse to shut off M12, however, the same clock pulse which eventually turns off M12 gates with M12 at AND 1911 to initiate operation of the add ring and so set on the signal A1. The operation now to be performed is to transfer the instruction word held in the storage register into the appropriate locations of the operation register and address counter where it may be decoded and performed in the subsequent cycles. A1 switches with C1 at AND 2704 to generate the AC reset signal and also the OR reset signal so as to reset both of these registers to 0. The add ring, when once initiated, will step each microsecond until all four steps have been completed after which it will turn itself off. Thus, during the A2, A3, and A4 times, OR gate 2304 will emit a signal which in turn gates with NOT C2 at AND 2305 in order to generate the ADD 1 signal. In both of the adders shown in FIGURES 12 and 13, the ADD 1 signal is applied to OR gates 1252, 1253, etc., or OR gates 1353, 1354, etc., so as to gate the appropriate stages of the storage register to one input of the correspondingly numbered stages of the adder. At the same time, C1 gates with the output of OR gate 2304 at AND 2308 to generate the signals OR to SB and AC to SB. These two signals transfer the information contained in the associated OR and AC registers, which are now all 0 information bits, to their associated SB leads which in turn are directed to second inputs to their correspondingly numbered stages in the adder as shown in FIGURES 12 and 13. Thus, the information bits contained in storage register stages 1–6 and 8–13 are added to the 0 information bits contained in stages 1–6 and 8–13 of the address counter, while the information bits contained in storage register stages 15–20, 22–27 (some not shown), are added to the 0 information bits contained in the OR stages 15–20, 22–27 (some not shown). The sum of such addition is obviously equal to the number held in the storage register, and upon occurrence of the A4 signal switching with C1 at AND 2312, the two signals ADDER TO OR and ADDER TO AC are generated which sample the output of the associated adder stages and so effects the complementing of those stages in the address counter and in the operation register in order to indicate the sum result. It should be noted that in this addition process, the information bits residing in storage register stages 15, 16, and 17 are additionally placed into stages 15, 16, and 17 of the address counter as well as being placed in stages 15, 16, and 17 of the operation register. However, these information bits placed at this time into stages 15, 16, and 17 of the address counter will never be utilized. The reason for such transfer is merely to simplify the circuitry. Inasmuch as the operand 0 added to any digits expressed in either the 7N or the 9M octal code results in a sum having a valid code combination, no conditional add cycle is required for the add operation during the C1 instruction cycle time. Therefore, at the termination of the A4 signal, the C ring may also be stepped to a new stage so as to continue the operation.

ADDRESS TRANSLATION C2

In the event that the instructions are represented in a binary code, the address portion of the instruction word withdrawn from memory during the C1 cycle may be used directly to address memory in order to withdraw the data word to be operated upon in accordance with the operation portion of this instruction word. It will be remembered that memory contains 4,096 word locations which may be represented by a 12 bit binary number which is now contained in the address counter and which may be sent to the address register for use in addressing a particular memory location. However, if the instructions are coded in the 7N omnicode, the 12 information bit address portion of the instruction word withdrawn during the C1 cycle may only represent two decimal omnicode digits since it requires 6 information bits to represent one such omnicode digit. This therefore would allow only 100 unique memory locations to be addressed if only 12 information bits were utilized. Inasmuch as it is still desired to utilize the full capacity in memory when instructions are coded in the 7N omnicode, it is thus necessary to obtain at least a minimum of four decimal omnicode digits in order to address up to the 4,096 memory locations. This function is accomplished in the present embodiment by utilizing two 24 information bit instruction words from memory. The first instruction word which is withdrawn during the C1 time, as above described, contains the operation code in its left-hand 13 bits which are placed into the operation register during the C1 time as previously described. Although the address portion of this instruction word is placed into the address counter during the C1 time, the information bits there contained are not utilized as any portion of the address of the data word. Instead, a C2 cycle is initiated during which time a second instruction word is withdrawn from memory whose 24 information bits represent the address of the data operand. 24 information bits may be divided into four decimal omnicode characters which can uniquely specify add of the 4,096 words locations in memory. A problem remains, however, in that the memory is actually addressed by only 12 information bits which are contained in the address register. For this reason, the 24 information bits of the second instruction word must be translated into a 12 information bit binary word which can be placed into the address counter from whence it will be directed to the address register for use in addressing the memory location. For the purpose of simplicity, the address translation technique used does not result in the 12 bit binary word having a decimal equivalent equal to the decimal equivalent of the 24 bit instruction word comprised of four omnicode decimal digits. Instead, successive addresses coded in omnicode representation will result in binary numbers whose decimal equivalents are seven apart from each other. For example, a memory address expressed in omnicode representation whose four decimal digits are 3,495 is translated to a binary number whose decimal equivalent is 3,985, while an omnicode address of 3,496 is translated to a binary number whose decimal equivalent is 3,992. In like fashion, a four decimal digit omnicode address of 3,497 is translated to a 12 bit binary number whose decimal equivalent is 3,999.

The method used in performing the address translation may be briefly set forth in the following series of steps. It is assumed that the second instruction word which contains 24 information bits representing four 7N omnicode decimal digits, is in the storage register and that the address counter stages 1–6, 8–13, 15, 16, 17 are reset to 0. The steps of the translation are as follows:

(1) Given the address is in SR in 7N code and the AC is reset.
(2) Add the 6 least significant positions of the SR to the AC.
(3) Reset the 6 least signficant positions of the SR.
(4) Shift R$t$ 3 positions the 12 least significant positions of the SR.
(5) Add the 12 least signficant positions of the SR to AC ($2^3$).
(6) Shift R$t$, 2 pos. the 12 least sig. pos. of SR.
(7) Repeat 5 ($2^1$).
(8) Reset the least 12 significant pos. of SR.
(9) Shift the SR R$t$ 6 pos.
(10) Repeat 5 ($2^6$).
(11) Shift the least significant 12 positions of SR right 1 pos.
(12) Repeat 5 ($2^5$).
(13) Shift right 3 pos. (12 least significant of SR).
(14) Repeat 5 ($2^2$).
(15) Repeat 8.
(16) Shift SR $rt$ 3 pos.
(17) Add SR to AC ($2^9$).
(18) Shift SR $rt$ 1 pos.
(19) Repeat 17 ($2^8$).
(20) Shift SR $rt$ 1 pos.
(21) Repeat 17 ($2^7$).
(22) Shift SR $rt$ 1 pos.
(23) Repeat 17 ($2^6$).
(24) Shift SR $rt$ 1 pos.
(25) Repeat 17 ($2^5$).
(26) Shift SR $rt$ 2 pos.
(27) Repeat 17 ($2^3$).
(28) Reset SR.

An understanding of the above steps may be better gained by a practical example beginning with a 4 digit 7N omnicode address such as 3,495.

| Step | Register | Number Coded in 7N |       |        |        |
|------|----------|--------|--------|--------|--------|
|      | SR       | 010101 | 011100 | 111111 | 100011 |
|      | AC       |        |        | 000000 | 000000 |
| 2    | AC       |        |        | 000000 | 100011 |
| 4    | SR       |        |        | 000111 | 111000 |
| 5    | AC       |        |        | 001000 | 011011 |
| 6    | SR       |        |        | 000001 | 111110 |
| 7    | AC       |        |        | 001010 | 011001 |
| 9    | SR       |        | 010101 | 011100 | 000000 |
| 10   | AC       |        |        | 100110 | 011001 |
| 11   | SR       |        |        | 001110 | 000000 |
| 12   | AC       |        |        | 110100 | 011001 |
| 13   | SR       |        | ------ | 000001 | 110000 |
| 14   | AC       |        |        | 110010 | 001001 |
| 16   | SR       |        | 000010 | 101000 | 000000 |
| 17   | AC       |        | 1      | 011110 | 001001 |
| 18   | SR       |        | 000001 | 010100 | 000000 |
| 19   | AC       |        | 1      | 110010 | 001001 |
| 20   | SR       |        | 000000 | 101010 | 000000 |
| 21   | AC       |        | 10     | 011100 | 001001 |
| 22   | SR       |        | ------ | 010101 | 000000 |
| 23   | AC       |        | 10     | 110010 | 001001 |
| 24   | SR       |        | ------ | 001010 | 100000 |
| 25   | AC       |        | 10     | 111011 | 101001 |
| 26   | SR       |        | ------ | 000010 | 101000 |
| Result |        |        | 010    | 111110 | 010001 |

It will be noted in the above example that a 12 bit binary number has been generated and placed to the address counter stages 1–6 and 8–13. Furthermore, three extra overflow bits have resulted from the addition which are placed in stages 15, 16, and 17. The significance of these three overflow binary bits may be explained as follows. The memory positions totaling 4,096 may be divided into seven different zones with each zone being numbered 0 through 7. The three binary bits residing in address counter stages 15, 16, 17 at the end of the address translation indicate the zone number in which the memory word location is to be found as represented by the generated 12 bit binary number in address counter stages 1–6 and 8–13. Therefore, a convenient check on the accuracy of the translation may be performed by adding three additional core memory planes to the core memory denoted as the X, Y, and Z planes in FIGURE 1. Each storage location in memory may therefore have its zone number represented by three bits which are permanently stored in the associated cores of the X, Y, and Z planes for that particular location. Therefore, when withdrawing a data word from the memory location specified by the generated binary address in the address counter, its zone location may also be retrieved from the X, Y, and Z planes and compared against the generated zone position found in stages 15, 16, and 17 of the address counter. If an equal comparison is made by Unit 114 in FIGURE 1, this is an indication that a correct address translation has been made. Therefore the address register may also contain stages 15, 16, and 17 to which are transferred the zone bits from the address counter for use in making this comparison with the zone bits permanently stored in the X, Y, and Z planes of memory.

The circuitry for accomplishing the above translation steps during the C2 cycle may be explained as follows. First, however, it is necessary that the manner in which the C2 program time is initiated be explained. To briefly recapitulate the operation during C1 time, it is noted that an instruction word is withdrawn from memory and sent to the storage register by virtue of memory ring operation, after which it is added to 0 information contained in the operation register and in the address counter. At the conclusion of this add time, denoted by the setting on of the A4 stage of the add ring, the C1 program time may be terminated. However, if the instruction words are coded in omnicode representation, then the C2 program time must be initiated. This is accomplished by the switching of CP, C1, A4, and DI at AND 1711 to turn off C1 stage and turn on a C2 stage. DI is generated from the manual switch position shown in FIGURE 31. The output signal from AND 1711 is denoted as the SET C2 signal and is also used to initate operation of the M ring by setting on the M1 signal from OR 1801. The M ring operates to first transfer the address from the location register into the address counter which represents the memory address from which the next instruction word is to be withdrawn. It will be remembered that during the C1 cycle, whenever instruction words are coded in 7N form, the address originally denoting the location of the first instruction word was incremented by 7 and placed back into the location register at the conclusion of the C1 time. Therefore, this new address is available to withdraw the second instruction word from memory during the C2 time and place it into the storage register. This second instruction word is likewise error detected during the C2 time by generation of an error detect signal from AND 2502 via OR 2506.

At the conclusion of M ring operation during C2 time, it is now seen that the second instruction word is stored in the storage register. This instruction word contains 24 information bits plus sign with the 24 information bits being grouped into four 7N decimal omnicode digits representing the particular address of the data word to be operated upon in accordance with the operation portion of the first instruction word now stored in the operation register. At this time, it is necessary to initiate operation of the address translator ring shown in FIGURE 21 to govern the steps of the translation. This initiation is performed by switching C2 with M12 and CP at AND 2128 so as to set on the AT1 signal. M12 also switches with C2 and CP at AND 1914 to turn on the A1 signal from the A ring. Upon turning on A1, AT1, A1, and C2 switch at AND 2703 to generate AC reset which resets stages 1–6, 8–13, 15, 16, and 17 of the address counter to 0. Thus, the information placed into the address counter during C1 time, if other than 0 bits, will be erased so that the address counter will be available for use during the translation steps in the C2 cycle.

With initiation of the A ring, it automatically steps through its complete cycle so that signals A2, A3, and A4 follow in one microsecond intervals. These signals are directed to OR 2304 and switch with C2 and AT1 at AND 2306 to generate the ADD 2 signal. The ADD 2 signal in the adders of FIGURES 12 and 13 will be gated via OR gates 1252–1257 and 1353–1358, respectively, to allow only storage register stages 1–6 to be transferred to one input of the associated adder stages 1–6. At the same time, the output from OR gate 2304 is switched with C2 at AND 2311 to generate the AC to SB signal which allows the entire contents of AC including stages 15, 16, and 17 to be directed to the SB for application to all of the adder stages. Thus, step 2 of the address translation method is performed by the adding of the six least significant positions of the SR to the AC. A4 switches with C2 at AND 2315 to generate the gating signal adder to AC so that the sum of this result is placed within the 6 least significant positions of the address counter.

At the conclusion of this first addition operation, A4 switches with CP and AT1 to set on the AT2 stage and turn off AT1. AT2 switches with C2 at AND 2716 to generate the SR 7–1 reset signal which resets positions 1–6 to 0 in accordance with step 3 of the method. The resetting of SR7 is incidental and has no effect since it is not involved in any of the shifting or addition operations. AT2 remains on but one microsecond and is reset by the switching of AT2 with CP at AND 2130 which further turns on AT3. AT3 switches with C2 at AND 2801 to generate the signal SR13–8, 6–1 SHIFT RIGHT signal which in turn shifts right one position the twelve least significant positions of the SR. AT3 remains on but one microsecond and in turn is reset by switching of AT3 against CP at and AND gate not shown in FIGURE 21 but which corresponds in function to the purpose of AND gate 2130 and which further sets on AT4. Setting on of AT4 switches with C2 at AND 2802 to again generate the shift signal from 2810 so as to shift right again the twelve least significant positions of the storage register. The setting of AT5 again generates the signal SR13–8, 6–1 SHIFT RIGHT signal to shift right for the third time the twelve least significant positions of the storage register. Therefore, step 4 in the translation method is accomplished during the AT3, AT4 and AT5 times. AT5 is now switched with CP at AND 2131 to reset AT5 and set AT6. AT5 also switches with C2 and CP at AND 1915 to initiate operation of the add ring and set on A1. Although no operation occurs during a 1 time, an adding operation does occur during A2–A4 time in that an ADD 3 signal is generated from AND 2307 by the switching of the output of OR gate 2304 with a NOT AT1 signal and C2. The ADD 3 signal in both of the adders of FIGURES 12 and 13 is applied to the OR gates 1252–1263 and 1353–1364, respectively, to transmit positions 1–6 and 8–13 in the storage register to the associated adder stages. At the same time, the output from OR circuit 2304 switches with C2 at 2311 to transmit the complete contents of AC to SB so that they may be added to the twelve least significant positions of the storage register. Thus, step 5 of the translation method is performed. At the conclusion of the addition operation during AT6 time, CP switches with A4 and AT6 at AND 2132 to reset AT6 and turn on AT7. AT7 switches with CP at AND 2804 to generate the SR13–8, 6–1 SHIFT RIGHT signal which in turn shifts right one time the twelve least significant positions of the storage register. AT7 now switches with CP at AND 2133 to generate the AT8 signal which again provides a shift right of one position via AND 2805. Therefore, the shift register least significant positions have been shifted right two times in accordance with step 6. AT8 now switches with CP and C2 at AND 1916 to initiate add ring operation which performs step 7 of the method, thus allowing the addition of the twelve least significant positions of the storage register to again be added to the address counter.

The add operation performed during step 7 occurs during AT9 time after which A4 switches with AT9 and CP at AND 2134 to set on AT10 while turning off AT9. AT10 now switches with C2 at AND 2714 to generate the ST14–2 reset signal which in turn resets stages 1–14 of the storage register to 0 in accordance with step 8 of the method. Signals AT11 through AT16 are now generated in succession by each clock pulse and are switched with CP at AND gates 2811–2816 in order to generate six times the signal SR shift right from OR 2826. This signal is applied to all information bit stages of the storage register so as to shift right six times the entire storage register in accordance with step 9. AT16 now switches with C2 and CP at AND 1917 to initiate operation of the add cycle and it also switches at an AND gate not shown to set on the AT17 signal. During the add time of the AT17 step, step 10 is performed in that the twelve least significant positions of the storage register are added to the contents of the address counter by virtue of the generation of the ADD 3 signal from AND 2307 and the generation of the AC to SB signal from OR 2310.

The remaining operation of the translation circuitry is believed to be obvious in view of the detailed description of steps 1 through 10 of the method. In general, the stages of the adress translation ring are utilized to perform the proper number of shifting operations and to time the length of the addition operation during which the add ring is controlling. Thus, at the conclusion of the translation, the address counter has a 12 bit binary number held in positions 1–6 and 8–13 which determines the address of the data word to be subsequently processed. In addition, stages 15, 16, and 17 of the address counter contain 3 bits generated during the translation process which will indicate the memory zone in which the binary address falls. The operation code previously placed into the operation register during the C1 time has remained undisturbed during the C2 time.

DATA CYCLE C3

In the event that the instruction word operation portion now residing in the operation register calls for a data processing operation, such as an add to accumulator or add to MQ operation, a C3 cycle must be initiated upon completion of either the C1 or the C2 times. In the event that the instructions are coded in binary form, then no address translation is needed and it is necessary to step from the C1 stage directly to C3. This is accomplished by switching C1 against A4, CR, BI (indicating that binary instructions are being used), and a signal ARITHMETIC OP 1 which is generated from OR 3139 in response to any of the signals being generated by AND gates 3134–3148. The signal from AND 1713 thereby sets C3 and turns off C1. On the other hand, if instructions are coded in 7N omnicode, a C2 cycle must be initiated immediately after the conclusion of C1 before a C3 cycle can be performed. At the conclusion of the C2 cycle, C3 is now set on. This is accomplished by the switching of C2, A4, AT39, and arithmetic Op at AND 1712 to set C3 and turn off C2. The signal emanating from either AND 1712, denoted as set C3 (1) or the signal from AND 1713, denoted as set C3 (2) is used to also set on the M1 signal of the memory ring and so initiate its operation. M1 switches with C3 to reset the storage register in preparation of a transfer of a data word from memory into the storage register during M7. M3 switches with C3 at AND 2607 to generate the AC to AR signal which transfers the data word address into the address register for use in locating its memory location. The address counter is also stepped during C3 time by either an increment of 1 or an increment of 7 by virtue of the operation of the circuit in FIGURE 24. The only reason for this operation is that if a double add operation is to be performed, a second data word must be withdrawn during a C4 cycle from a storage location adjacent the location in which the data word during C3 is withdrawn. It will be noted that the modified address in address counter is not placed into the location register at the end of C3 time, since the contents of the location register at this time hold the address for the next instruction.

At M11 time of the C3 cycle, the signal SR to SB will be generated and an error-detect signal will be generated from OR 2506 if the data word is an omnicode form. This is accomplished by switching of M11, C3 and ONW at AND 2503. Thus, the data word withdrawn from memory during C3 time will be monitored by the error-detector and an error indicated if it is coded in either 7N or 9M. At M12 time, the data word contained in the storage register is regenerated back to its memory location so that it will not be lost.

M12 switches with C3 and CP at AND 1912 to initiate operation of the add ring inasmuch as an arithmetic operation involving the add ring will be accomplished during the C3 time, by definition. If the operation is a reset add to accumulator or a load MQ, then either the accumulator register or the MQ register must be cleared before the number from the storage register may be entered therein. A1 therefore switches with C3 and RESET ADD to ACCUMULATOR at AND 2718 to reset the entire acumulator register, while A1 may switch with C3 and load MQ at AND 2719 to reset the MQ register. The signals A2, A3, and A4 now follow in sequence and generate an ADD 1 signal via OR 2304 and AND 2305 since a NOT C2 signal is not present. If the operation is either an add to accumulator or a reset add to accumulator function, then a signal accumulator to SB will be generated via AND 2328 or AND 2324, respectively, so as to direct the appropriate one of these two registers to the SB leads of the associated adder stage. At the same time that the initial addition is occurring, a LATCH A signal is generated from OR 2333 by means of either AND gate 2328 or AND gate 2338 which enables the carry storage units in the adders of FIGURE 12 or 13 to sample the input and output carries from each of the digit blocks in order to retain their indication for use during the conditional add cycle if such is necessary. In the case of the instructions RESET ADD TO ACCUMULATOR and LOAD MQ, there would never be any necessity for a conditional add cycle since the number from the storage register is always effectively add to 0's and thus the sum will be always represented by a valid code combination no matter what its mode of representation might be.

If, on the other hand, the data words being added together in the case of an ADD TO ACCUMULATOR or an ADD TO MQ instruction are represented in either one of the omnicodes, then a conditional add cycle is initiated which will provide the addition of the proper pattern to each of the decimal digits contained in the sum register. C3 switches with A3, CP, ARITH OP2, and ONW at AND 2007 to generate the CA1 signal which initiates operation of the conditional add ring. The switching of the successively occurring signals, CA1, CA2, and CA3 at OR 2343 will generate the conditional add signal which permits the conditional add pattern to be applied to one input of each of the adder stages as previously described, furthermore, in the case of ADD TO ACCUMULATOR, the switching of the output from OR 2343 with the ADD TO ACCUMULATOR signal and a C3 signal at AND 2331 causes generation of the ACCUMULATOR to SB signal which applies the initially formed sum again to the adder for combination with the conditional add pattern. The LATCH A signal remains on during this conditional add cycle in order to maintain the carry indications in each of the carry storage units until the new sum has been placed back into the result register. This occurs at CA3 time by means of either AND gates 2332 or 2341 which sample the adder output and complement those stages of the result register (ACCUMULATOR REGISTER or MQ REGISTER) which need to be changed. At CA4 time, the final sum from either of these two registers is transmitted to SB by means of either AND gate 2327 or 2335 where the error detector monitors same in order to discover any invalid combinations in either of the two omnicodes. Thus, CA4 via OR gate 2506 generates an error detect signal for sampling the output of the error detector at this particular time.

It should be appreciated in connection with adder operation during the C3 time that the input carry to ADDER STAGE 1 is 0, inasmuch as AND gate 1296 is not conditioned by a C3 signal. The function of AND gate 1296 and its associated input circuitry will be explained in connection with the C4 double add time next to be described.

DOUBLE ADD TIME C4

In the event that the instruction operation requires the function of a double add, the following procedure is followed. As previously explained, the instruction double add required that a data word first be withdrawn from memory at the storage location indicated by the address of the instruction word and added to the contents of the MQ register. This occurs during the C3 time. The address of this first data word is then incremented by 7 in the address counter during the C3 time and is used during a C4 time to withdraw a second data word from memory which is to be added to the contents of the accumulator register. Any carries resulting from the addition of C3 time must be accounted for during the addition in C4 time inasmuch as the MQ and accumulator registers are in this particular case considered to be connected in tandem with the order of stage 27 in the MQ register being one decimal order less than the stage 1 in the accumulator register. The C3 time is initiated as previously described at the conclusion of either C1 or C2 time. However, the switching of double add with C3 at AND 3140 forces on the ADD TO MQ signal which performs the addition of the first data word in the storage register with the contents of the MQ register as previously described. During this C3 add time, a sample signal is generated by the switching of the output of OR 2304 with C3 and the double add signal generating from AND 3138. This conditions AND 1391 in FIGURE 13 or AND 1292 in FIGURE 12 to sample the carry out of adder stage 27 which would correspond to the carry overflow resulting from the addition of the number to the MQ register. Thus, the carry overflow resulting out of the MQ register is stored in a recirculating group consisting of OR 1392 and AND 1393, or OR 1293 and AND 1294. At the conclusion of the conditional add time in the C3 cycle, which insures that the sum digits residing in the MQ register are in a valid code combination, the C3 signal is terminated and C4 time begins. This is accomplished by switching C3 with CA4, double add, and CP at AND 1716 to set the C4 signal and terminate C3. Upon initiation of the C4 time, AND 3141 generates a signal which forces on the ADD TO ACCUMULATOR signal from OR 3143. At the same time, the signal from AND 1716 turns on the memory cycle via OR gate 1801 in order to withdraw the second data word from a memory location specified by the address held in the address counter. It will be recalled that during C3 time, in the case of an instruction expressed in omnicode, the original address portion of the instruction held in the address counter is incremented by 7 so as to indicate the memory location of the second data word to be used in that double add operation. The address counter is therefore transferred to the address register in order to withdraw the second data word and place it into the storage register for use in the C4 time. As in the case of C3, this second data word in the storage register is circulated to the SB at M11 time to be monitored by the error detector since it is in one of the two omnicodes. It is furthermore transferred back into memory at M12 time.

At the conclusion of the memory cycle during C4 time, M12, C4, and CP switch at AND 1913 to initiate operation of the add ring. Since the signal ADD TO ACCUMULATOR is forced on during C4 time by action of AND 3141, it is seen that the second data word now held in the storage register will be added to the contents of the accumulator register. At the same time, C4 conditions AND gate 1296 or AND gate 1395 to pass the carry indication to the carry input of the first adder stage so that the carry over during the ADD TO MQ operation will be considered in the subsequent ADD TO ACCUMULATOR operation. At the end of the add time in C4 cycle, a conditional add cycle will be initiated in order to correct the initial sum placed within the accumulator register so that it is represented in a valid omnicode combination. The final sum in the accumulator register is again monitored by the error detector at the end of C4 time.

If the instruction operation contained in the operation register is an arithmetic operation, its performance is completed by the end of the C3 or the C4 time and a new instruction cycle must be initiated in order to withdraw the next instruction to be performed. If the instruction is an add to accumulator operation, and the data word is coded in binary, then no conditional add cycle is necessary in C3 time, nor is a C4 time required. Therefore, A4, BW, C3, and CP switch at AND 1715 to reset C3 and set C1 via OR 1701. The setting of C1 initiates an instruction cycle as previously described. On the other hand, if the data word is coded in omnicode, a conditional add cycle is performed in C3 time only if an ARITH OP 2 signal is present so that CA4, ONW, NO DOUBLE ADD, and CP switch at AND 1714 to reset C3 and set C1. However, if a double add instruction is present, then a C4 cycle must be performed which includes both an add cycle and a CA cycle. Therefore, CA4, C4, and CP switch at AND 1717 to reset C4 and set C1 in such a situation.

READ-WRITE CYCLE C5

If an instruction contained in the operation register indicates that information must be read to or from the input-output device, then neither a C3 nor a C4 cycle is initiated. Instead, a C5 cycle is initiated at the end of either C1 or C2 depending upon the mode in which the instruction is coded. If the instruction is coded in binary, the C1 switches with B1, A4, IO, and CP at AND 1718 to set C5 upon the termination of the C1 operation. If a C2 cycle is necessary, however, C2 switches with A4, AT39, IO, and CP at AND 1719 to set C5 and terminate C2.

If the instruction calls for a read-in of information from the input-output device to the memory, it is first necessary to initiate operation of the input-output ring in order to sequentially load the storage register with 7 bit characters supplied by the input-output device as it scans the storage medium, such as magnetic tape. Consequently, either one of the signals from AND gates 1718 or 1719 is applied via OR gate 1724 to AND gate 2211 which is only conditioned if the instruction is READ. Signals applied by AND gate 2211 are used to set the IO1 state of the IO ring so as to initiate operation of that ring. IO1 switches with READ and C5 at AND 2710 to generate the SR RESET signal which clears the storage register in order to prepare it to receive characters from the input-output device. At the next succeeding CP pulse, IO1 switches with CP at AND 2212 to set IO2 which remains on until an input-output signal is received from the input-output device signifying that a character has been read by that device and it is available to be read into the storage register. The first such character read by the input-output device may actually comprise only one bit which is indicative of the sign of the complete number to be stored in the storage register during this particular operation of the input-output ring. IO2 is therefore switched with the READ signal, IO2 C5, and the input-output signal at AND 2907 to generate the REAL TO SR SIGN signal. In turn, a READ TO SR SIGN signal switches at AND 456 with the input sense sign amplifier to gate the sign to the SR sign stage. The input-output signal also switches at AND 2213 with IO2 to set IO3 and reset IO2. The input-output ring now remains on IO3 until the next input-output signal is received, thus indicating that the next character read by the input-output device is available for insertion into the storage register. IO3 switches with READ, C5, and the IO signal at AND 2909 to generate the READ TO SR 28–22 signal. This latter gating signal is applied to AND gates such as 453 associated with storage register stages 22–28 for purposes of reading a full 7 bit character from the input-output device into this particular decimal group. In like fashion, the input-output signal switches with IO3 at AND 2214 to set IO4 which in turn will gate the next character from the input-output device into storage register stages 15–21. The operation of the input-output ring continues with the two following characters being inserted into storage register stages 8–14 and 1–7 in that time order. Therefore, at the conclusion of the IO6 time, the storage register stages 1–28 and sign are filled with information and check bits.

At the conclusion of this cycle of the input-output ring, it is now necessary to initiate operation of the memory ring so as to place the 24 information bits plus sign into the proper location in memory according to the address contained in the address counter at this time. First of all, however, the error detector-corrector monitors each of the 7 bit characters in the storage register so as to detect any single errors and correct same before the information is stored into memory. This error correction is accomplished during the memory cycle in the following manner. The IO signal, IO6, and READ switch at AND 1808 to set on M1 at the time that the last character is inserted in the storage register positions 1–7. The M ring now runs in a manner indicated previously except that the storage register is not reset by M1 inasmuch as it contains information desired to be placed in the memory by the M12 signal. However, the address counter is transferred to the address register which is used to address the memory position into which the storage register word must be placed, and the address counter is further incremented by either 1 or 7, depending upon whether the instructions are in the binary or omnicode mode. At M11 time, ONW, C5, and M11 switch at AND 2507 to generate an error correct signal which samples the error detector-corrector in order to correct any false information bits in each of the four decimal order positions of the storage register as was previously indicated. It should be noted that if the word in the storage register is not expressed in an omnicode mode, then the error detector-corrector is not sampled at this time. At M12 time, the word in the storage reigster is then transferred via SB into memory location specified by the address in the AR. M12 also switches with CP and the NOT END RECORD at AND 2210 to again initiate operation of the input-output device so that a new series of characters from the input-output device may be successively stored within the storage register. When the storage register is again filled to capacity by the end of IO6 time, the memory ring is again operated to store this second word into a memory location indicated by the address in the AR. It will be noted that the address in the address register at this time is the address contained in the original instruction incremented by either 1 or 7 during the previous memory cycle in accordance with the mode in which the instrutcion is coded. The alternate action of the input-output ring and the memory ring is continued as an END OF RECORD signal is received from the input-output device which prevents M12 from initiating another input-output ring cycle from AND 2210. At this time, the end of record switches with M12, C5, and CP at AND 1721 to turn off C5 and turn on C1 to initiate a new instruction cycle.

In the event that the operation register contains a write code, the memory ring is initially started at the beginning of the C5 time instead of the input-output ring, as was the case when the read instruction is to be performed. The SET C5 signal from OR 1725 switched with WRITE signal at AND 1814 to initially turn on M1 of the memory ring. M1 switches with C5 and WRITE at AND 2709 to insure that the storage register is reset in order that it may receive information from the memory which is to be subsequently transferred to the input-output device. As in the case of the READ instruction, the address is transferred to AR and then subsequently is incremented by 1 or 7 depending upon the coding mode of the instruction. At M7 time, the word from memory is written in parallel into the storage register wherein it occupies stages 1–6, 8–13, 15–20, 22–27, and the sign stage. It will be noted that no checking bit is derived from memory inasmuch as there is no provision for storage therein of such bits. At M11 time, the storage register is read to the SB and an error correct signal will be generated from AND 2507 in the event that the word is in one of the omnicodes. The error correct signal will sample the error detector-corrector which at M11 time is monitoring the word on the storage bus so that check bits will be effectivey generated by the error detector-corrector and inserted into stages 7, 14, 21, and 28. Thus, although no check bits are initially associated with the information bits in the storage register, they are generated by the error detector-corrector assuming that all information bits derived from the memory are in valid code combinations. At M12 time, the information from storage register minus the check bits are reinserted into memory so that they will be retained therein. At the conclusion of the memory ring cycle, M12 switches with CP and NOT END RECORD at AND 2210 to initiate operation of the input-output ring. IO1 fails to reset SR at this point due to the absence of a READ signal at AND 2710. Thereupon, step IO2 of the input-output ring is initiated at the following CP time.

The input-output ring remains on IO2 until receipt of input-output signal signifying that the input-output device is now ready to receive a 7 bit character or the like from the storage register. IO2 switches with C5, WRITE, and the IO signal at AND 2908 to generate the WRITE FROM SR SIGN signal. The WRITE FROM SR SIGN signal conditions AND gate 1110 to pass the information from the storage register sign position to the $b_0$ input-output lead. Since the sign character is represented by merely 1 bit, the other input-output leads $b_1$–$b_6$ effectively contains 0 so that a 7 bit character is written on the tape which represents the sign and which contains a 1 only in position $b_0$. The switching of the IO signal with IO2 at AND 2213 steps the ring to IO3 whereupon it awaits the arrival of a subsequent IO signal indicating that the input-output device is able to receive another character from the storage register. IO3 switches with WRITE signal, the IO signal, C5 at AND 2910 to generate the WRITE FROM SR 28–22, which in turn is applied to AND gate such as 1109 associated with each of the seven leads which transmit a 7 bit character to the input-output device. AND 1109 is actually associated with storage register stage 22.

The input-output ring continues to step with IO4, IO5, and IO6 signals successively reading out the information contained in storage register stages 15–21, 8–14, and 1–7, respectively. When the IO signal arrives during the IO6 time, and an END OR RECORD has been detected indicating that the block of information to be transferred to the input-output device is completed, no signal is generated by AND 1808 so that it is impossible to initiate the M ring operation at this time. The END RECORD signal switches with M12 at 1721 to turn off C5 and initiate an instruction cycle by turning on C1. In this way, a read or write instruction may be performed.

While a particular embodiment of the present invention has been shown and described, many modifications thereof may be apparent to those skilled in the art without departing from the spirit of the invention as defined in the appended claims.

What is claimed is:

1. In a multi-mode information processing system for handling data words expressed in any one of a plurality of codes including binary, and codes other than binary, including checked octal, and checked decimal, where said codes other than binary are represented in the binary system of notation with each ordinal digit being represented by a combination of six binary information bits $b_0$ to $b_5$, inclusive, having a relationship to each other of $$b_0 \dotplus b_3 = b_1 \dotplus b_4 = b_2 \dotplus b_5$$

with the symbol $\dotplus$ indicating sum modulo two, the combination comprising: common bus means for transferring within the system data words expressed in any one of said plurality of codes, selecting means for designating which of said plurality of codes is being used, common arithmetic means associated with said bus means for arithmetically operating upon data words expressed in a like code of any of said plurality, and common means also associated with said bus means and controlled by said selecting means for monitoring the ordinal digits of such data expressed in any one of said codes other than binary to detect all single errors occurring therein which destroy the said relationship between the binary bits, said last-mentioned common means comprising means controlled by said arithmetic means for generating signals representing the sum modulo two of the pairs of bits $b_0$ and $b_3$, $b_1$ and $b_4$, $b_2$ and $b_5$, of the result of the arithmetic operation, means for comparing said signals, and means responsive to said comparing means for generating an error signal when said sum signals are unequal.

2. A combination according to that of claim 1 in which said arithmetic means includes means controlled by said selecting means when designating one of said codes other than binary for causing said adding means to add two data words to form an initial resultant word, means for generating different pattern words represented by binary bits having a relationship to each other in accordance with the code of said two data words, and means controlled in accordance with the designation of said selecting means and said initial resultant word for controlling said adding means to add to the binary bits of said initial resultant word the appropriate one of said pattern words to form a final resultant data word expressed in the code of said two data words.

3. In a multi-mode information processing system for handling data words expressed in any one of a plurality of codes including binary, and codes other than binary, including checked octal, and checked decimal, where said codes other than binary are represented in the binary system of notation with each ordinal digit being represented by a combination of seven binary information bits $b_0$ to $b_5$ and $c_1$, inclusive, which have a first relationship to each other of $$b_0 \dotplus b_3 = b_1 \dotplus b_4 = b_2 \dotplus b_5$$

and a second relationship to each other of $$c_1 = b_0 \dotplus b_1 \dotplus b_2 \dotplus 1$$

with the symbol $\dotplus$ indicating sum modulo two; the combination comprising; common bus means for transferring within the system data words expressed in any one of said plurality of codes, selecting means for designating which of said plurality of codes is being used, common arithmetic means associated with said bus means for arithmetically operating upon data words expressed in the binary code and upon bits $b_0$ to $b_5$ of data word ordinal digits expressed in any one of said codes other than binary, first common monitoring means associated with said bus means and controlled by said selecting means for monitoring bits $b_0$ to $b_5$ of data word ordinal digits expressed in any one of said codes other than binary to detect all single errors occurring therein which destroy the said first relationship, and second common monitoring means associated with said bus means for monitoring bits $b_0$ to $b_5$ and $c_1$ of data word ordinal digits expressed in any one of said other codes other than binary to correct all single errors occurring therein which destroy said first and second relationships, said first common monitoring means comprising means controlled by said arithmetic means for generating signals representing the sum modulo two of the pairs of bits $b_0$ and $b_3$, $b_1$ and $b_4$, $b_2$ and $b_5$, of the result of the arithmetic operation, means for comparing said sum signals, and means responsive to said comparing means for generating an error signal when said sum signals are unequal, said second monitoring means comprising means for issuing a correction signal if said second relationship is untrue, and means controlled by the result of said comparison of said sum signals and by the presence or absence of said correction signal for correcting a selected single bit of the result of said arithmetic operation.

4. A combination according to that of claim 3 in which said arithmetic operation means includes means controlled by said selecting means when designating one of said codes other than binary for causing said adding means to add two data words to form an initial resultant data word, means for generating different pattern words represented by binary bits having a relationship to each other in accordance with the code of said two data words, and means controlled by said selecting means and said initial resultant word for controlling said adding means to add to the binary bits of said initial resultant word the appropriate one of said pattern words to form a final resultant data word expressed in the code of said two data words.

5. In a multi-mode information processing system for handling data words expressed in any one of a plurality of codes including checked octal and checked decimal, where said codes are represented in the binary system of notation with each ordinal digit being represented by a combination of six binary information bits $b_0$ to $b_5$, inclusive, having a relationship to each other of $$b_0 \dotplus b_3 = b_1 \dotplus b_4 = b_2 \dotplus b_5$$

with the symbol $\dotplus$ indicating sum modulo two: the combination comprising common bus means for transferring within the system data words expressed in any of said plurality of codes, selecting means for designating which of said plurality of codes is being used common arithmetic means associated with said bus means for arithmetically operating upon data words expressed in a like code of any of said plurality, and common means also associated with said bus means and controlled by said selecting means for monitoring the ordinal digits of such data to detect all single errors occurring therein which destroy the said relationship between the binary bits, said last-mentioned common means comprising means for generating signals representing the sum modulo two of the pairs of bits $b_0$ and $b_3$, $b_1$ and $b_4$, $b_2$ and $b_5$, means for comparing said signals, and means responsive to said comparing means for generating an error signal when said sum signals are unequal.

6. A combination according to that claim 5 in which said arithmetic operation means includes means controlled by said selecting means for causing said adding means to add two data words, means for generating different pattern words represented by binary bits having a relationship to each other in accordance with the code of said two data words, and means for controlling said adding means controlled by said selecting means and said initial resultant word to add to the binary bits of said initial resultant word the appropriate one of said pattern words to form a final resultant data word expressed in the code of said two data words.

7. In a multi-mode information processing system for handling words expressed in any one of a plurality of codes including checked octal and checked decimal, where said codes are represented in the binary system of notation with each ordinal digit being represented by a combination of seven binary information bits $b_0$ to $b_5$ and $c_1$ inclusive, which have a first relationship to each other of $$b_0 \dotplus b_3 = b_1 \dotplus b_4 = b_2 \dotplus b_5$$

and a second relationship to each other of $$c_1 = b_0 \dotplus b_1 \dotplus b_2 \dotplus 1$$

with the symbol $\dotplus$ indicating sum modulo two, the combination comprising: common bus means for transferring within the system data words expressed in any of said plurality of codes, selecting means for designating which of said plurality of codes is being used, common arithmetic means associated with said bus means for arithmetically operating upon bits $b_0$ to $b_5$ of data word ordinal digits expressed in any one of said codes, first common monitoring means associated with said bus means and controlled by said selecting means for monitoring bits $b_0$ to $b_5$ of data word ordinal digits expressed in the selected one of said codes to detect all single errors occurring therein which destroy the first relationship, and second common monitoring means associated with said bus means for monitoring bits $b_0$ to $b_5$ and $c_1$ of data word ordinal digits expressed in the selected one of said codes to correct all single errors occurring therein which destroy said first and second relationships, said first common monitoring means comprising means controlled by said arithmetic means for generating signals representing the sum modulo two of the pairs of bits $b_0$ and $b_3$, and $b_4$, $b_2$ and $b_5$, of the result of the arithmetic operation, means for comprising said sum signals, and means responsive to said comparing means for generating an error signal when said sum signals are unequal, said second common monitoring means comprising means for issuing a correction signal if said second relationship is untrue and means controlled by the result of said comparison of said sum signals and by the presence or absence of said correction signal for correcting a selected single bit of the result of said arithmetic operation.

8. A combination according to that of claim 7 in which said arithmetic operation means includes means controlled by said selecting means for causing said adding means to add two data words to form an initial resultant data word, means for generating different pattern words represented by binary bits having a relationship to each other in accordance with the code of said two data words, and means for controlling said adding means controlled by said selecting means and said initial resultant word to add to the binary bits of said initial resultant word the appropriate one of said pattern words to form a final resultant data word expressed in the code of said two data words.

9. In a multi-mode information processing system for handling data words expressed in any one of a plurality of codes including binary and checked decimal, where said checked decimal code is represented in the binary system of notation with each ordinal digit being represented by a combination of six binary information bits $b_0$ to $b_5$, inclusive, each having a relationship to each other of $$b_0 \dotplus b_3 = b_1 \dotplus b_4 = b_2 \dotplus b_5$$

with the symbol $\dotplus$ indicating sum modulo two, the combination comprising: common bus means for transferring within the system data words expressed in any of said plurality of codes, selecting means for designating which of said plurality of codes is being used, common arithmetic means associated with said bus means for arithmetically operating upon data words expressed in a like code of any of said plurality, and common means also associated with said bus means and controlled by said selecting means for monitoring the ordinal digits of such data expressed in the checked decimal code to detect all single errors occurring therein which destroy the said relationship between the binary bits, said last-mentioned common means comprising means controlled by said arithmetic means for generating signals representing the sum modulo two of the pairs of bits $b_0$ and $b_3$, $b_1$ and $b_4$, $b_2$ and $b_5$, of the result of the arithmetic operation, means for comprising said signals, and means responsive to said comparing means for generating an error signal when said sum signals are unequal.

10. A combination according to that of claim 9 in which said arithmetic operation means includes means controlled by said selecting means for causing said adding means to add two data words to form an initial resultant data word, means for generating different pattern words represented by binary bits having a relationship to each other in accordance with the code of said two data words, and means controlled by said selecting means and said initial resultant data word for controlling said adding means to add to binary bits of said initial resultant word the appropriate one of said pattern words to form a final resultant data word expressed in the code of said two data words.

11. In a multi-mode information processing system for handling data words expressed in any one of a plurality of codes including binary and checked decimal, where said checked decimal code is represented in the binary system of notation with each ordinal digit being represented by a combination of seven binary information bits $b_0$ to $b_5$ and $c_1$, inclusive, which have a first relationship to each other of $$b_0 \dotplus b_3 = b_1 \dotplus b_4 = b_2 \dotplus b_5$$

and a second relationship to each other of $$c_1 = b_0 \dotplus b_1 \dotplus b_2 \dotplus 1$$

with the symbol $\dotplus$ indicating sum modulo two, the combination comprising: common bus means for transferring within the system data words expressed in any of said plurality of codes, selected means for designating which of said plurality of codes is being used, common arithmetic means associated with said bus means for arithmetically operating upon data words expressed in the binary code and upon bits $b_0$ to $b_5$ of data word ordinal digits expressed in the checked decimal code, first common monitoring means associated with said bus means for monitoring said $b_0$ to $b_5$ of data word ordinal digits expressed in the checked decimal code to detect all single errors occurring therein which destroy said first relationship, and second common monitoring means associated with said bus means for monitoring bits $b_0$ to $b_5$ and $c_1$ of data word ordinal digits expressed in the checked decimal code to correct all single errors occurring therein which destroy said first and second relationships, said first common monitoring means comprising means controlled by said arithmetic means for generating signals representing the sum modulo two of the pairs of bits $b_0$ and $b_3$, $b_1$ and $b_4$, $b_2$ an d $b_5$, of the result of the arithmetic operation, means for comparsing said sum signals, and means responsive to said comparing means for generating an error signal when said sum signals are unequal, said second common monitoring means comprising means for issuing a correction signal if said second relationship is untrue and means controlled by the result of said comparison of said sum signals and by the presence or absence of said correction signal for correcting a selected single bit of the result of said arithmetic operation.

12. A combination according to that of claim 11 in which said arithmetic operation means includes means controlled by said selecting means for causing said adding means to add two data words to form an initial resultant data word, means for generating different pattern words represented by binary bits having a relationship to each other in accordance with the code of said two data words, and means controlled by said selecting means and said initial resultant data word for controlling said adding means to add to binary bits of said initial resultant word the appropriate one of said pattern words to form a final resultant data word expressed in the code of said two data words.

13. In a multi-mode information processing system for handling data words expressed in any one of a plurality of codes including binary and checked octal, where said checked octal code is represented in the binary system of notation with each ordinal digit being represented by a combination of six binary information bits $b_0$ to $b_5$, inclusive, having a relationship to each other of $$b_0 \dotplus b_3 = b_1 \dotplus b_4 = b_2 \dotplus b_5$$

with the symbol $\dotplus$ indicating sum modulo two, the combination comprising: common bus means for transferring within the system data words expressed in any of said plurality of codes, selecting means for designating which of said plurality of codes is being used, common arithmetic means associated with said bus means for arithmetically operating upon data words expressed in a like code of any of said plurality, and common means also associated with said bus means and controlled by said selecting means for monitoring the ordinal digits of such data expressed in the checked octal code to detect all single errors occurring therein which destroy the said relationship between the binary bits, said last-mentioned common means comprising means controlled by said arithmetic means for generating signals representing the sum modulo two of the pairs of bits $b_0$ and $b_3$, $b_1$ and $b_4$, $b_1$ and $b_5$, of the result of the arithmetic operation, means for comparing said signals, and means responsive to said comparing means for generating an error signal when said sum signals are unequal.

14. A combination according to that of claim 13 in which said arithmetic operation means includes means controlled by said selecting means for causing said adding means to add two data words to form an initial resultant data word, means for generating different pattern words represented by binary bits having a relationship to each other in accordance with the code of said two data words, and means controlled by said selecting means and said initial resultant data word for controlling said adding means to add to the binary bits of said initial resultant word the appropriate one of said pattern words to form a final resultant data word expressed in the code of said two data words.

15. In a multi-mode information processing system for handling data words expressed in any one of a plurality of codes including binary and checked octal, where said checked octal code is represented in the binary system of notation with each ordinal digit being represented by a combination of seven binary information bits $b_0$ to $b_5$ and $c_1$, inclusive, which have a first relationship to each other of $$b_0 \dotplus b_3 = b_1 \dotplus b_4 = b_2 \dotplus b_5$$

and a second relationship to each other of $$c_1 = b_0 \dotplus b_1 \dotplus b_2 \dotplus 1$$

with the symbol $\dotplus$ indicating sum modulo two, the combination comprising: common bus means for transferring within the system data words expressed in any of said plurality of codes, selecting means for designating which of said plurality of codes is being used, common arithmetic means associated with said bus means for arithmetically operating upon data words expressed in the binary code and upon bits $b_0$ to $b_5$ of data word ordinal digits expressed in the checked octal code, first common monitoring means associated with said bus means for monitoring bits $b_0$ to $b_5$ of data word ordinal digits expressed in the checked octal code to detect all single errors occurring therein which destroy said first relationship, and second common monitoring means associated with said bus means for monitoring said $b_0$ to $b_5$ and $c_1$ of data word ordinal digits expressed in the checked octal code to correct all single errors occurring therein which destroy said first and second relationships, said first common monitoring means comprising means controlled by said arithmetic means for generating signals representing the sum modulo two of the pairs of bits $b_0$ and $b_3$, $b_1$ and $b_4$, $b_2$ and $b_5$, of the result of the arithmetic operation, means for comparing said sum signals, and means responsive to said comparing means for generating an error signal when said sum signals are equal, said second common monitoring means comprising means for issuing a correction signal if said second relationship is untrue and means controlled by the result of said comparison of said sum signals and by the presence or absence of said correction signal for correcting a selected single bit of the result of said arithmetic operation.

16. A combination according to that of claim 15 in which said arithmetic operation means includes means controlled by said selecting means for causing said adding means to add two data words to form an initial resultant data word, means for generating different pattern words represented by binary bits having a relationship to each other in accordance with the code of said two data words, and means controlled by said selecting means and said initial resultant data word for controlling said adding means to add to the binary bits of said initial resultant word the appropriate one of said pattern words to form a final resultant data word expressed in the code of said two data words.

17. In a multi-mode information processing system for handling data words expressed in any one of a first plurality of codes, including binary, checked octal and checked decimal in accordance with instruction words expressed in any one of a second plurality of codes, including binary or checked decimal, where both said checked octal and checked decimal codes are represented in the binary system of notation with each ordinal digit being represented by a combination of six binary information bits $b_0$ to $b_5$, inclusive, having a relationship to each other of $$b_0 \dotplus b_3 = b_1 \dotplus b_4 = b_2 \dotplus b_5$$

with the symbol $\dotplus$ indicating the sum modulo two, the combination comprising: common bus means for transferring within the system data and instruction words expressed in any of said first or second code pluralities, respectively, common means associated with said bus means for monitoring the ordinal digits of such data words expressed in the checked octal or checked decimal codes and such instruction words expressed in said checked decimal code to detect all single errors occurring therein which destroy the said relationship between the binary bits, means settable to first or second states if an instruction word is coded in binary or in checked decimal, respectively, an address counter associated with said common bus means, means responsive to said settable means in its first state for transferring an address portion of an instruction word on said bus means to said address counter, and means responsive to said settable means in its second state for translating an address portion of an instruction word on said bus means from said checked decimal to binary and transferring said translated address to said address counter.

18. The combination according to claim 17 in which said translating means includes means for shifting parts of said address portion of an instruction word during successive cycles, and means for adding together said shifted parts in each cycle to form said translated address.

19. In a memory addressing system provided with pairs of first and second instruction words expressed in a checked decimal code, where said checked decimal code is represented in the binary system of notation with each ordinal digit being represented by a combination of six binary information bits $b_0$ to $b_5$, inclusive, having a relationship to each other of $$b_0 \dotplus b_3 = b_1 \dotplus b_4 = b_2 \dotplus b_5$$

with the symbol $\dotplus$ indicating sum modulo two, and with a portion of the first instruction word of each pair indicating an operation while the second instruction word of each pair indicates a memory address to be used in accordance with said operation, the combination comprising: operation register means, address counter means, means for first applying the operation portion of the first instruction word of a pair to said operation register means, and means for then translating the address of the second instruction word of said pair from checked decimal to binary and applying said translated address to said address counter.

20. The combination of claim 19 in which said translating means includes means for shifting parts of said checked decimal address during successive cycles and means for adding together in successive cycles the said shifted parts to form said translated address.

21. The combination of claim 19 in which said translating means includes means to effectively multiply each ordinal digit of the checked decimal address during successive cycles by a factor corresponding to its order position, and means for adding together in successive cycles the products resulting from said multiplication to form said translated address.

22. A circuit for correcting all single errors occurring in a digit expressed in either a checked decimal code or a checked octal code, where both of said codes are represented in a binary system of notation with each ordinal digit being represented by a combination of seven binary information bits $b_0$ to $b_5$ and $c_1$, inclusive, which have a first relationship to each other of $$b_0 \dotplus b_3 = b_1 \dotplus b_4 = b_2 \dotplus b_5$$

and a second relationship to each other of $$c_1 = b_0 \dotplus b_1 \dotplus b_2 \dotplus 1$$

with the symbol $\dotplus$ indicating sum modulo two, said circuit comprising: first means monitoring binary bits $b_0$ to $b_5$, inclusive, of a digit for generating a first error signal identifying any pair of bits in said first relationship whose sum modulo two differs from the sum modulo two of the other pairs of bits in said first relationship, second means monitoring binary bits $b_0$, $b_1$, $b_2$, and $c_1$ of a digit to generate a second error signal indicating any discrepancy in said second relationship, third means responsive to an output from said first means and to the absence of an output from said second means to generate a correction signal for one of said bits $b_3$, $b_4$ or $b_5$, fourth means responsive to an output from said first means and an output from said second means to generate a correction signal for one of said bits $b_0$, $b_1$ or $b_2$, and fifth means responsive to an output from said second means and the absence of a correction signal from said fourth means to generate a correction signal for bit $c_1$.

23. A circuit according to claim 22 in which said first means comprises a first circuit for generating an output representing the sum modulo two of bits $b_0$ and $b_3$, a second circuit for generating an output representing the sum modulo two of bits $b_1$ and $b_4$, a third circuit for generating an output representing the sum modulo two of bits $b_2$ and $b_5$, first, second and third means for respectively inverting said outputs of said first, second and third sum circuits, a first AND gate responsive to outputs from said first sum circuit and said second and third inverters, a second AND gate responsive to outputs from said first inverter and said second and third sum circuits, a third AND gate responsive to outputs from said second sum circuit and said first and third inverters, a fourth AND gate responsive to outputs from said second inverter and said first and third sum circuits, a fifth AND gate responsive to outputs from said third sum circuit and said first and second inverters, a sixth AND gate responsive to outputs from said third inverter and said first and second sum circuits, and first, second and third OR gates, respectively, responsive to outputs from said first and second, third and fourth, and fifth and sixth AND gates to generate said first error signal.

24. A circuit according to claim 22 in which said second means comprises a first circuit for generating an output representing the sum modulo two of bits $b_0$ and $b_1$, a second circuit for generating an output representing the sum modulo two of the first circuit output and bit $b_2$, a third circuit for generating an output representing the sum modulo two of the second circuit output and bit $c_1$, and means to invert the output of said third circuit to obtain said second error signal.

25. A circuit according to claim 23 in which said second means comprises a fourth circuit for generating an output representing the sum modulo two of bit $b_0$ and $b_1$, a fifth circuit for generating an output representing the sum modulo two of the fourth circuit output and bit $b_2$, a sixth circuit for generating an output representing the sum modulo two of the fifth circuit output and bit $c_1$, and means to invert the output of said sixth circuit to obtain said second error signal.

26. A circuit for detecting all single errors occurring in a digit expressed in a code represented in the binary system of notation with each ordinal digit being represented by a combination of six binary information bits $b_0$ to $b_5$, inclusive, which have a relationship to each other of $$b_0 \dotplus b_3 = b_1 \dotplus b_4 = b_2 \dotplus b_5$$

with the symbol $\dotplus$ indicating sum modulo two, said circuit comprising: first means for generating an output representing the sum modulo two of bits $b_0$ and $b_3$, second means for generating an output representing the sum modulo two of bits $b_1$ and $b_4$, third means for generating an output representing the sum modulo two of bits $b_2$ and $b_5$, first, second, and third means for respectively inverting said outputs of said first, second and third sum means, and a first AND gate responsive to outputs from said first, second, and third inverters for generating a first correct signal.

27. A circuit according to claim 26 which further includes a second AND gate responsive to outputs from said first, second and third sum means for generating a second correct signal.

28. A circuit for adding together two operands expressed in any one of a plurality of codes including binary, checked octal, and checked decimal where both said checked octal and checked decimal codes are represented in a binary system of notation with each ordinal digit being represented by a combination of six binary information bits $b_0$ to $b_5$, inclusive, having a relationship to each other of $$b_0 \dotplus b_3 = b_1 \dotplus b_4 = b_2 \dotplus b_5$$

with the symbol $\dotplus$ indicating sum modulo two, said circuit comprising: binary adder means for performing an initial pure binary add cycle on all binary bits of said operands to form an intermediate result, control means indicating the code of said operands, means responsive to a control means indication of a checked decimal code for generating a first series of six bit patterns, and also responsive to a control means indication of a checked octal code for generating a second series of six bit patterns, and means responsive to a control means indication of a checked decimal code or a checked octal code and to the result of said initial pure binary add cycle for initiating a conditional add cycle subsequent to said initial add cycle for respectively adding an appropriate one of said first series of patterns or an appropriate one of said second series of patterns to each digit of said intermediate result to form the final result.

29. A circuit according to claim 28 in which said pattern generation means comprises gates operative during said initial add cycle for sampling carry bit signals to and from each six bit intermediate result digit, together with logic means for generating said first series of patterns or said second series of patterns in accordance with said sampled carry bits, said pattern generation means further comprising means operative during a conditional add cycle to block carries to and from each six bit final result digit.

30. A circuit according to claim 29 in which said pattern generator produces said first series of patterns having the values 000000, 111010, 000000, 000110 according to the respective values of the said input and output carry bits 0, 0; 0, 1; 1, 1; and 1, 0; and in which said pattern generator produces said second series of patterns having the values 000000, 111000, 000000, and 001000 according to the respective values of the said input and output carry bits 0, 0; 0, 1; 1, 1; and 1, 0.

31. A circuit according to claim 28 in which said pattern generation means comprises gates operative during said initial add cycle for sampling carry bit signals to and from each six bit intermediate result digit, together with logic means for generating said first series of patterns or said second series of patterns in accordance with said sampled carry bits.

32. A circuit according to claim 31 in which said pattern generator produces said first series of patterns having the values 000000, 111010, 111111, and 000101 according to the respective values of said input and output carry bits 0, 0; 0, 1; 1, 1; and 1, 0; and in which said pattern generator produces said second series of patterns having the values 000000, 111000, 111111, and 000111 according to the said input and output carry bits 0, 0; 0, 1; 1, 1; and 1, 0.

References Cited by the Examiner
UNITED STATES PATENTS

| | | | |
|---|---|---|---|
| Re. 23,601 | 12/1952 | Hamming et al. | |
| 2,936,116 | 5/1960 | Adamson et al. | 235—165 |
| 2,957,626 | 10/1960 | Havens et al. | 235—153 |
| 3,018,955 | 1/1962 | Mendelson | 235—159 X |
| 3,024,992 | 3/1962 | Reynolds. | |
| 3,061,192 | 10/1962 | Terzian | 235—157 |
| 3,094,610 | 6/1963 | Humphrey et al. | 235—157 |

ROBERT C. BAILEY, *Primary Examiner.*

MALCOLM A. MORRISON, WALTER W. BURNS, Jr.,
*Examiners.*